(12) United States Patent
Jackson et al.

(10) Patent No.: US 11,783,606 B2
(45) Date of Patent: Oct. 10, 2023

(54) DELIVERY SYSTEM

(71) Applicant: Rehrig Pacific Company, Los Angeles, CA (US)

(72) Inventors: Peter Douglas Jackson, Alpharetta, GA (US); Robert Lee Martin, Jr., Kenosha, WI (US); Daniel James Thyer, Charlotte, NC (US); Justin Michael Brown, Coppell, TX (US)

(73) Assignee: Rehrig Pacific Company, Los Angeles, CA (US)

( * ) Notice: Subject to any disclaimer, the term of this patent is extended or adjusted under 35 U.S.C. 154(b) by 0 days.

(21) Appl. No.: 17/978,662

(22) Filed: Nov. 1, 2022

(65) Prior Publication Data

US 2023/0140119 A1    May 4, 2023

Related U.S. Application Data

(60) Provisional application No. 63/274,303, filed on Nov. 1, 2021, provisional application No. 63/274,310, filed on Nov. 1, 2021.

(51) Int. Cl.
*G06V 30/00* (2022.01)
*G06V 30/148* (2022.01)
*B65B 11/04* (2006.01)

(52) U.S. Cl.
CPC .......... *G06V 30/153* (2022.01); *B65B 11/045* (2013.01)

(58) Field of Classification Search
CPC ............ G65B 11/045; G06V 30/00–43; G06T 7/00–97; G06T 5/50; G06T 3/0068–0081
See application file for complete search history.

(56) References Cited

U.S. PATENT DOCUMENTS

| | | |
|---|---|---|
| 5,730,252 A | 3/1998 | Herbinet |
| 6,026,378 A | 2/2000 | Onozaki |
| 6,626,634 B2 | 9/2003 | Hwang et al. |
| 6,721,762 B1 | 4/2004 | Levine et al. |

(Continued)

FOREIGN PATENT DOCUMENTS

| | | |
|---|---|---|
| CN | 215554778 U | 1/2022 |
| CN | 114354637 A | 4/2022 |

(Continued)

OTHER PUBLICATIONS

Partial European Search Report for European Application No. 22204930.6 dated Apr. 11, 2023.

*Primary Examiner* — Sean T Motsinger

(74) *Attorney, Agent, or Firm* — Carlson, Gaskey & Olds, P.C.

(57) ABSTRACT

A delivery system may include a pallet wrapper system having a turntable, a camera directed toward an area above the turntable, and a stretch wrap dispenser adjacent the turntable. A computer receives images from the camera of multiple sides of a pallet loaded with packages on the turntable. The computer stitches images from different sides of the stack of packages that correspond to the same package. At least one machine learning model may be used to infer SKUs of each package. Optical character recognition may be performed in parallel on the images. The determination of the SKU of each package may be based upon the inferred SKUs and on the OCR.

27 Claims, 57 Drawing Sheets

(56) References Cited

U.S. PATENT DOCUMENTS

| | | |
|---|---|---|
| 6,918,229 B2 | 7/2005 | Lancaster, III et al. |
| 7,097,045 B2 | 8/2006 | Winkler |
| 7,548,166 B2 | 6/2009 | Roeder et al. |
| 7,557,714 B2 | 7/2009 | Roeder et al. |
| 7,602,288 B2 | 10/2009 | Broussard |
| 7,698,179 B2 | 4/2010 | Leung et al. |
| 7,739,147 B2 | 6/2010 | Branigan et al. |
| 7,765,668 B2 | 8/2010 | Townsend et al. |
| 7,865,398 B2 | 1/2011 | Schon |
| 7,877,164 B2 | 1/2011 | Grunbach et al. |
| 7,882,366 B2 | 2/2011 | Sen et al. |
| 8,494,673 B2 | 7/2013 | Miranda et al. |
| 8,718,372 B2 | 5/2014 | Holeva et al. |
| 8,739,502 B2 | 6/2014 | Lancaster, III |
| 8,839,132 B2 | 9/2014 | Reichert |
| 8,849,007 B2 | 9/2014 | Holeva et al. |
| 8,885,948 B2 | 11/2014 | Holeva et al. |
| 8,892,241 B2 * | 11/2014 | Weiss ............... B65G 1/1378 700/229 |
| 8,908,995 B2 | 12/2014 | Benos et al. |
| 8,918,976 B2 | 12/2014 | Townsend et al. |
| 8,934,672 B2 | 1/2015 | Holeva et al. |
| 8,938,126 B2 | 1/2015 | Holeva et al. |
| 8,965,559 B2 | 2/2015 | Pankratov et al. |
| 8,977,032 B2 | 3/2015 | Holeva et al. |
| 8,978,984 B2 | 3/2015 | Hennick et al. |
| 8,995,743 B2 | 3/2015 | Holeva et al. |
| 9,025,827 B2 | 5/2015 | Holeva et al. |
| 9,025,886 B2 | 5/2015 | Holeva et al. |
| 9,082,195 B2 | 7/2015 | Holeva et al. |
| 9,087,384 B2 | 7/2015 | Holeva et al. |
| 9,171,278 B1 | 10/2015 | Kong et al. |
| 9,224,120 B2 | 12/2015 | Grabiner et al. |
| 9,373,098 B2 | 6/2016 | Nashif et al. |
| 9,488,466 B2 | 11/2016 | Hanson |
| 9,488,986 B1 | 11/2016 | Solanki |
| 9,489,655 B1 | 11/2016 | Lecky |
| 9,503,704 B2 | 11/2016 | Ando |
| 9,505,554 B1 | 11/2016 | Kong et al. |
| 9,725,195 B2 | 8/2017 | Lancaster, III et al. |
| 9,727,840 B2 | 8/2017 | Bernhardt |
| 9,734,367 B1 | 8/2017 | Lecky et al. |
| 9,811,632 B2 | 11/2017 | Grabiner et al. |
| 9,821,344 B2 | 11/2017 | Zsigmond et al. |
| 9,826,213 B1 | 11/2017 | Russell et al. |
| 9,830,485 B1 | 11/2017 | Lecky |
| 9,944,417 B2 | 4/2018 | Lemieux et al. |
| 9,969,572 B2 | 5/2018 | Pankratov et al. |
| 9,984,339 B2 | 5/2018 | Hance et al. |
| 9,990,535 B2 | 6/2018 | Phillips et al. |
| 10,005,581 B2 | 6/2018 | Lancaster, III et al. |
| 10,026,044 B1 | 7/2018 | Wurman et al. |
| 10,042,079 B2 | 8/2018 | Patnaik |
| 10,055,805 B2 | 8/2018 | Satou |
| 10,071,856 B2 | 9/2018 | Hance et al. |
| 10,089,509 B2 | 10/2018 | Nachtrieb |
| 10,133,990 B2 | 11/2018 | Hance et al. |
| 10,134,120 B2 | 11/2018 | Jovanovski et al. |
| 10,140,724 B2 | 11/2018 | Benos et al. |
| 10,155,199 B2 | 12/2018 | Sakai et al. |
| 10,198,805 B2 | 2/2019 | Halata |
| 10,217,075 B1 | 2/2019 | Ward et al. |
| 10,220,970 B2 | 3/2019 | Lemieux et al. |
| 10,227,152 B2 | 3/2019 | Lancaster, III et al. |
| 10,229,487 B2 | 3/2019 | Goyal et al. |
| 10,265,871 B2 | 4/2019 | Hance et al. |
| 10,266,349 B2 | 4/2019 | Pankratov et al. |
| 10,328,578 B2 | 6/2019 | Holz |
| 10,346,987 B1 | 7/2019 | Landman |
| 10,347,095 B2 | 7/2019 | Mattingly et al. |
| 10,363,664 B2 | 7/2019 | Yoshii |
| 10,369,701 B1 | 8/2019 | Diankov et al. |
| 10,402,956 B2 | 9/2019 | Jovanovski et al. |
| 10,430,969 B2 | 10/2019 | Kopelke et al. |
| 10,442,640 B2 | 10/2019 | Pankratov et al. |
| 10,456,915 B1 | 10/2019 | Diankov |
| 10,482,401 B2 | 11/2019 | Wurman et al. |
| 10,491,881 B1 | 11/2019 | Russell et al. |
| 10,504,343 B2 | 12/2019 | Mattingly et al. |
| 10,518,973 B2 | 12/2019 | Hance et al. |
| 10,562,188 B1 | 2/2020 | Diankov et al. |
| 10,562,189 B1 | 2/2020 | Diankov et al. |
| 10,569,416 B1 | 2/2020 | Diankov |
| 10,569,417 B1 | 2/2020 | Diankov |
| 10,576,631 B1 | 3/2020 | Diankov |
| 10,592,842 B2 | 3/2020 | High et al. |
| 10,596,701 B1 | 3/2020 | Diankov |
| 10,607,182 B2 | 3/2020 | Shah et al. |
| 10,614,319 B2 | 4/2020 | Douglas et al. |
| 10,616,553 B1 | 4/2020 | Russell et al. |
| 10,618,172 B1 | 4/2020 | Diankov et al. |
| 10,621,457 B2 | 4/2020 | Schimmel |
| 10,627,244 B1 | 4/2020 | Lauka et al. |
| 10,628,763 B2 | 4/2020 | Hance et al. |
| 10,643,038 B1 | 5/2020 | McCalib, Jr. et al. |
| 10,643,170 B2 | 5/2020 | Lee et al. |
| 10,655,945 B2 | 5/2020 | Nanda et al. |
| 10,679,379 B1 | 6/2020 | Diankov et al. |
| 10,685,197 B2 | 6/2020 | Plummer et al. |
| 10,703,584 B2 | 7/2020 | Diankov et al. |
| 10,703,585 B2 | 7/2020 | Pankratov et al. |
| 10,706,571 B2 | 7/2020 | Sugimura et al. |
| 10,724,973 B2 | 7/2020 | Paresi |
| 10,759,599 B2 | 9/2020 | Hance et al. |
| 10,769,806 B2 | 9/2020 | Driegen et al. |
| 10,796,423 B2 | 10/2020 | Goja |
| 10,845,184 B2 | 11/2020 | Benos et al. |
| 10,845,499 B2 | 11/2020 | Paresi |
| 10,867,275 B1 | 12/2020 | Dholakia et al. |
| 2004/0069850 A1 | 4/2004 | De Wilde |
| 2004/0220694 A1 | 11/2004 | Stingel, III et al. |
| 2005/0071234 A1 | 3/2005 | Schon |
| 2005/0246056 A1 | 11/2005 | Marks et al. |
| 2006/0187041 A1 | 8/2006 | Olsen, III et al. |
| 2006/0242820 A1 | 11/2006 | Townsend et al. |
| 2006/0255949 A1 | 11/2006 | Roeder et al. |
| 2006/0255950 A1 | 11/2006 | Roeder et al. |
| 2007/0126578 A1 | 6/2007 | Broussard |
| 2007/0156281 A1 | 7/2007 | Leung et al. |
| 2007/0163099 A1 | 7/2007 | Townsend et al. |
| 2010/0202702 A1 | 8/2010 | Benos et al. |
| 2012/0057022 A1 | 3/2012 | Nechiporenko et al. |
| 2012/0106787 A1 * | 5/2012 | Nechiporenko ..... G06V 30/424 382/103 |
| 2012/0175412 A1 | 7/2012 | Grabiner et al. |
| 2013/0101166 A1 | 4/2013 | Holeva et al. |
| 2013/0101167 A1 | 4/2013 | Holeva et al. |
| 2013/0101173 A1 | 4/2013 | Holeva et al. |
| 2013/0101201 A1 | 4/2013 | Holeva et al. |
| 2013/0101202 A1 | 4/2013 | Holeva et al. |
| 2013/0101203 A1 | 4/2013 | Holeva et al. |
| 2013/0101204 A1 | 4/2013 | Holeva et al. |
| 2013/0101227 A1 | 4/2013 | Holeva et al. |
| 2013/0101228 A1 | 4/2013 | Holeva et al. |
| 2013/0101229 A1 | 4/2013 | Holeva et al. |
| 2013/0101230 A1 | 4/2013 | Holeva et al. |
| 2013/0282165 A1 | 10/2013 | Pankratov et al. |
| 2015/0101281 A1 | 4/2015 | Kudia |
| 2015/0102100 A1 | 4/2015 | Hattrup et al. |
| 2015/0149946 A1 | 5/2015 | Benos et al. |
| 2015/0166272 A1 | 6/2015 | Pankratov et al. |
| 2015/0325013 A1 | 11/2015 | Patnaik |
| 2016/0104274 A1 | 4/2016 | Jovanovski et al. |
| 2016/0104290 A1 | 4/2016 | Patnaik |
| 2016/0110630 A1 | 4/2016 | Heusch et al. |
| 2016/0154939 A1 | 6/2016 | Grabiner et al. |
| 2016/0275441 A1 | 9/2016 | Barber et al. |
| 2016/0371512 A1 | 12/2016 | Hattrup et al. |
| 2017/0076469 A1 | 3/2017 | Sonoura et al. |
| 2017/0132773 A1 | 5/2017 | Toedtli |
| 2017/0154397 A1 | 6/2017 | Satou |
| 2017/0161673 A1 | 6/2017 | High et al. |
| 2017/0193432 A1 | 7/2017 | Bernhardt |
| 2017/0316253 A1 | 11/2017 | Phillips et al. |

(56) References Cited

U.S. PATENT DOCUMENTS

| | | |
|---|---|---|
| 2018/0025185 A1 | 1/2018 | Hattrup et al. |
| 2018/0029797 A1 | 2/2018 | Hance et al. |
| 2018/0043547 A1 | 2/2018 | Hance et al. |
| 2018/0060630 A1 | 3/2018 | Nachtrieb |
| 2018/0060764 A1 | 3/2018 | Hance et al. |
| 2018/0089517 A1 | 3/2018 | Douglas et al. |
| 2018/0218247 A1 | 8/2018 | Lee et al. |
| 2018/0224569 A1 | 8/2018 | Paresi |
| 2018/0225597 A1 | 8/2018 | Hance et al. |
| 2018/0247404 A1 | 8/2018 | Goyal et al. |
| 2018/0253857 A1 | 9/2018 | Driegen et al. |
| 2018/0257879 A1 | 9/2018 | Pankratov et al. |
| 2018/0273226 A1 | 9/2018 | Lancaster, III et al. |
| 2018/0304468 A1 | 10/2018 | Holz |
| 2018/0314866 A1 | 11/2018 | Kotula |
| 2018/0314867 A1 | 11/2018 | Kotula |
| 2018/0322424 A1 | 11/2018 | Wurman et al. |
| 2018/0370046 A1 | 12/2018 | Hance et al. |
| 2018/0370727 A1 | 12/2018 | Hance et al. |
| 2019/0005668 A1 | 1/2019 | Sugimura et al. |
| 2019/0026878 A1 | 1/2019 | Jovanovski et al. |
| 2019/0034839 A1 | 1/2019 | Hance et al. |
| 2019/0041341 A1 | 2/2019 | Paresi |
| 2019/0049234 A1 | 2/2019 | Benos et al. |
| 2019/0102874 A1 | 4/2019 | Goja |
| 2019/0122173 A1 | 4/2019 | Souder et al. |
| 2019/0156086 A1 | 5/2019 | Plummer et al. |
| 2019/0206059 A1 | 7/2019 | Landman |
| 2019/0220990 A1 | 7/2019 | Goja et al. |
| 2019/0248604 A1 | 8/2019 | Pankratov et al. |
| 2019/0251385 A1 | 8/2019 | Kotula |
| 2019/0295385 A1 | 9/2019 | Mattingly et al. |
| 2020/0034658 A1* | 1/2020 | Chung ............... G06V 10/28 |
| 2020/0039765 A1 | 2/2020 | Pankratov et al. |
| 2020/0087068 A1 | 3/2020 | Hance et al. |
| 2020/0104785 A1 | 4/2020 | Ehrman et al. |
| 2020/0105008 A1 | 4/2020 | Ehrman et al. |
| 2020/0130961 A1 | 4/2020 | Diankov et al. |
| 2020/0130962 A1 | 4/2020 | Yu et al. |
| 2020/0134828 A1 | 4/2020 | Diankov et al. |
| 2020/0134830 A1 | 4/2020 | Yu et al. |
| 2020/0156254 A1* | 5/2020 | Li ..................... G06V 30/248 |
| 2020/0238517 A1 | 7/2020 | Diankov |
| 2020/0238519 A1 | 7/2020 | Diankov et al. |
| 2020/0273131 A1* | 8/2020 | Martin, Jr. ......... G06K 7/10237 |
| 2020/0294244 A1 | 9/2020 | Diankov et al. |
| 2020/0302207 A1* | 9/2020 | Perkins ................ G06N 20/00 |
| 2020/0302243 A1 | 9/2020 | Fryshman |
| 2020/0311362 A1 | 10/2020 | Plummer et al. |
| 2020/0356798 A1* | 11/2020 | Kotula ............... G06K 7/10722 |
| 2021/0042662 A1 | 2/2021 | Pu et al. |
| 2021/0133666 A1 | 5/2021 | Eckman et al. |
| 2021/0326544 A1* | 10/2021 | Jackson ............. G06K 19/0723 |
| 2021/0350485 A1 | 11/2021 | Majumdar et al. |
| 2021/0403066 A1* | 12/2021 | Martin, Jr. ............. G07C 5/008 |
| 2022/0058511 A1 | 2/2022 | McCusker et al. |
| 2022/0122029 A1* | 4/2022 | Martin, Jr. ............ B62B 5/0096 |
| 2022/0129836 A1* | 4/2022 | Jackson ................ G06K 7/1413 |
| 2022/0219846 A1* | 7/2022 | Jackson ................ B65B 57/10 |
| 2023/0054508 A1* | 2/2023 | Brown ................ G06V 10/762 |
| 2023/0058363 A1* | 2/2023 | Reynolds ............... G06V 10/70 |
| 2023/0059103 A1* | 2/2023 | Jackson ................ G06T 7/0004 |
| 2023/0096840 A1* | 3/2023 | Perkins ................ G06F 18/253 |
| | | 382/103 |
| 2023/0140119 A1* | 5/2023 | Jackson ............... G06V 30/153 |
| | | 382/177 |

FOREIGN PATENT DOCUMENTS

| | | |
|---|---|---|
| KR | 20100051156 A | 5/2010 |
| WO | 2010123458 A1 | 10/2010 |
| WO | 2015004502 A1 | 1/2015 |
| WO | 2022052959 A | 3/2022 |

* cited by examiner

| SKU | Description | Package Type | Brand | Keywords |
|---|---|---|---|---|
| 818094006385 | 16OZ CN RKSTR XDRNC SS GRNAPL 1/24 | 16OZ_CN_1_24 | RKSTR XD SS GRNAP | Rockstar Xdurance Super Sour Green Apple 16oz 24 |
| 818094003926 | 16OZ CN RKSTR RVLT KLR CIT 1/24 | 16OZ_CN_1_24 | RKSTR RVLT KLR CT | Rockstar Revolt Killer Citrus 16oz 24 |
| 818094005258 | 16OZ CN RKSTR PRZR ORG 1/24 | 16OZ_CN_1_24 | RKSTR PRZR ORG | Rockstar Pure Zero Orange 16oz 24 |
| 078000017434 | 16.9OZ PL CRSH STW 6/45 | 16_9OZ_PL_PK_6_4S | CRSH STRW | Crush Strawberry 16.9oz 6 4S |
| 012000102059 | 16.9OZ PL MDEW CD RD 6/4S | 16_9OZ_PL_PK_6_4S | MDEW CD RD | Mountain Dew Code Red 16.9oz 6 4S |
| 012000811197 | 16.9OZ PL PK PEPSI WLD CHRY 6/4S | 16_9OZ_PL_PK_6_4S | PEPSI WCHE | Pepsi Wild Cherry 16.9 6 4S |
| 818094005555 | 16OZ CN RKSTR XDRNC KW STW 1/24 | 16OZ_CN_1_24 | RKSTR XDRNC KWSTW | Rockstar Xdurance Kiwi Strawberry 16oz 24 |

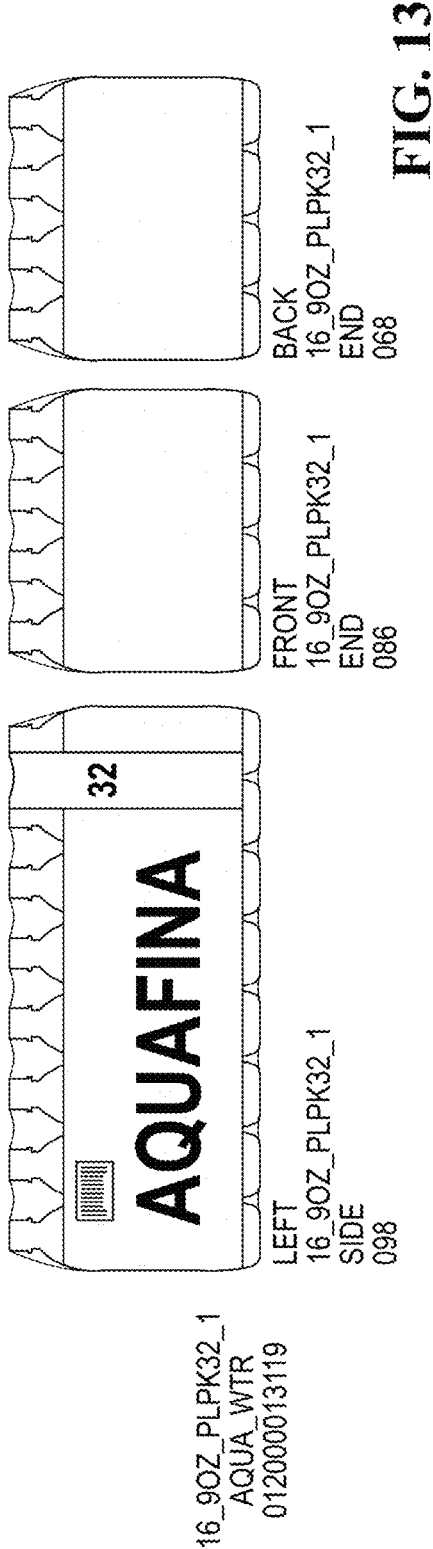
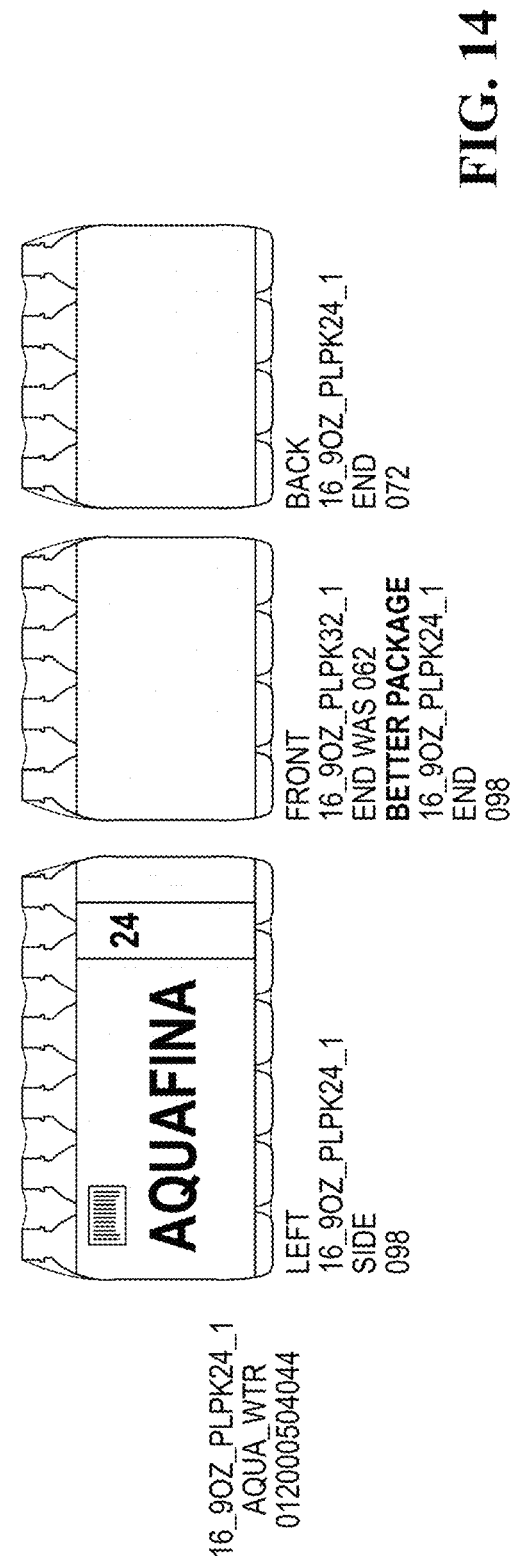

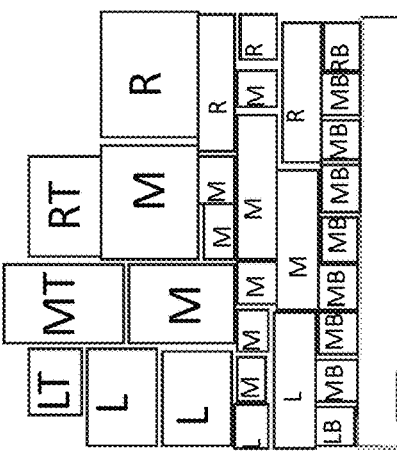
Back Pallet Face
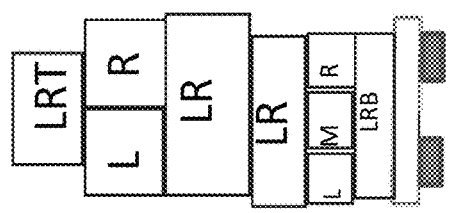
Right Pallet Face
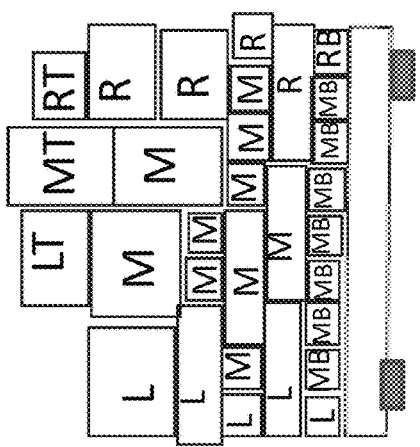
Front Pallet Face
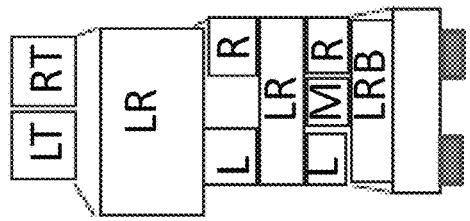
Left Pallet Face
Figure 15A

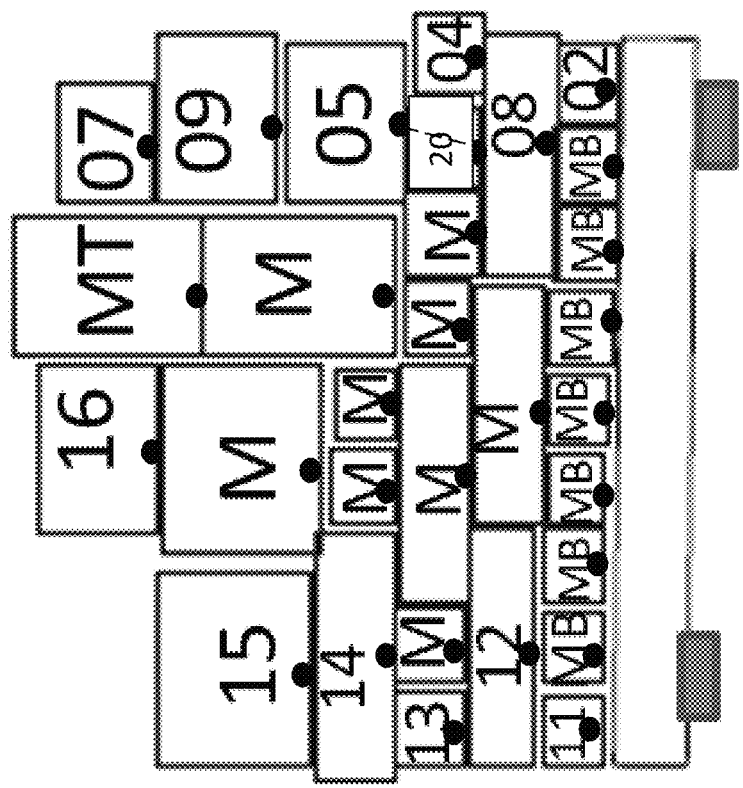
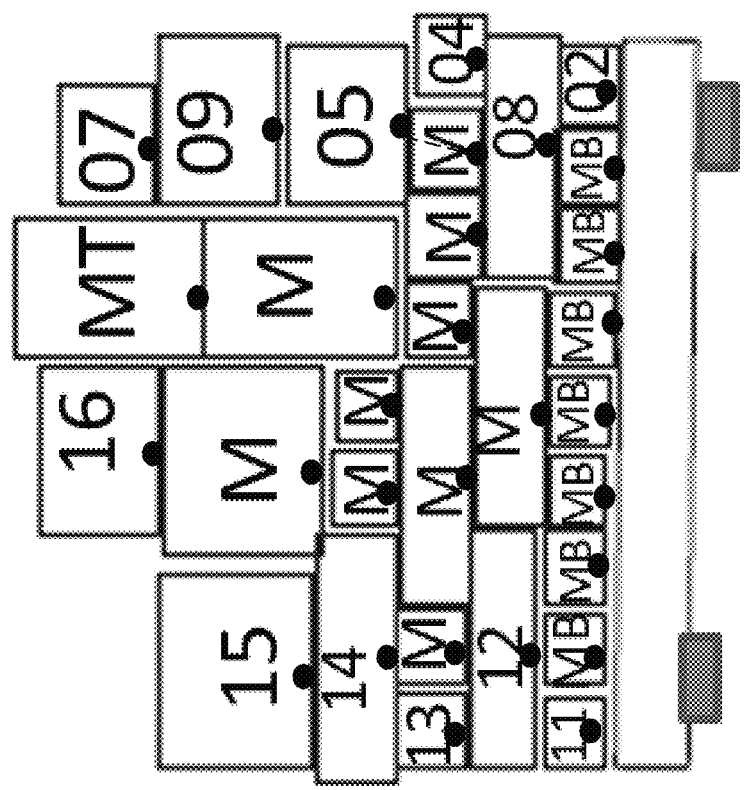
Figure 15I

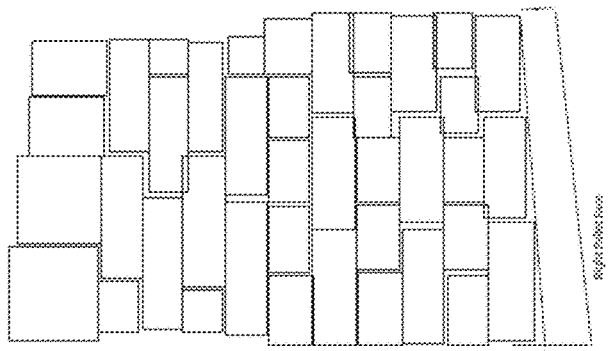
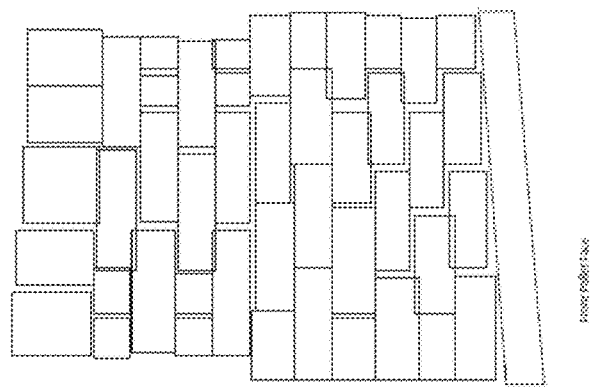
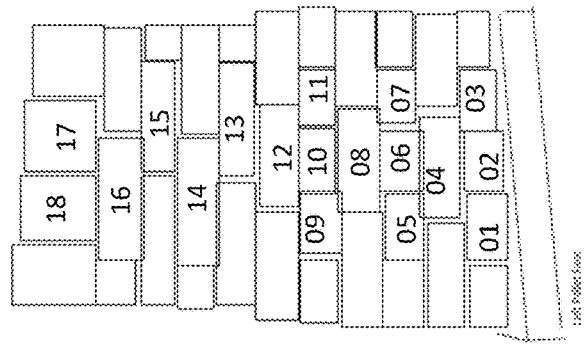
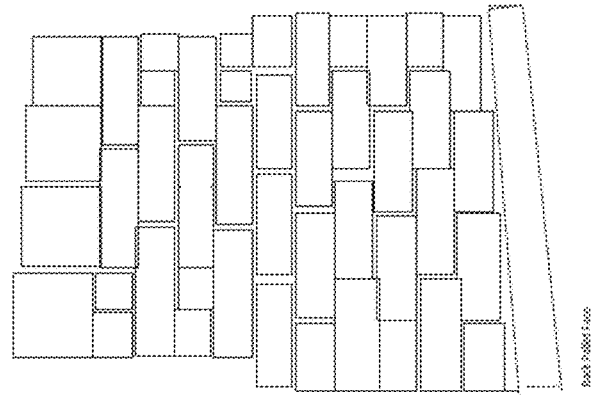
Figure 15M

Figure 15R

| Layer | Package Type | Full Layer Quantity | Min Visible Layer Quantity | Product IDs in Layer | Number Visible on Layer | Is Full Layer | Number of Hidden Product for the Layer |
|---|---|---|---|---|---|---|---|
| 1 | 12OZ_CN_15_2_BONUS | 18 | 10 | 1, 2, 3, 19, 30, 41, 59, 70, 81, 82, 104, 105 | 12 | Yes | 6 |
| 2 | 12OZ_CN_15_2_BONUS | 18 | 10 | 4, 20, 31, 42, 43, 44, 60, 71, 83, 84, 106, 107 | 12 | Yes | 6 |
| 3 | 12OZ_CN_15_2_BONUS | 18 | 10 | 5, 6, 7, 21, 32, 45, 61, 72, 85, 86, 108, 109 | 12 | Yes | 6 |
| 4 | 12OZ_CN_15_2_BONUS | 18 | 10 | 8, 22, 33, 46, 47, 48, 62, 73, 87, 88, 110, 111 | 12 | Yes | 6 |
| 5 | 12OZ_CN_15_2_BONUS | 18 | 10 | 9, 10, 11, 23, 34, 49, 63, 74, 89, 90, 112, 113 | 12 | Yes | 6 |
| 6 | 12OZ_CN_15_2_BONUS | 18 | 10 | 12, 24, 35, 50, 51, 52, 64, 75, 91, 92, 114, 115 | 12 | Yes | 6 |
| 7 | 12OZ_CN_12_2_FM | 18 | 10 | 13, 25, 36, 53, 65, 76, 93, 94, 116, 117 | 10 | Yes | 8 |
| 8 | 12OZ_CN_12_2_FM | 18 | 10 | 14, 26, 37, 54, 66, 77, 95, 96, 118, 119 | 10 | Yes | 8 |
| 9 | 12OZ_CN_12_2_FM | 18 | 10 | 15, 27, 38, 55, 67, 78, 97, 98, 120, 121 | 10 | Yes | 8 |
| 10 | 12OZ_CN_12_2_FM | 18 | 10 | 16, 28, 39, 56, 68, 79, 99, 100, 122, 123 | 10 | Yes | 8 |
| 11 | 12OZ_CN_24_1CB | 18 | 13 | 17, 18, 29, 40, 57, 58, 69, 80, 101, 102, 103, 124, 125 | 13 | Yes | 5 |

Figure 15S

| NEEDS MANUAL LABELING VIEW FULL PALLET | EXPECTED SKU | ACTUAL SKU | PACKAGE TYPE | BRAND |
|---|---|---|---|---|
| SCENARIO 1/3 | ☐ | | 16_9OZ_PL_PK12_2 | LPT_GT_WHT_PCH |
| 2020-07-16_21_08_57 | ▶ | | 16_9OZ_PL_PK12_2 | LPT_GT_WHT_PCH |
| ☐ FILTER PACKAGE: 16_9OZ_PL_PK12_2 | ▶ | | 16_9OZ_PL_PK12_2 | LPT_GT_WHT_PCH |
| ☐ FILTER BRAND: LPT_GT_WHT_PCH | | | | |
| ☐ SHOW IDENTIFIED PRODUCT | | | | |
| DETECTED: 3 EXPECTED: 2 LABELED: 2 | | | | |
| DONE | | | | |
| NOT ON PALLET | | | | |

FIG. 28

| NEEDS MANUAL LABELING VIEW FULL PALLET | EXPECTED SKU | ACTUAL SKU | PACKAGE TYPE | BRAND |
|---|---|---|---|---|
| SCENARIO 2/3 2020-07-16_21_08_57 ☐ FILTER PACKAGE: 16_9OZ_PL_PK12_2 ☐ FILTER BRAND: LPT_GT_WTRMLN ☐ SHOW IDENTIFIED PRODUCT DETECTED: 1 EXPECTED: 2 LABELED: 1 DONE NOT ON PALLET | ▶ ☐ ☐ | | 16_9OZ_PL_PK12_2 16_9OZ_PL_PK12_2 1L_PL_6_2 | LPT_GT_WHT_PCH LPT_GT_WHT_PCH PRM_LIFEWTR |

FIG. 29

| LIST OF PRODUCTS | | Done |
|---|---|---|
| PRODUCT | QTY-1 | QTY-2 |
| Coca Cola - 12 OZ - 12 Pack | 10 | 10 |
| Diet Coke - 12 OZ - 24 Pack | 10 | 8 |
| Mountain Dew - 16.9 OZ - 12 Pack | 8 | 8 |
| Cherry Coke - 12 OZ - 12 Pack | 8 | 6 |
| Coca Cola - 16.9 OZ - 12 Pack | 6 | |

FIG. 33

| LIST OF PRODUCTS | | |
|---|---|---|
| PRODUCT | QTY-1 | QTY-2 |
| Coca Cola - 12 OZ - 12 Pack | 10 | 10 |
| Diet Coke - 12 OZ - 24 Pack | 10 | 8 |
| Mountain Dew - 16.9 OZ - 12 Pack | 8 | 9 |
| Cherry Coke - 12 OZ - 12 Pack | 8 | 8 |
| Coca Cola - 16.9 OZ - 12 Pack | 6 | 6 |

FIG. 34

DELIVERY SYSTEM

BACKGROUND

The delivery of products to stores from distribution centers has many steps that are subject to errors and inefficiencies. When the order from the customer is received, at least one pallet is loaded with the specified products according to a "pick list."

For example, the products may be cases of beverage containers (e.g. cartons of cans, beverage crates containing bottles or cans, cardboard trays with plastic overwrap, etc). There are many different permutations of flavors, sizes, and types of beverage containers delivered to each store. When building pallets, missing or mis-picked product can account for significant additional operating costs.

At the store, the driver unloads the pallet(s) designated for that location. Drivers often spend a significant amount of time waiting in the store for a clerk to become available to check in the delivered product by physically counting it. Clerks are typically busy helping their own customers which forces the driver to wait until a clerk becomes available to check-in product. During this process the clerk ensures that all product ordered is being delivered. The driver and clerk often break down the pallet and open each case to scan one UPC from every unique flavor and size. After the unique flavor and size is scanned, both the clerk and driver count the number of cases or bottles for that UPC. This continues until all product is accounted for on all the pallets.

SUMMARY

The improved delivery system provides improvements to several phases of the delivery process. Although these improvements work well when practiced together, fewer than all, or even any one of these improvements could be practiced alone to some benefit.

The improved delivery system facilitates order accuracy from the warehouse to the store via machine learning and computer vision software, optionally combined with a serialized (RFID/Barcode) shipping pallet. Pallet packing algorithms are based on the product mix and warehouse layout.

Electronic order accuracy checks are done while building pallets, loading pallets onto trailers and delivering pallets to the store. When building pallets, the delivery system validates the build to ensure the correct product SKUs are being loaded on the correct pallet according to the pick list. Once the pallet is built the overall computer vision sku count for that specific pallet is compared against the pick list for that specific pallet to ensure the pallet is built correctly. This may be done prior to the pallet being stretch wrapped thus avoiding the cost of unwrapping of the pallet to audit and correct. This also prevents shortages and overages at the delivery point thus preventing the driver from having to bring back excess or make additional trips to deliver missing product.

The system will also decrease the time at the delivery point (e.g. store) to check-in the product through a combination of checks that build trust at the delivery point. Ideally, the store clerk eventually trusts that the pallets are loaded correctly.

In some aspects, the techniques described herein relate to a pallet wrapper system including: a turntable having a support surface for supporting a pallet having a stack of a plurality of packages supported thereon; at least one camera directed toward an area above the support surface of the turntable; a stretch wrap dispenser adjacent the turntable; at least one computer including: at least one processor; and at least one non-transitory computer-readable media storing: at least one machine learning model that has been trained with a plurality of images of packages; and instructions that, when executed by the at least one processor, cause the computing system to perform the following operations. A plurality of stack images of the stack of the plurality of packages is received. Each of the plurality of stack images is of a different face of the stack of the plurality of packages. The plurality of stack images include a first stack image of a first face of the stack of the plurality of packages and a second stack image of a second face of the stack of the plurality of packages. The first face of the stack of the plurality of packages abuts the second face of the stack of the plurality of packages at a first second corner. The first stack image is segmented into a plurality of first package faces. The plurality of first package faces including a plurality of right first package faces along the first second corner. The second stack image is segmented into a plurality of second package faces. The plurality of second package faces includes a plurality of left second package faces along the first second corner. Each of the plurality of right first package faces along the first second corner is linked to a different one of the plurality of left second package faces along the first second corner as different faces of the same ones of the plurality of packages. Using the at least one machine learning model, the computing system infers at least one SKU based upon each of the first package faces and each of the second package faces.

In some aspects, the techniques described herein relate to a pallet wrapper system wherein the operations further include classifying a position of each of the plurality of first package faces and each of the plurality of second package faces.

In some aspects, the techniques described herein relate to a pallet wrapper system wherein in operation f) the positions of the plurality of first package faces are classified based upon the first stack image to be middle, left, right, bottom, and/or top, and the positions of the plurality of second packages faces are classified based upon the second stack image to be middle, left, right, bottom, and/or top.

In some aspects, the techniques described herein relate to a computing system for identifying SKUs in a stack of a plurality of packages including: at least one processor; and at least one non-transitory computer-readable media storing: at least one machine learning model that has been trained with a plurality of images of packages; and instructions that, when executed by the at least one processor, cause the computing system to perform the following operations. A plurality of stack images of the stack of the plurality of packages are received. Each of the plurality of stack images is of a different face of the stack of the plurality of packages. The plurality of stack images includes a first stack image of a first face of the stack of the plurality of packages and a second stack image of a second face of the stack of the plurality of packages. The first face of the stack of the plurality of packages abuts the second face of the stack of the plurality of packages at a first second corner. The first stack image is segmented into a plurality of first package faces. The plurality of first package faces include a plurality of right first package faces along the first second corner. The second stack image is segmented into a plurality of second package faces. The plurality of second package faces include a plurality of left second package faces along the first second corner. Each of the plurality of right first package faces along the first second corner is linked to a different one of the plurality of left second package faces along the first second corner as different faces of the same ones of the plurality of packages. Using the at least one machine learning model, at least one SKU is inferred based upon each of the first package faces and each of the second package faces.

In some aspects, the techniques described herein relate to a computing system wherein the operations further include classifying a position of each of the plurality of first package faces and each of the plurality of second package faces.

In some aspects, the techniques described herein relate to a computing system wherein the positions of the plurality of first package faces are classified based upon the first stack image to be middle, left, right, bottom, and/or top, and the positions of the plurality of second packages faces are classified based upon the second stack image to be middle, left, right, bottom, and/or top.

In some aspects, the techniques described herein relate to a computing system wherein the operations further include evaluating the first stack face to determine whether a right half or a left half of the stack of packages in the first stack face is taller, wherein the second stack face corresponds to a taller one of the right half or the left half of the stack of packages, wherein the plurality of stack images further includes a third stack image opposite the first stack image and a fourth stack image opposite the second stack image, wherein linking along the first second corner is performed before linking package faces of the fourth stack image based upon the determination that the second stack face corresponds to the taller one of the right half or the left half.

In some aspects, the techniques described herein relate to a computing system wherein the plurality of stack images further includes a third stack image of a third face of the stack of the plurality of packages and a fourth stack image of a fourth face of the stack of the plurality of packages, and wherein the first stack image and the third stack image correspond to opposite long sides of the stack of packages and wherein the second stack image and the fourth stack image correspond to opposite short sides of the stack of packages.

In some aspects, the techniques described herein relate to a computing system further including a second-third corner at which the second face of the stack of the plurality of packages abuts the third face of the stack of the plurality of packages, the plurality of second package faces including a plurality of right second package faces along the second-third corner, wherein the operations further include segmenting the third stack image into a plurality of third package faces, the plurality of third package faces including a plurality of left third package faces along the second-third corner, and linking each of the plurality of right second package faces to a different one of the plurality of left third package faces as different faces of the same ones of the plurality of packages.

In some aspects, the techniques described herein relate to a computing system wherein the operations further include flipping the third stack image, identifying a first subset of the plurality of right first package faces that have been linked to left third package faces as different faces of the same ones of the plurality of packages, and linking a second subset of the first package faces with corresponding ones of the third package faces based upon locations relative to the first subset.

In some aspects, the techniques described herein relate to a computing system wherein inferring at least one SKU for each of the first package faces includes inferring a plurality of SKUs for each of the first package faces, and wherein the operations further include performing optical character recognition on one of the plurality of first package faces, and associating a SKU with the one of the plurality of first package faces based upon the inferred plurality of SKUs for the one of the plurality of first packages faces and based upon the optical character recognition on the one of the plurality of first package faces.

In some aspects, the techniques described herein relate to a computing system for identifying SKUs in a stack of a plurality of packages including: at least one processor; and at least one non-transitory computer-readable media storing: at least one machine learning model that has been trained with a plurality of images of packages; and instructions that, when executed by the at least one processor, cause the computing system to perform the following operations. A plurality of stack images of the stack of the plurality of packages is received. Each of the plurality of stack images is of a different face of the stack of the plurality of packages. The plurality of stack images includes a first stack image of a first face of the stack of the plurality of packages. The first stack image is segmented into a plurality of first package faces. Using the at least one machine learning model, a plurality of brands is inferred based upon each of the first package faces. Optical character recognition is performed on one of the plurality of first package faces. One of the plurality of brands is associated with the one of the plurality of first package faces based upon the inferred plurality of brands for the one of the plurality of first packages faces and based upon the optical character recognition on the one of the plurality of first package faces.

In some aspects, the techniques described herein relate to a computing system wherein the operations further include using the at least one machine learning model, inferring a plurality of package types based upon each of the first package faces, and associating one of the plurality of package types with the one of the plurality of first package faces based upon the inferred plurality of package types for the one of the plurality of first packages faces and based upon the optical character recognition on the one of the plurality of first package faces.

In some aspects, the techniques described herein relate to a computer method for identifying SKUs in a stack of a plurality of packages including receiving in at least one computer a plurality of stack images of the stack of the plurality of packages. Each of the plurality of stack images is of a different face of the stack of the plurality of packages. The plurality of stack images include a first stack image of a first face of the stack of the plurality of packages and a second stack image of a second face of the stack of the plurality of packages. The first face of the stack of the plurality of packages abuts the second face of the stack of the plurality of packages at a first second corner. The first stack image is segmented into a plurality of first package faces. The plurality of first package faces includes a plurality of right first package faces along the first second corner. The second stack image is segmented into a plurality of second package faces. The plurality of second package faces includes a plurality of left second package faces along the first second corner. The at least one computer links each of the plurality of right first package faces along the first second corner to a different one of the plurality of left second package faces along the first second corner as different faces of the same ones of the plurality of packages. The at least one computer uses the at least one machine learning model to infer at least one SKU based upon each of the first package faces and each of the second package faces.

BRIEF DESCRIPTION OF THE DRAWINGS

FIG. 9 shows sample text descriptions of a plurality of sample SKUs, including how SKUs are identified by both package type and brand.

FIGS. 13 and 14 illustrate the step of selecting the best package type from the stitched package faces.

FIG. 15A shows four pallet faces for a loaded half-pallet and a first stitching step.

FIG. 15I illustrates a tenth stitching step, a nearest neighbor algorithm, with respect to the front and back pallet faces of FIG. 15A.

FIG. 15M illustrates four faces of a loaded full-size pallet and a first stitching step.

FIG. 15R illustrates the four pallet faces of the full-size pallet of FIG. 15M with the outer packages stitched together.

FIG. 15S illustrates full layer stitching information for the full-size pallet of FIG. 15R.

FIG. 28 demonstrates a sample screen of the supervised labeling tool for fixing errors.

FIG. 29 also shows another sample screen of the supervised labeling tool.

FIG. 33 shows an example screen indicating a validated loaded pallet at the distribution center.

FIG. 34 shows an example screen indicating a mis-picked loaded pallet at the distribution center.

DETAILED DESCRIPTION

Figure 1:
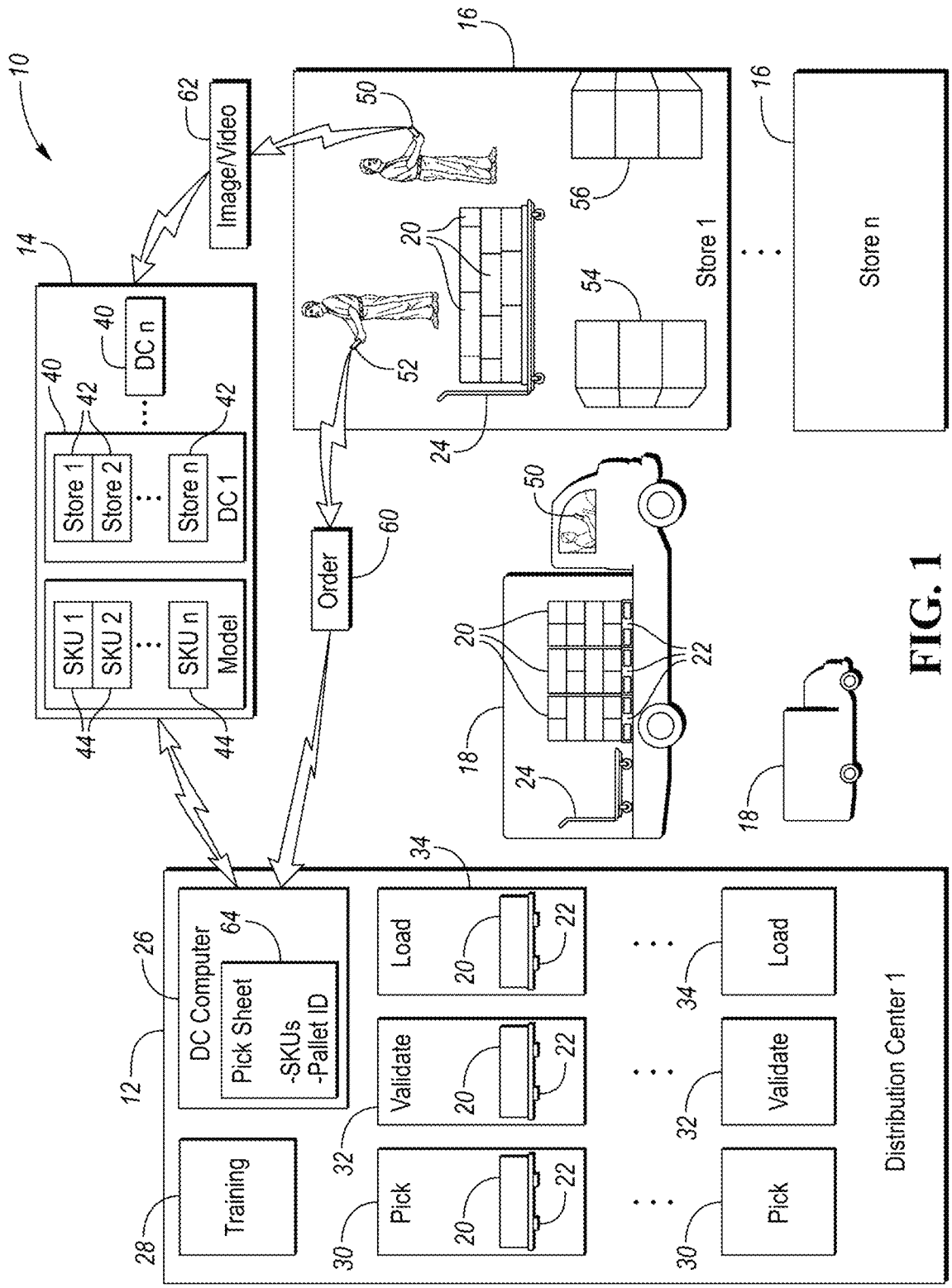
FIG. 1 is a schematic view of a delivery system.

FIG. 1 is a high-level view of a delivery system 10 including one or more distribution centers 12, a central server 14 (e.g. cloud computer), and a plurality of stores 16. A plurality of trucks 18 or other delivery vehicles each transport the products 20 on pallets 22 from one of the distribution centers 12 to a plurality of stores 16. Each truck 18 carries a plurality of pallets 22 which may be half pallets (or full-size pallets), each loaded with a plurality of goods 20 for delivery to one of the stores 16. A wheeled sled 24 is on each truck 18 to facilitate delivery of one of more pallets 22 of goods 20 to each store 16. Generally, the goods 20 could be loaded on the half pallets, full-size pallets, carts, or hand carts, or dollies —all considered "platforms" herein.

Each distribution center 12 includes one or more pick stations 30, a plurality of validation stations 32, and a plurality of loading stations 34. Each loading station 34 may be a loading dock for loading the trucks 18.

Each distribution center 12 may include a DC computer 26. The DC computer 26 receives orders 60 from the stores 16 and communicates with a central server 14. Each DC computer 26 receives orders and generates pick sheets 64, each of which stores SKUs and associates them with pallet ids. Alternatively, the orders 60 can be sent from the DC computer 26 to the central server 14 for generation of the pick sheets 64, which are synced back to the DC computer 26.

Some or all of the distribution centers 12 may include a training station 28 for generating image information and other information about new products 20 which can be transmitted to the central server 14 for analysis and future use.

The central server 14 may include a plurality of distribution center accounts 40, including DC1-DCn, each associated with a distribution center 12. Each DC account 40 includes a plurality of store accounts 42, including store 1-store n. The orders 60 and pick sheets 64 for each store are associated with the associated store account 42. The central server 14 further includes a plurality of machine learning models 44 trained as will be described herein based upon SKUs. The models 44 may be periodically synced to the DC computers 26 or may be operated on the server 14.

The machine learning models 44 are used to identify SKUs. A "SKU" may be a single variation of a product that is available from the distribution center 12 and can be delivered to one of the stores 16. For example, each SKU may be associated with a particular package type, e.g. the number of containers (e.g. 12 pack) in a particular form (e.g. can v bottle) and of a particular size (e.g. 24 ounces) optionally with a particular secondary container (cardboard vs reusable plastic crate, cardboard tray with plastic over-wrap, etc). In other words, the package type may include both primary packaging (can, bottle, etc, in direct contact with the beverage or other product) and any secondary packaging (crate, tray, cardboard box, etc, containing a plurality of primary packaging containers).

Each SKU may also be associated with a particular "brand" (e.g. the manufacturer and the specific variation, e.g. flavor). The "brand" may also be considered the specific content of the primary package and secondary package (if any) for which there is a package type. This information is stored by the server 14 and associated with the SKU along with the name of the product, a description of the product, dimensions of the SKU, and optionally the weight of the SKU. This SKU information is associated with image information for that SKU along with the machine learning models 44.

It is also possible that more than one variation of a product may share a single SKU, such as where only the packaging, aesthetics, and outward appearance of the product varies, but the content and quantity/size is the same. For example, sometimes promotional packaging may be utilized, which would have different image information for a particular SKU, but it is the same beverage in the same primary packaging with secondary packaging having different colors, text, and/or images. Alternatively, the primary packaging may also be different (but may not be visible, depending on the secondary packaging). In general, all the machine learning models 44 may be generated based upon image information generated through the training module 28.

Figure 2:
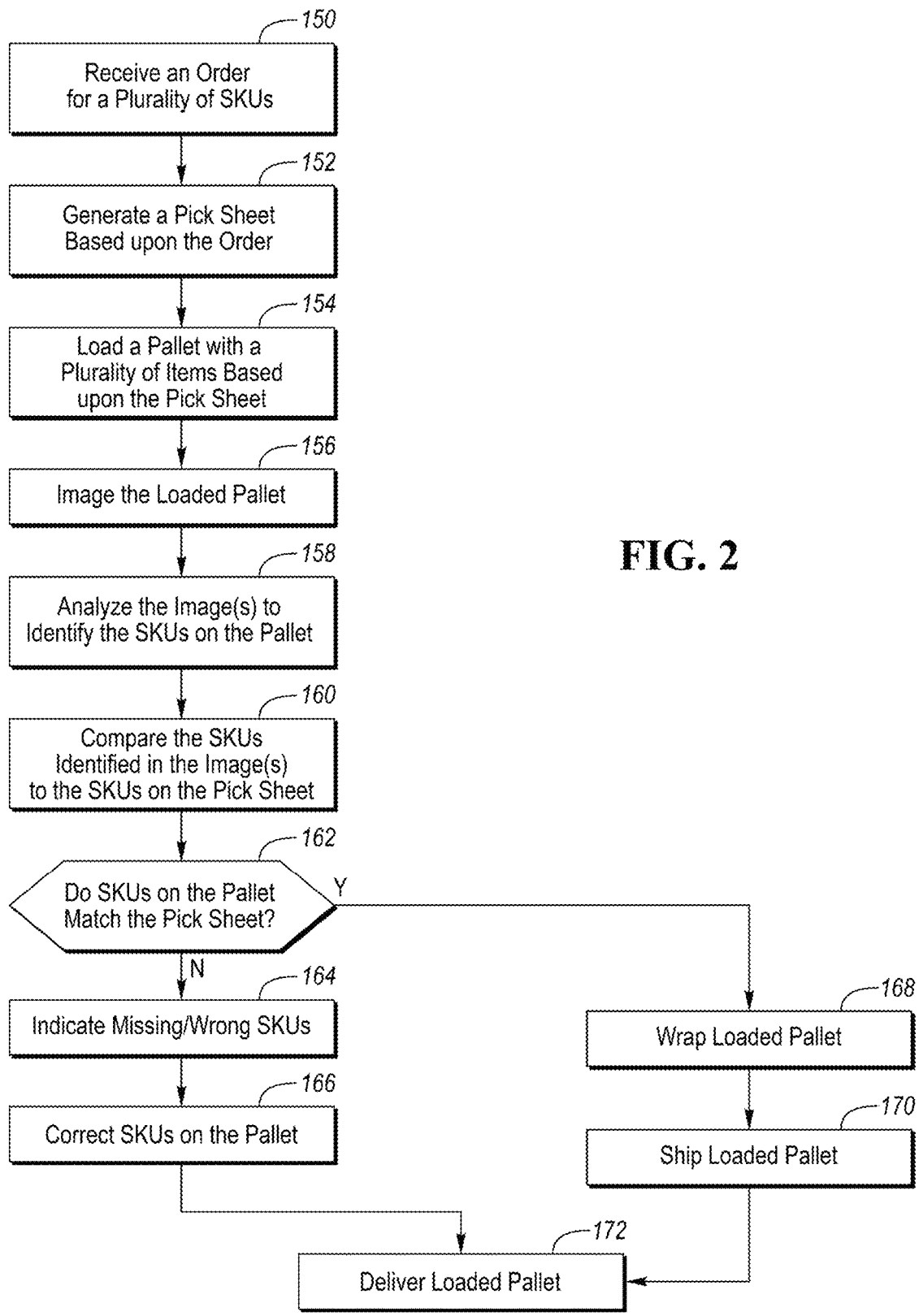
FIG. 2 is a flowchart of one version of a method for delivering items.

Referring to FIG. 1 and also to the flowchart in FIG. 2, an order 60 may be received from a store 16 in step 150. As an example, an order 60 may be placed by a store employee using an app or mobile device 52. The order 60 is sent to the distribution center computer 26 (or alternatively to the server 14, and then relayed to the proper (e.g. closest) distribution center computer 26). The distribution center computer 26 analyzes the order 60 and creates a pick sheet 64 associated with that order 60 in step 152. The pick sheet 64 assigns each of the SKUs (including the quantity of each SKU) from the order. The pick sheet 64 specifies how many pallets 22 will be necessary for that order (as determined by the DC computer 26). The DC computer 26 may also determine which SKUs should be loaded near one another on the same pallet 22, or if more than one pallet 22 will be required, which SKUs should be loaded together on the same pallet 22. For example, SKUs that go in the cooler may be together on the same pallet (or near one another on the same pallet), while SKUs that go on the shelf may be on another part of the pallet (or on another pallet, if there is more than one). If the pick sheet 64 is created on the DC computer 26, it is copied to the server 14. If it is created on the server 14, it is copied to the DC computer 26.

Figure 3:
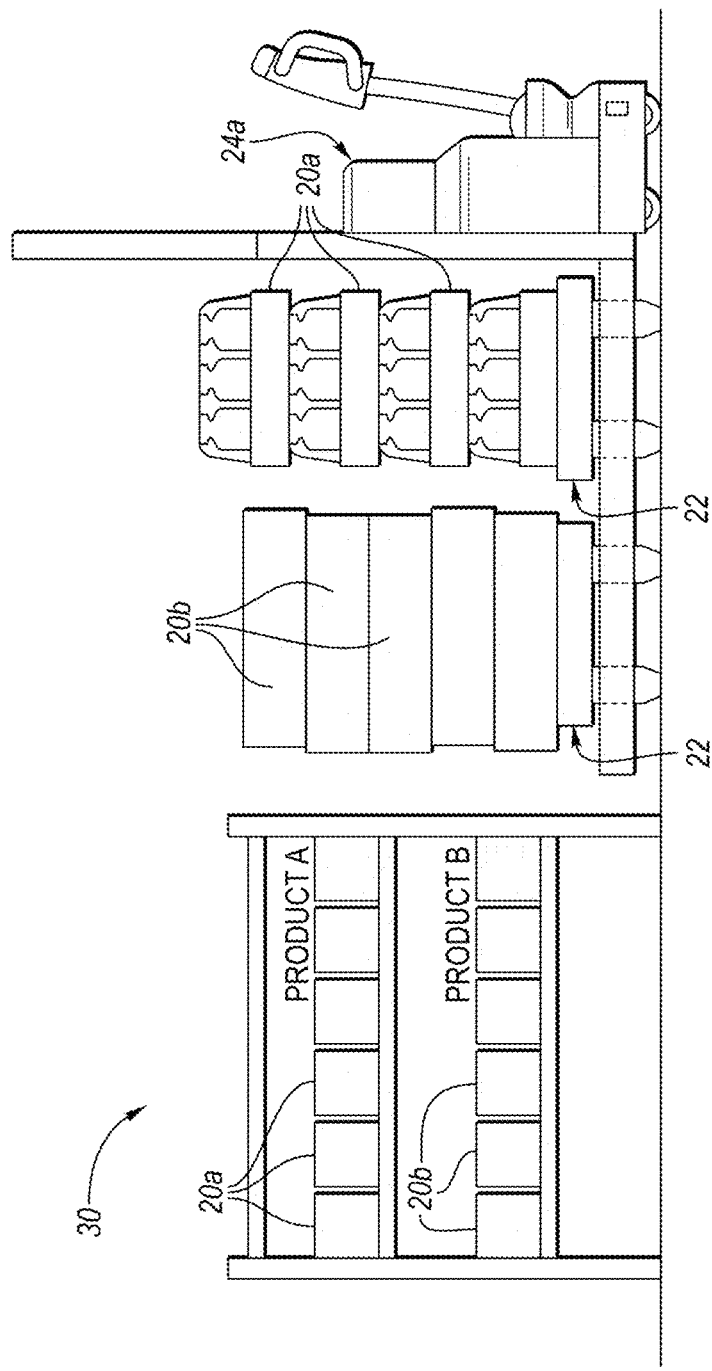
FIG. 3 shows an example loading station of the delivery system of FIG. 1.

FIG. 3 shows the pick station 30 of FIG. 1. Referring to FIGS. 1 and 3, workers at the distribution center read the palled id (e.g. via rfid, barcode, etc) on the pallet(s) 22 on a pallet jack 24a, such as with a mobile device or a reader on the pallet jack 24a. In FIG. 3, two pallets 22 are on a single pallet jack 24a. Shelves may contain a variety of items 20 for each SKU, such as first product 20a of a first SKU and a second product 20b of a second SKU (collectively "products 20"). A worker reading a computer screen or mobile device screen displaying from the pick sheet 64 retrieves each product 20 and places that product 20 on the pallet 22. Alternatively, the pallet 22 may be loaded by automated handling equipment.

Workers place items 20 on the pallets 22 according to the pick sheets 64 and report the palled ids to the DC computer 26 in step 154 (FIG. 2). The DC computer 26 dictates merchandizing groups and sub groups for loading items 20a, b on the pallets 22 in order to make unloading easier at the store. In the example shown, the pick sheets 64 dictate that products 20a are on one pallet 22 while products 20b are on another pallet 22. For example, cooler items should be grouped and dry items should be grouped. Splitting of package groups is also minimized to make unloading easer. This makes pallets 22 more stable too.

The DC computer 26 records the pallet ids of the pallet(s) 22 that have been loaded with particular SKUs for each pick sheet 64. The pick sheet 64 may associate each pallet id with each SKU.

After being loaded, each loaded pallet 22 is validated at the validation station 32, which may be adjacent to or part of the pick station 30. As will be described in more detail below, at least one still image, and preferably several still images or video, of the products 20 on the pallet 22 is taken at the validation station 32 in step 156 (FIG. 2). The pallet id of the pallet 22 is also read. The images are analyzed to determine the SKUS of the products 20 that are currently on the identified pallet 22 in step 158. The SKUs of the products 20 on the pallet 22 are compared to the pick sheet 64 by the DC computer 26 in step 160, to ensure that all the SKUs associated with the pallet id of the pallet 22 on the pick sheet 64 are present on the correct pallet 22, and that no additional SKUs are present. Several ways of performing the aforementioned steps are disclosed below.

Figure 5:
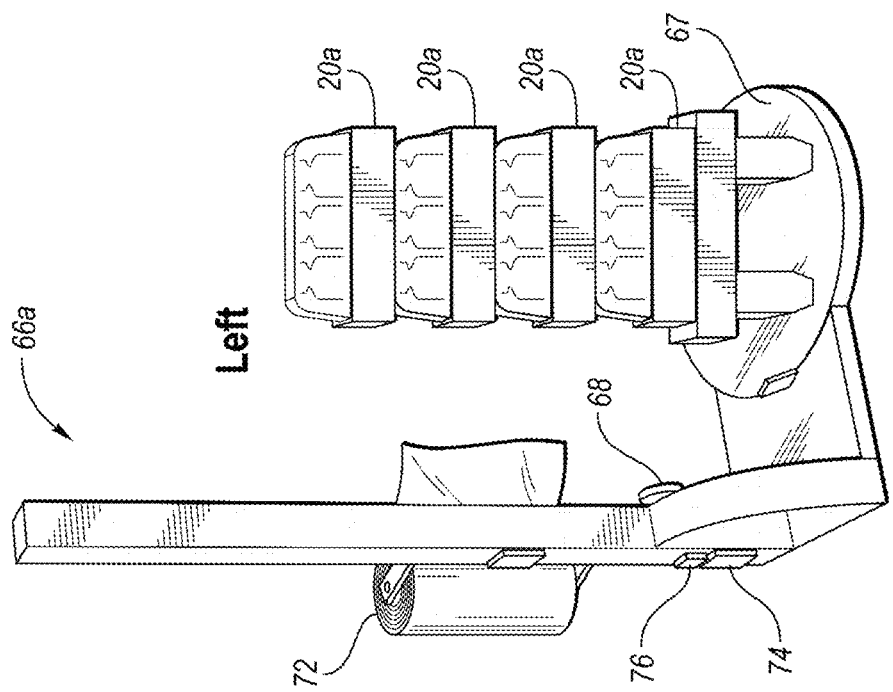
FIG. 5 is another view of the example validation system of FIG. 4 with a loaded pallet thereon.
Figure 4:
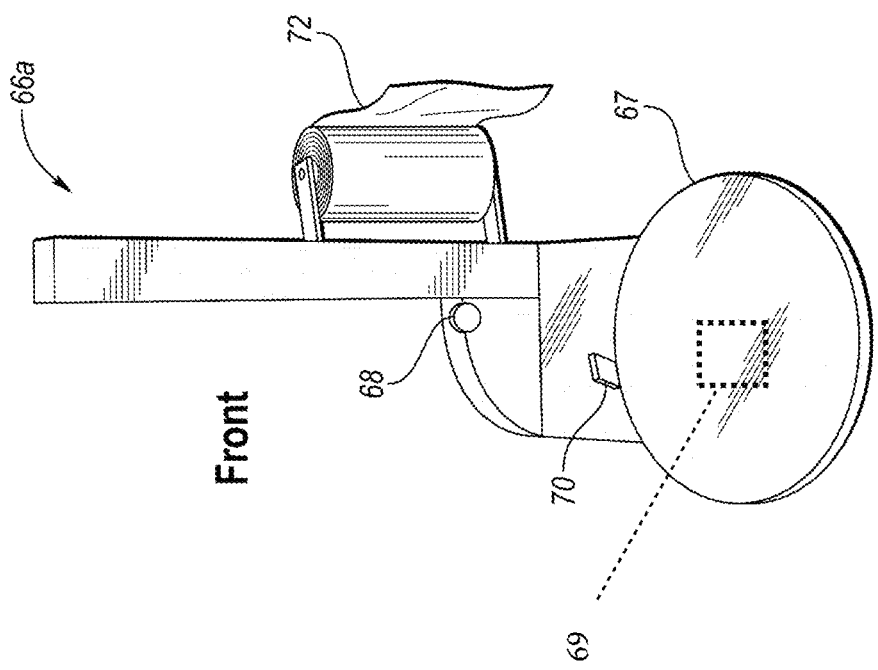
FIG. 4 shows an example validation station of the delivery system of FIG. 1.

First, referring to FIGS. 4 and 5, the validation station may include a CV/RFID semi-automated wrapper 66a with turntable 67 that is fitted with a camera 68 and rfid reader 70 (and/or barcode reader). The wrapper 66a holds a roll of translucent, flexible, plastic wrap or stretch wrap 72. As is known, a loaded pallet 22 can be placed on the turntable 67, which rotates the loaded pallet 22 as stretch wrap 72 is applied. The camera 68 may be a depth camera. In this wrapper 66a, the camera 68 takes at least one image of the loaded pallet 22 while the turntable 67 is rotating the loaded pallet 22, prior to or while wrapping the stretch wrap 72 around the loaded pallet 22. Images/video of the loaded pallet 22 after wrapping may also be generated. As used herein, "image" or "images" refers broadly to any combination of still images and/or video, and "imaging" means capturing any combination of still images and/or video. Again, preferably 2 to 4 still images, or video, are taken. Most preferably, one still image of each of the four sides of a loaded pallet 22 is taken.

In one implementation, the camera 68 may be continuously determining depth while the turntable 67 is rotating. When the camera 68 detects that the two outer ends of the pallet 22 are equidistant (or otherwise that the side of the pallet 22 facing the camera 68 is perpendicular to the camera 68 view), the camera 68 records a still image. The camera 68 can record four still images in this manner, one of each side of the pallet 22.

The rfid reader 70 (or barcode reader, or the like) reads the pallet id (a unique serial number) from the pallet 22. The wrapper 66a includes a local computer 74 in communication with the camera 68 and rfid reader 70. The computer 74 can communicate with the DC computer 26 (and/or server 14) via a wireless network card 76. The image(s) and the pallet id are sent to the server 14 via the network card 76 and associated with the pick list 64 (FIG. 1). Optionally, a weight sensor 69 can be added to the turntable 67 and the known total weight of the products 20 and pallet 22 can be compared to the measured weight on the turntable 67 for confirmation. An alert is generated if the total weight on the turntable 67 does not match the expected weight (i.e. the total weight of the pallet plus the known weights for the SKUs for that pallet id on the pick sheet). Other examples using the weight sensor 69 are provided below.

As an alternative, the turntable 67, camera 68, rfid reader 70, and computer 74 of FIGS. 3 and 4 can be used without the wrapper. The loaded pallet 22 can be placed on the turntable 67 for validation only and can be subsequently wrapped either manually or at another station.

Alternatively, the validation station can include the camera 68 and rfid reader 70 (or barcode reader, or the like) mounted to a robo wrapper (not shown). As is known, instead of holding the stretch wrap 72 stationary and rotating the pallet 22, the robo wrapper travels around the loaded pallet 22 with the stretch wrap 72 to wrap the loaded pallet 22. The robo wrapper carries the camera, 68, rfid reader 70, computer 74 and wireless network card 76.

Figure 6:
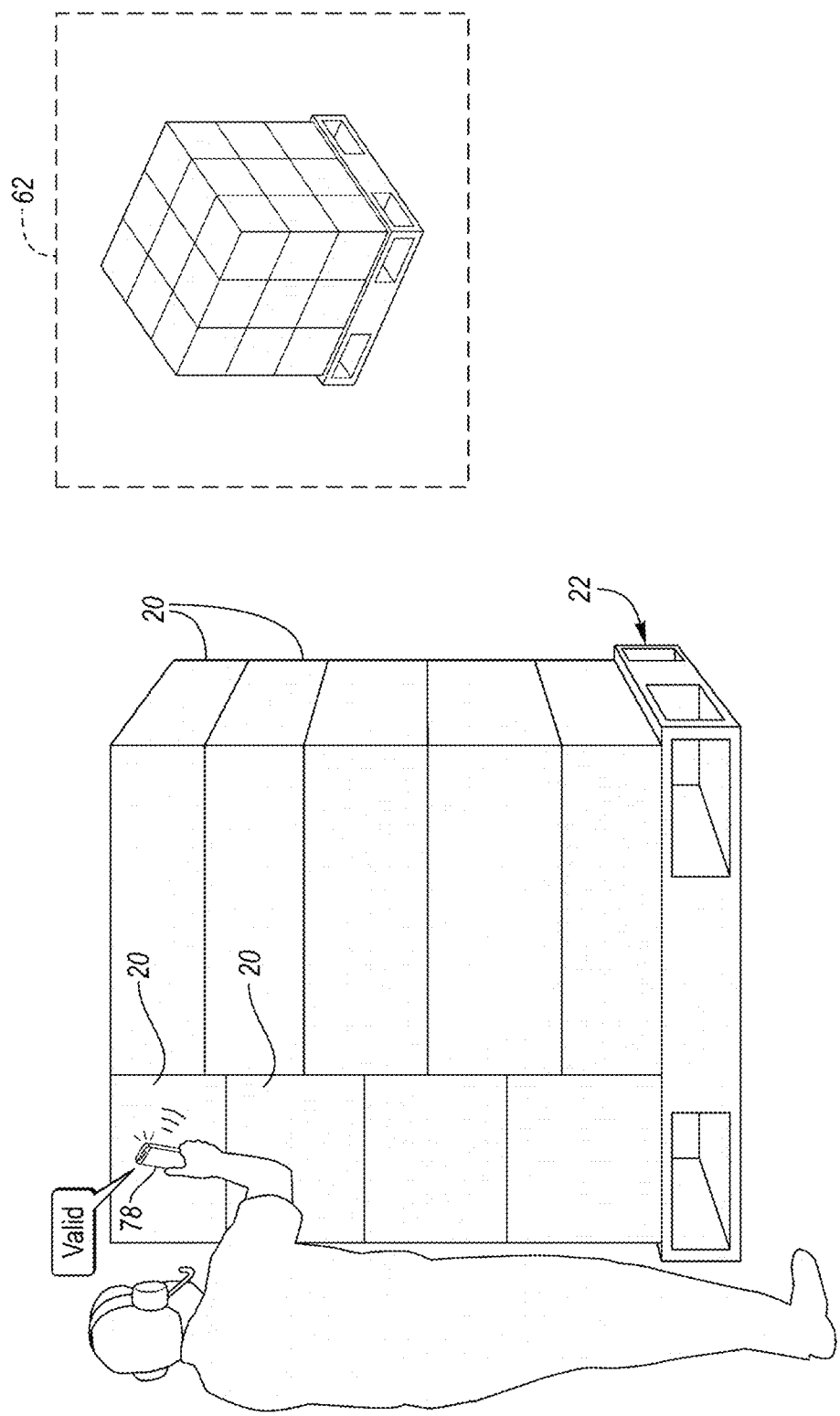
FIG. 6 shows yet another example validation system of the delivery system of FIG. 1.

Alternatively, referring to FIG. 6, the validation station can include a worker with a networked camera, such as on a mobile device 78 (e.g. smartphone or tablet) for taking one or more images 62 of the loaded pallet 22, prior to wrapping the loaded pallet 22. Again, preferably, one image of each face of the loaded pallet 22 is taken. Note that FIG. 6 shows a full-size pallet (e.g. 40×48 inches). Any imaging method can be used with any pallet size, but a full-size pallet is shown in FIG. 6 to emphasize that the inventions herein can also be used with full-size pallets, although with some modifications.

Other ways can be used to gather images of the loaded pallet. In any of the methods, the image analysis and/or comparison to the pick list is performed on the DC computer 26, which has a copy of the machine learning models. Alternatively, the analysis and comparison can be done on the server 14, locally on a computer 74, or on the mobile device 78, or on another locally networked computer.

As mentioned above, the camera 68 (or the camera on the mobile device 78) can be a depth camera, i.e. it also provides distance information correlated to the image (e.g. pixel-by-pixel distance information or distance information for regions of pixels). Depth cameras are known and utilize various technologies such as stereo vision (i.e. two cameras) or more than two cameras, time-of-flight, or lasers, etc. If a depth camera is used, then the edges of the products stacked on the pallet 22 are easily detected (i.e. the edges of the entire stack and possibly edges of individual adjacent products either by detecting a slight gap or difference in adjacent angled surfaces). Also, the depth camera 68 can more easily detect when the loaded pallet 22 is presenting a perpendicular face to the view of the camera 68 for a still image to be taken.

However the image(s) of the loaded pallet 22 are collected, the image(s) are then analyzed to determine the sku of every item 20 on the pallet 22 in step 158 (FIG. 2). Image information, weight and dimensions of all sides of every possible product, including multiple versions of each SKU, if applicable, may be stored in the server 14. If multiple still images or video are collected, then the known dimensions of the pallet 22 and the items 20 are used to ensure that every item 20 is counted once and only once. For example, the multiple sides of the loaded pallet 22 may be identified in the images first. Then, the layers of items 20 are identified on each side. The individual items 20 are then identified on each of the four sides of the loaded pallet 22.

Figure 7:
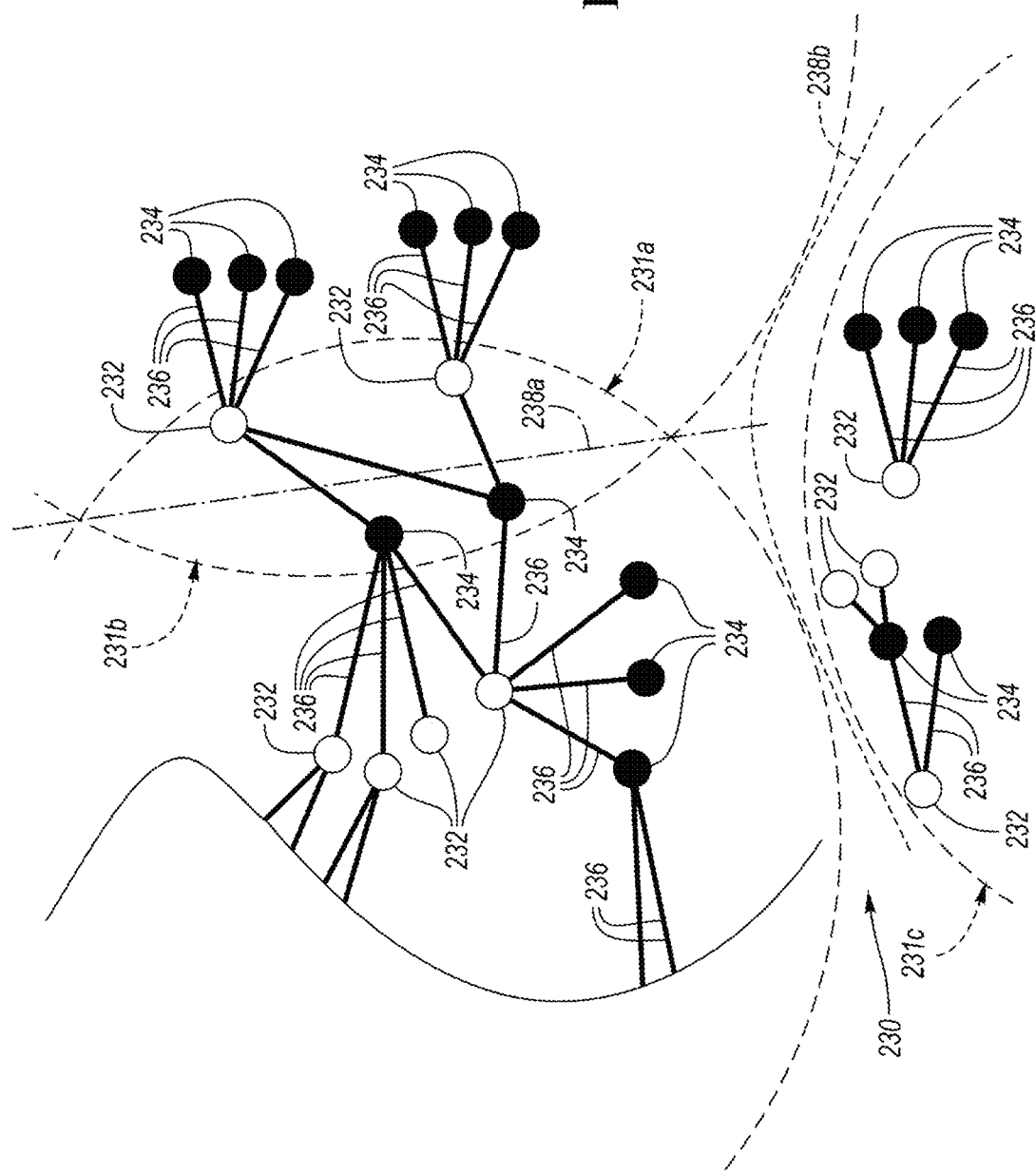
FIG. 7 shows portions of a plurality of machine learning models.

FIG. 7 shows a portion of a brand model map 230 containing the machine learning models for the brand identification, in this example brand models 231a, 231b, 231c. In FIG. 7, each white node is a brand node 232 that represents a particular brand and each black node is a package node 234 that represents a package type. Each edge or link 236 connects a brand node 232 to a package node 234, such that each link 236 represents a SKU. Each brand node 232 may be connected to one or more package nodes 234 and each package node 234 may connect to one or more brand nodes 232.

In practice, there may be hundreds or thousands of such SKUs and there would likely be two to five models 231. If there are even more SKUs, there could be more models 231. FIG. 7 is a simplified representation showing only a portion of each brand model 231a, 231b, 231c. Each model may have dozens or even hundreds of SKUs.

Within each of models 231a and 231b, all of the brand nodes 232 and package nodes 234 are connected in the graph, but this is not required. In fact, there may be one or more (four are shown) SKUs that are in both models 231a and 231b. There is a cut-line 238a separating the two models 231a and 231b. The cut-line 238a is positioned so that it cuts through as few SKUs as possible but also with an aim toward having a generally equal or similar number of SKUs in each model 231. Each brand node 232 and each package node 234 of the SKUs along the cut-line 238a are duplicated in both adjacent models 231a and 231b. For the separation of model 231c from models 231a and 231b, it was not necessary for the cut line 238b to pass through (or duplicate) any of the SKUs or nodes 232, 234.

In this manner, the models 231a and 231b both learn from the SKUs along the cut 238a. The model 231b learns more about the brand nodes 232 in the overlapping region because it also learns from those SKUs. The model 231a learns more about the package types 234 in the overlapping region because it also learns from those SKUs. If those SKUs were only placed in one of the models 231a, 231b, then the other model would not have as many samples from which to learn.

In brand model 231c, for example, as shown, there are a plurality of groupings of SKUs that do not connect to other SKUs, i.e. they do not share either a brand or a package type. The model 231c may have many (dozens or more) of such non-interconnected groupings of SKUs. The model 231a and the model 231b may also have some non-interconnected groupings of SKUs (not shown).

Figure 8:
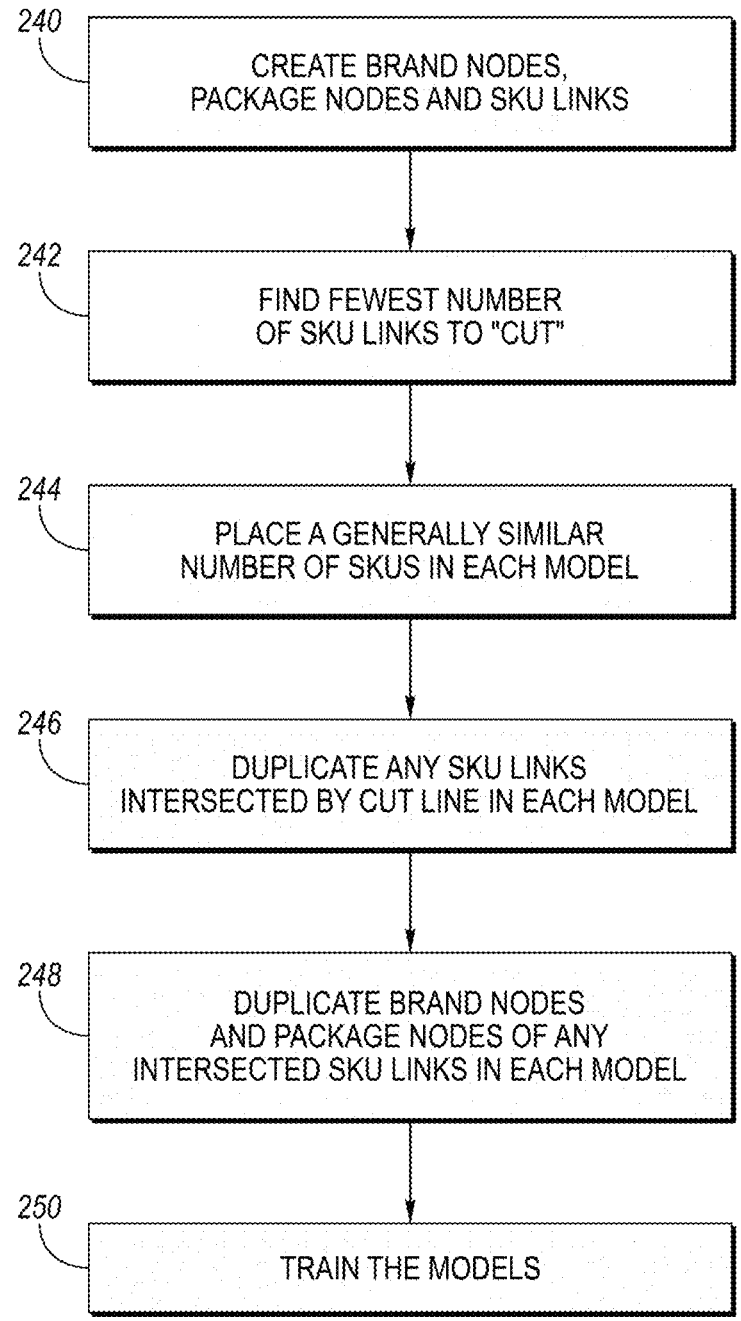
FIG. 8 is a flowchart showing a method for creating the machine learning models of FIG. 7.

Referring to FIGS. 7 and 8, the process for creating the models 231 is automated and performed in the central server 14 or the DC computer 26 (FIG. 1). In particular, this is the process for creating the brand models. There would be one model for determining package type and then depending on how many brands there are, the SKUs are separated into multiple separate machine learning models for the brands.

This process is performed initially when creating the machine learning models and again when new SKUs are added. Initially, a target number of SKUs per model or a target number of models may be chosen to determine a target model size. Then the largest subgraph (i.e. a subset of SKUs that are all interconnected) is compared to the target model size. If the largest subgraph is within a threshold of the target model size, then no cuts need to be made. If the largest subgraph is more than a threshold larger than the target model size, then the largest subgraph will be cut according to the following method. In step 240, the brand nodes 232, package nodes 234, and SKU links 236 are created. In steps 242 and 244, the cut line 238 is determined as the fewest numbers of SKU links 236 to cut (cross), while placing a generally similar number of SKUs in each model 231. The balance between these two factors may be adjusted by a user, depending on the total number of SKUs, for example. In step 246, any SKU links 236 intersected by the "cut" are duplicated in each model 231. In step 248, the brand nodes 232 and package nodes 234 connected to any intersected SKU links 236 are also duplicated in each model 231. In step 250, the models 231 a, b, c are then trained according to one of the methods described herein, such as with actual photos of the SKUs and/or with the virtual pallets.

Referring to FIG. 9, each SKU 290 is also associated with a text description 292, a package type 294 and a brand 296. Each package type 294 corresponds to one of the package nodes 234 of FIG. 7, and each brand 296 corresponds to one of the brand nodes 232 of FIG. 7. Therefore, again, each package type 294 may be associated with more than one brand 296, and each brand 296 may be available in more than one package type 294. The package type 294 describes the packaging of the SKU 290. For example 16 OZ_CN_1_24 is a package type 294 to describe sixteen ounce cans with twenty-four grouped together in one case. A case represents the sellable unit that a store can purchase from the manufacturer. The brand 296 is the flavor of the beverage and is marketed separately for each flavor. For example, Pepsi, Pepsi Wild Cherry and Mountain Dew are all "brands." Each flavor of Gatorade is a different "brand."

Each SKU 290 may also be associated with one or more keywords 298 that can be used to distinguish the SKU 290 from another, similar SKU 290. Some of the keywords 298 may be designated as relevant to package type, while others may be designated as relevant to brand.

Figure 10:
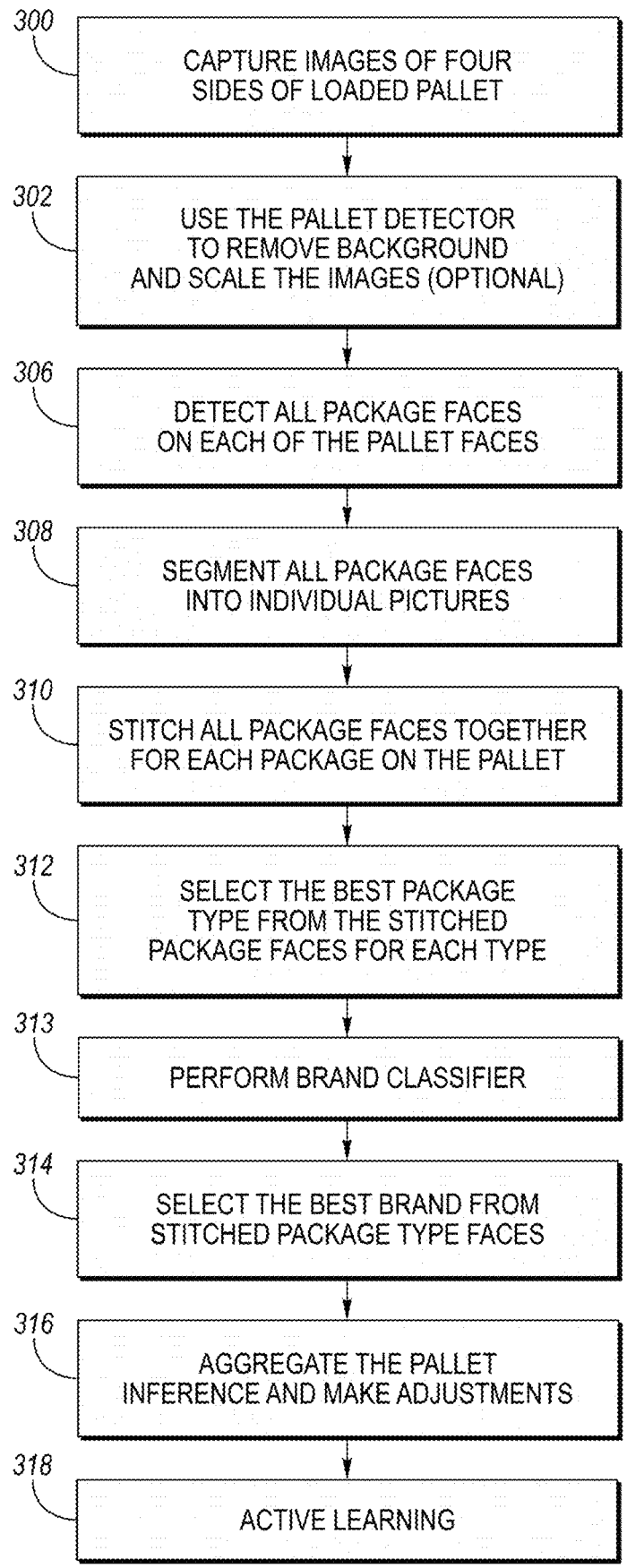
FIG. 10 is a flowchart of a sku identification method.

FIG. 10 shows an example of one method for identifying skus on the loaded pallet 22. In step 300, images of four sides of the loaded pallet 22 are captured according to any method, such as those described above.

FIG. 10 depicts optional step 302, in which the pallet detector module is used to remove the background and to scale the images. The pallet detector uses a machine learning object detector model that detects all of the products on the pallet 22 as a single object. The model is trained using the same virtual pallets and real pallet images that also used for the package detector but labeled differently. The pallet detector is run against each of the four images of the pallet faces. The background is blacked out so that product not on the pallet 22 is hidden from the package detector inference run later. This prevents mistakenly including skus that are not on the pallet. The left and right pallet faces are closer to the camera than the front and back faces. This causes the packages on the left and right face to look bigger than the packages on the front and back faces. The pallet detector centers and scales the images so that the maximum amount of product is fed to the pallet detector model. Again this step of blacking out the background and scaling the images is optional.

Figure 11:
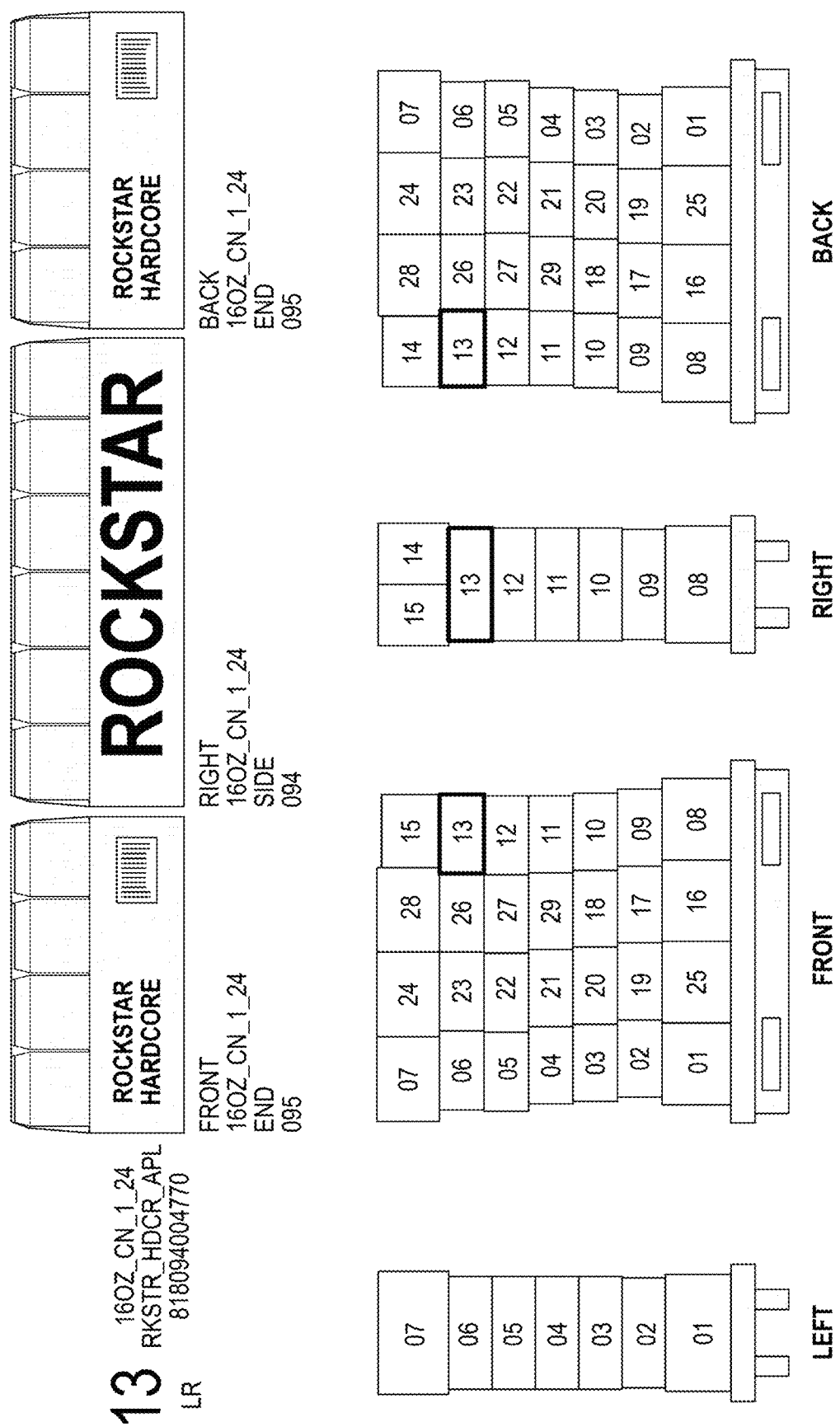
FIG. 11 illustrates the step of detecting the package faces on each side of the stack of items.

Referring to FIGS. 10 and 11, in step 306, a machine learning object detector detects all the package faces on the four pallet faces. The package type is independent from the brand. Package types are rectangular in shape. The long sides are called "SIDE" package faces and the short sides are called "END" package faces. In step 308, all package faces are segmented into individual pictures as shown in FIG. 11, so that the brand can be classified separately from package type. This is repeated for all four pallet faces.

Figure 12:
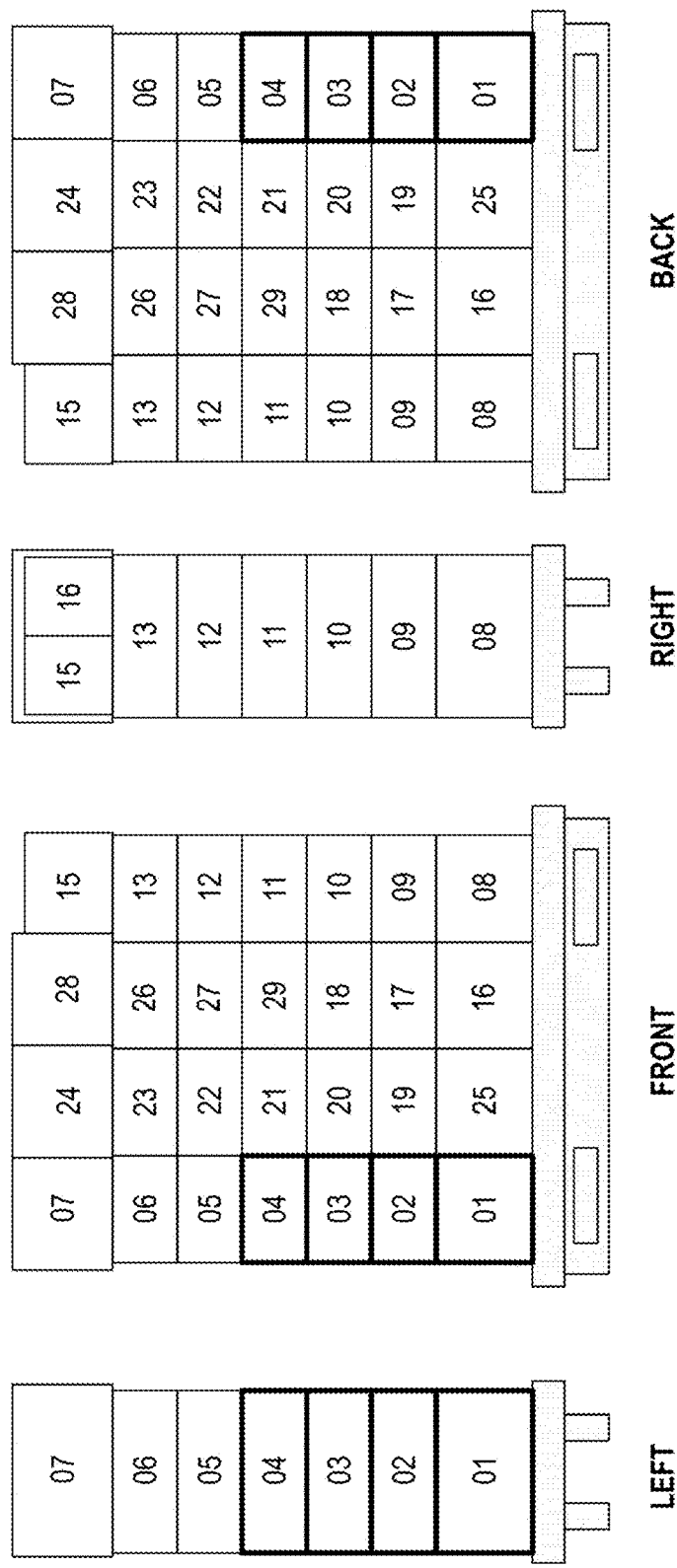
FIG. 12 illustrates four pallet faces of a loaded pallet.

Referring to FIGS. 10 and 12, in step 310, it is determined which package face images belong to the same package through stitching. In this sense, "stitching" means that the images of the same item are associated with one another and with a particular item location on the pallet. Some packages are only visible on one pallet face and only have one image. Packages may have zero to four package faces visible. Packages that are visible on all four pallet faces will have four package face images stitched together. In FIG. 12, the package faces that correspond to the same package are numbered the same.

Figure 12A:
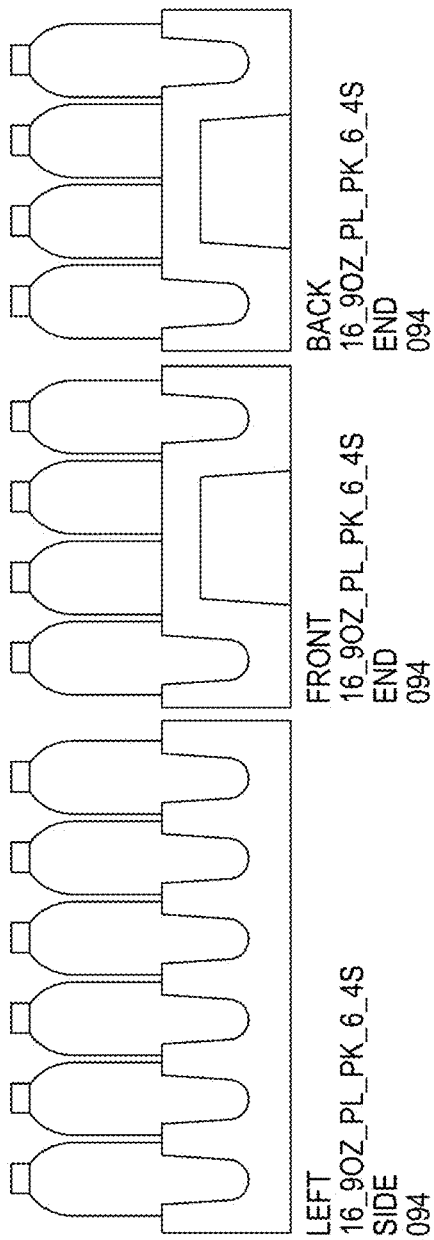
FIG. 12A shows stitching all package faces together for one of the packages from the pallet faces in FIG. 12.
Figure 12B:
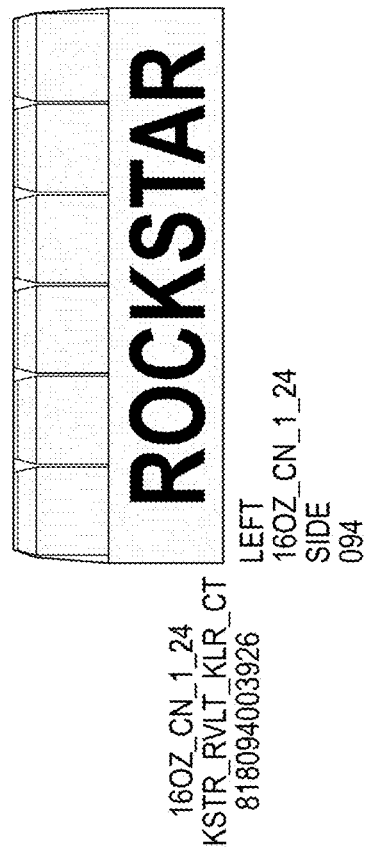
FIG. 12B shows stitching all package faces together for another one of the packages from the pallet faces in FIG. 12.
Figure 12C:
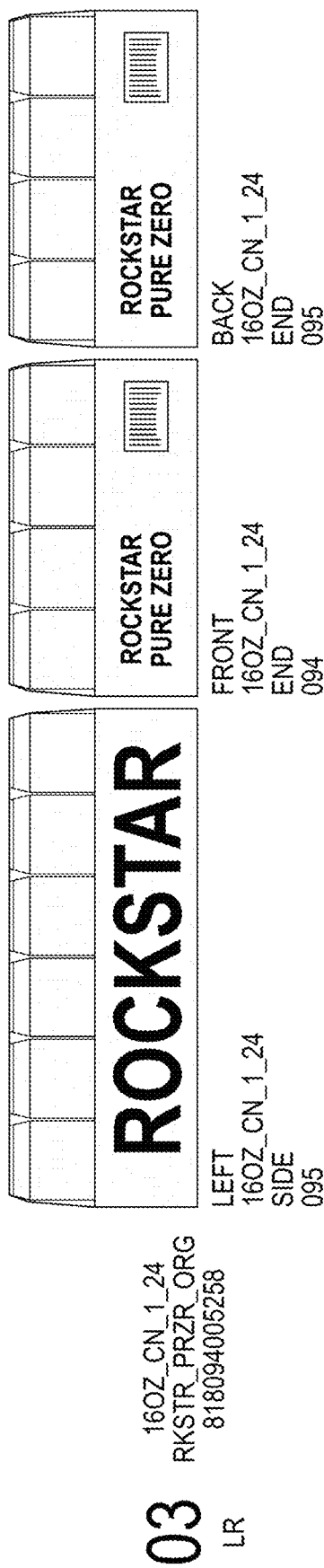
FIG. 12C shows stitching all package faces together for another one of the packages from the pallet faces in FIG. 12.
Figure 12D:
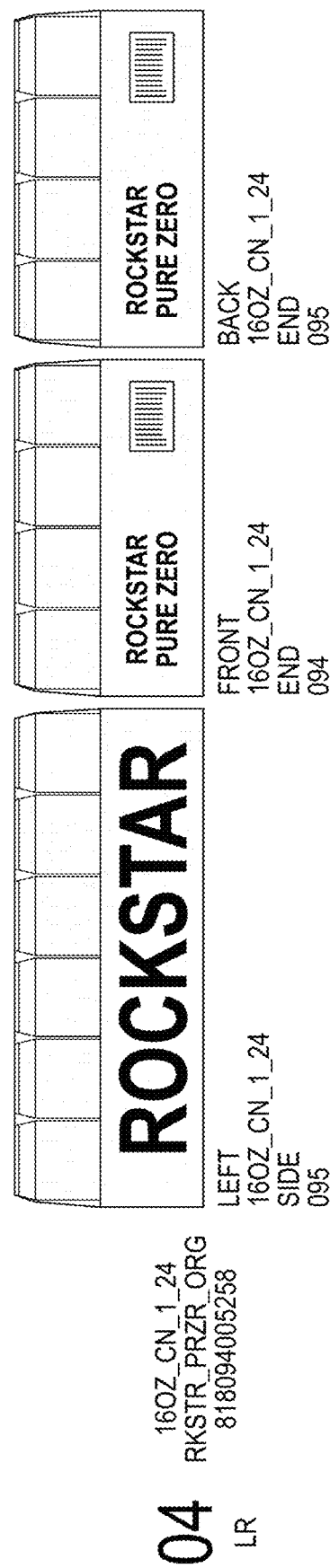
FIG. 12D shows stitching all package faces together for another one of the packages from the pallet faces in FIG. 12.

FIG. 12A shows the three package faces for product 01 from FIG. 12. FIG. 12B shows the three package faces for product 02 from FIG. 12. FIG. 12C shows the three package faces for produce 03 from FIG. 12. FIG. 12D shows the three package faces for product 04 from FIG. 12.

Referring to FIGS. 10, 13, and 14 in step 312, the package type of each product is inferred for each of the (up to four) possible package faces, using a machine learning model for determining package type. The package type machine learning model infers at least one package type based upon each package face independently and generates an associated confidence level for that determined package type for that package face. The package type machine learning module may infer a plurality of package types (e.g. five to twenty) based upon each package face with a corresponding confidence level associated with each such inferred package type. In FIGS. 13 and 14, only the highest-confidence package type for each package face is shown.

For each item (i.e. the images stitched together), the package face(s) with lower confident package types are overridden with the highest confident package type out of the package face images for that item. The package type with the highest confidence out of all the package face images for that item is used to override any different package type of the rest of the package faces for that same item.

For the two examples shown in FIGS. 13 and 14, the package face end views may look the same for two SKUs so it is very hard to distinguish the package type from the end views; however, the package face side view is longer for the 32 pack than the 24 pack plus the respective 32 and 24 count is visible on the package and the machine learning module can easily distinguish the difference on the side view between the 24 and 32 pack from the long side view. For example in FIG. 14, the package end face view with a confidence of 62% was overridden by a higher confidence side view image of 98% to give a better package type accuracy. Other package types include reusable beverage crate with certain bottle sizes or can sizes, corrugated tray with translucent plastic wrap a certain bottle or can sizes, or fully enclosed cardboard or paperboard box. Again, "package type" may include a combination of the primary and secondary packaging.

Figure 14A:
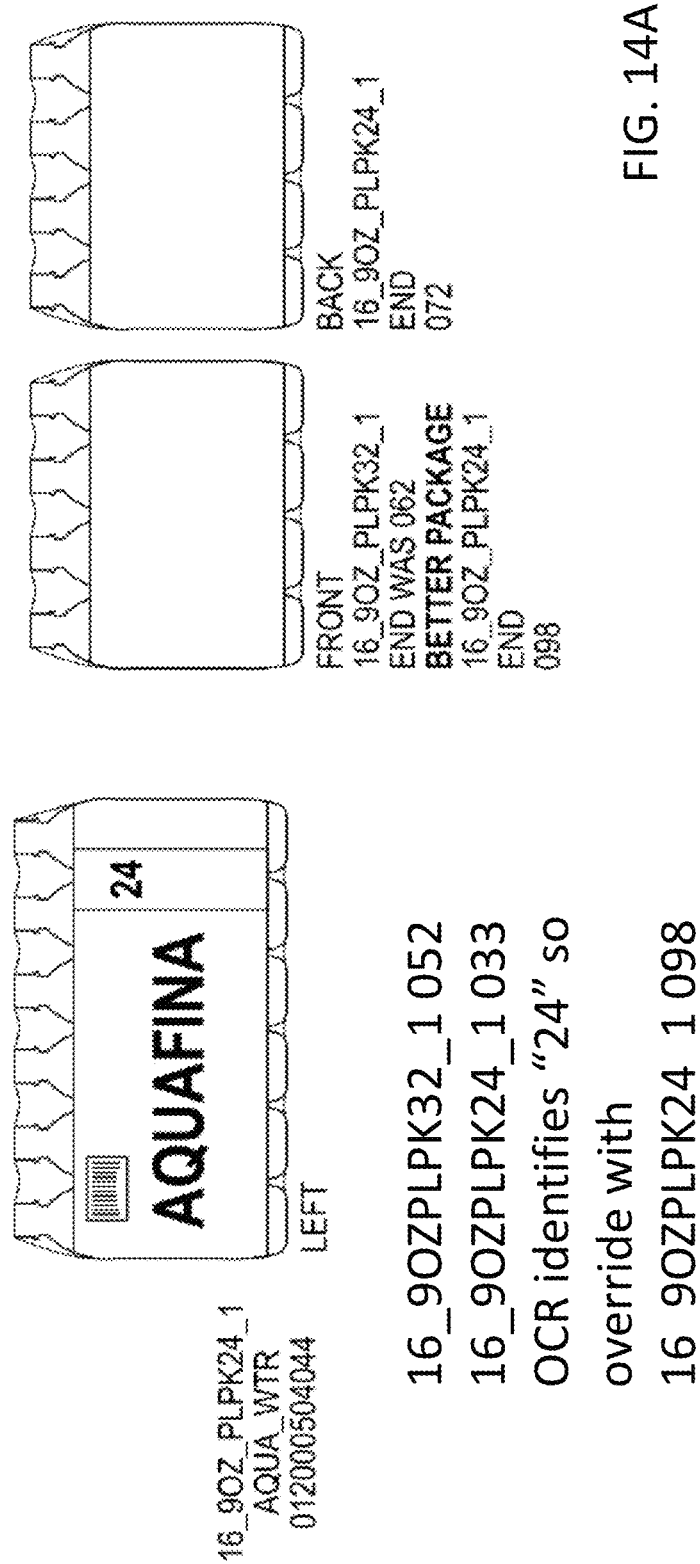
FIG. 14A illustrates the steps of selecting the best package type from the stitched faces in conjunction with OCR.

FIG. 14A shows an optional method for determining the package type of a product. Again, the package type machine learning model infers at least one package type based upon each package face independently and generates an associated confidence level for that determined package type for that package face. The package type machine learning module may infer a plurality of package types (e.g. five to twenty) based upon each package face with a corresponding confidence level associated with each such inferred package type. In FIG. 14A, for the "Left" side of the product, the highest-confidence package type was 16.9 oz bottles in a 32-pack at 52%. The second-highest-confidence package type was 16.9 oz bottles in a 24-pack at 33%. However, the optical character recognition which was run in parallel on the package face images detected a "24" on the left package face and "24" is a keyword associated with the packaging of a 16.9 oz bottle 24-pack. Therefore, the system overrides the package type with the second-highest confidence package type (16.9 oz bottle 24-pack) at a high confidence level (98% in this case). The confidence level of the package type matching the OCR may either be overridden with a high confidence level or may have its confidence level increased by a set amount (e.g. by adding a significant percentage). The 98% confidence level on the left face is now the highest confidence level of the package faces, so the package type of the front package face is then overridden (as before) with the highest confidence level package type from among all of the visible faces.

If more than one package type is inferred for each of the package faces, each at an associated confidence level, then any of the inferred package types having a matching keyword with the OCR would have its confidence level increased, such as by adding to the confidence level percentage.

In step 313 of FIG. 10, for each package face, a brand model (e.g. brand models 231a, b, or c of FIG. 7) is loaded based upon the package type that was determined in step 312 (i.e. after the lower-confidence package types have been overridden). Some brands are only in their own package types. For example, Gatorade is sold in around a dozen package types but those package types are unique to Gatorade and other Pepsi products are not packaged that way. If it is determined that the package faces of a package have a Gatorade package type then those images are classified using the Gatorade brand model (for example, brand model 231c of FIG. 7). Currently, the brand model for Gatorade contains over forty flavors that can be classified. It is much more accurate to classify a brand from forty brands than to classify a brand from many hundreds or more than a thousand of brands, which is why the possibilities are first limited by the inferred package type.

The machine learning model (e.g. models 231a, b, or c of FIG. 7) that has been loaded based upon package type infers a brand independently for each package face of the item and associates a confidence level with that inferred brand for each package face. Initially, at least, higher-confidence inferred brands are used to override lower-confidence inferred brands of other package faces for the same item. Again, a plurality of brands may be inferred for each package face, each with an associated confidence level.

Figure 14B:
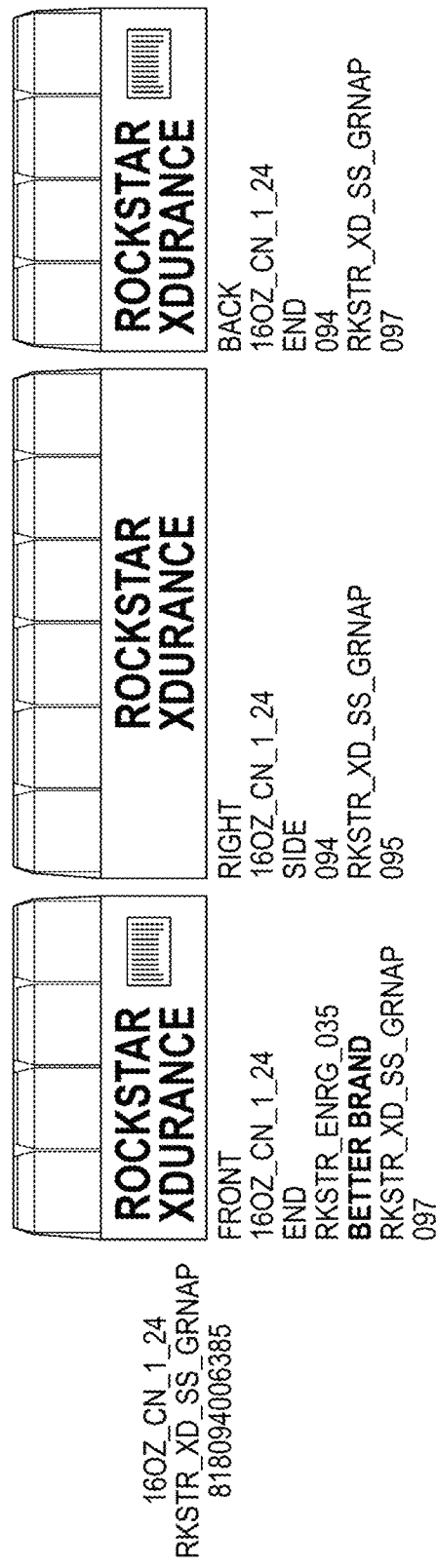
FIG. 14B shows an example of a plurality of stitched images and selecting the best brand from among the plurality of stitched images.

Referring to FIG. 14B, one example was stitched to have the 16 OZ_CN_1_24 package type. The package was visible on three package faces. Based upon the package type model, the inference constantly agreed on this package type on all three faces. The best machine learning model 231a, b or c for brand was loaded based on the package type. If stitching would have overridden a package type for one or more package faces, then the same brand model 231a, b or c would still be used for all of the segmented images based upon the best package type out of all of the segmented images.

The example shown in FIG. 14B shows that the machine learning algorithm first classified the front image to be RKSTR_ENRG with a low 35% confidence. Fortunately, the back image had a 97% confidence of the real brand of RKSTR_XD_SS_GRNAP and the brand on the front image was overridden. At least initially, and except as otherwise described below, the best brand (i.e. highest confidence brand) from all of the stitched package images is used to determine the brand for that item. Having determined all of the package types and then the brands for each item on the pallet, the SKU for each item is determined in step 314 (FIG. 10).

Figure 14C:
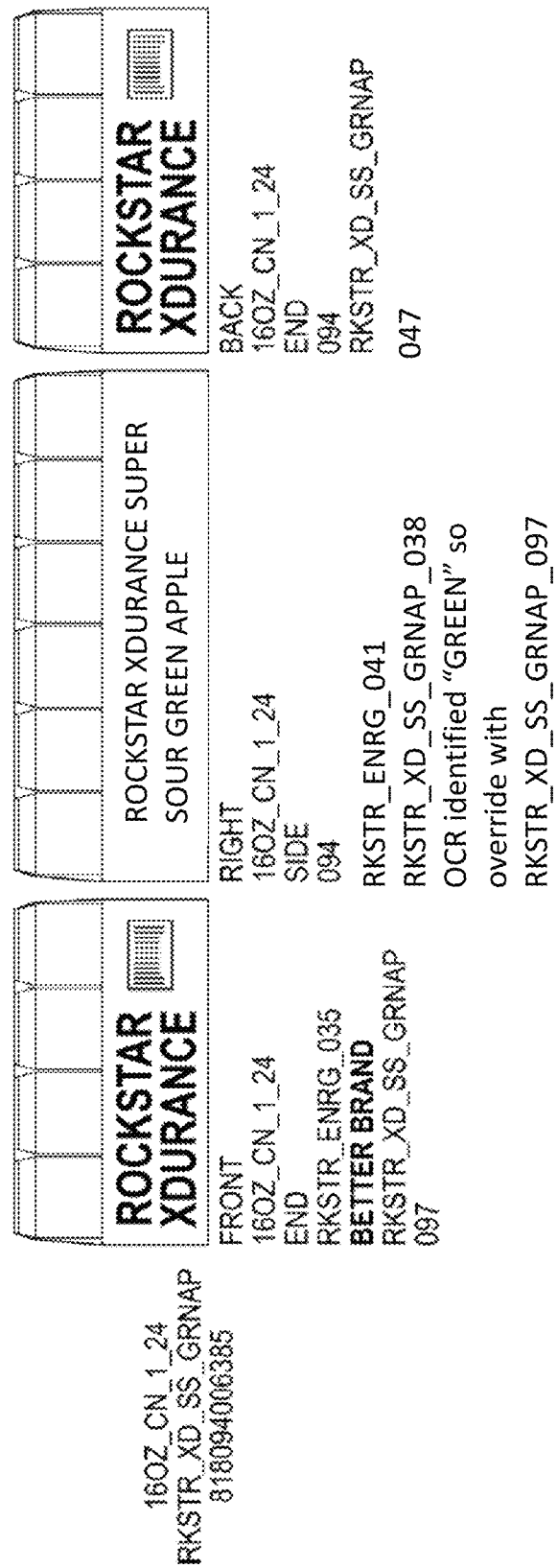
FIG. 14C shows an example of a plurality of stitched images and selecting the best brand from among the plurality of stitched images in conjunction with OCR.

FIG. 14C shows the optional method for determining the brand of the product. Again, in this example the product was stitched to have the 16 OZ_CN_1_24 package type. The package was visible on three package faces. Based upon the package type model, the inference constantly agreed on this package type on all three faces. The best machine learning model 231a, b or c for brand was loaded based on the package type.

The example shown in FIG. 14C shows that the machine learning algorithm first classified the front image to be RKSTR_ENRG with a low 35% confidence. The right image was also classified to be RKSTR_ENRG with a 41% confidence, while RKSTR_XD_SS_GRNAP was inferred at a slightly lower 38% confidence. However, the optical character recognition which was run in parallel on the package face images detected a "GREEN" on the right package face and "GREEN" is a keyword 298 associated with the brand of the RKSTR_XD_SS_GRNAP product (FIG. 9). Therefore, the system augments the highest-level confidence brand on the right face with the RKSTR_XD_SS_GRNAP at 97%. The confidence level of the brand(s) matching the OCR may either be overridden with a high confidence level (e.g. the 97%) or may have its confidence level increased by a set amount (e.g. by adding to the percentage, in this case, adding 59%). This then becomes the high-level confidence among all of the package faces, so it is used to override the brand on the front image.

At least initially, and except as otherwise described herein, the best brand (i.e. highest confidence brand) from all of the stitched package images is used to determine the brand for that item. Having determined all of the package types and then the brands for each item on the pallet, the SKU for each item is determined in step 314 (FIG. 10).

If more than one brand is inferred for each of the package faces, each at an associated confidence level, then any of the inferred brands having a matching keyword with the OCR would have its confidence level increased, such as by adding to the confidence level percentage.

It should be noted that some product is sold to stores in groups of loose packages. All of the packages are counted and divided by the number of packages sold in a case to get the inferred case quantity. The case quantity is the quantity that stores are used to dealing with on orders.

Stitching Half-Pallet Algorithm

One method for stitching the package faces of packages on a half-pallet is described with respect to FIGS. 15A to 15K. Images are obtained of each of four pallet faces, labeled here Left, Right, Front, Back for reference only. The images may be obtained in any of the methods described above, such as from a camera on a pallet wrapper as the stack of packages on the pallet are rotated on the turntable.

In Step 1, referring to FIG. 15A, the position of each product is classified on each of the four pallet faces. Many of the products will have more than one classification (e.g. Left, Bottom). In FIG. 15A:

L—Left: Product is classified on the left edge of the pallet face;

R—Right: Product is classified on the right edge of the pallet face;

M—Middle: Product is classified in the middle of the pallet face;

B—Bottom: Product is classified on the bottom of the pallet face; and

T—Top: Product is classified on the top of the pallet face.

Figure 15B:
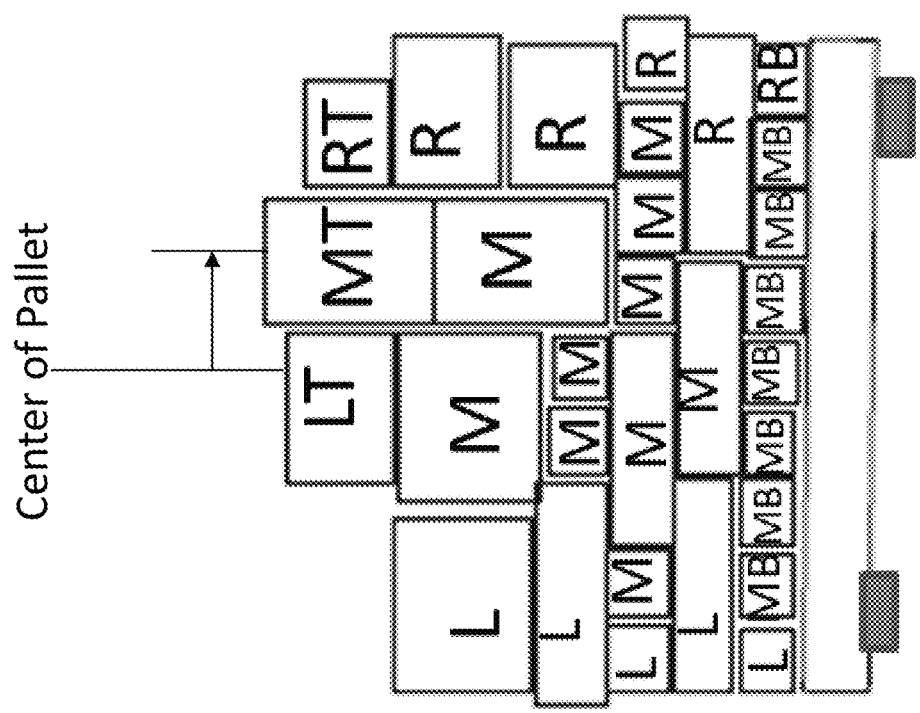
FIG. 15B illustrates a second stitching step for the front pallet face of FIG. 15A in which it is determined which half of the pallet is taller.

FIG. 15B shows Step 2, in which it is determined if the left pallet face or the right pallet face is taller. The left and the right pallet faces are the short sides of the half pallet. Look at the top product on the front pallet face.

First, find the center of the pallet based on all of the bounding boxes on the pallet. The, look at the top center coordinate of the top product to see if it is to the left or the right of the pallet midpoint. The algorithm will proceed with the taller side first. Stitching the tallest side first is helpful for identifying if bounding boxes are real products or ghosts.

Figure 15C:
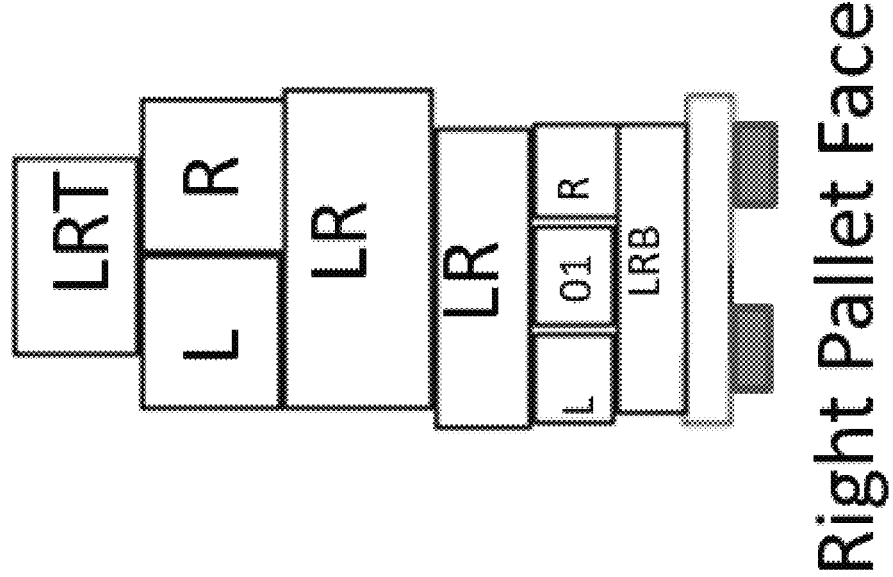
FIG. 15C illustrates a third stitching step shown with respect to the right pallet face of FIG. 15A.

Referring to FIG. 15C for Step 3, on the taller short side pallet face, assign a product Id to any product on the short pallet face that is in the middle. For the example in FIG. 15C, product 01 was assigned to the middle product on the second layer of the right pallet face.

Figure 15D:
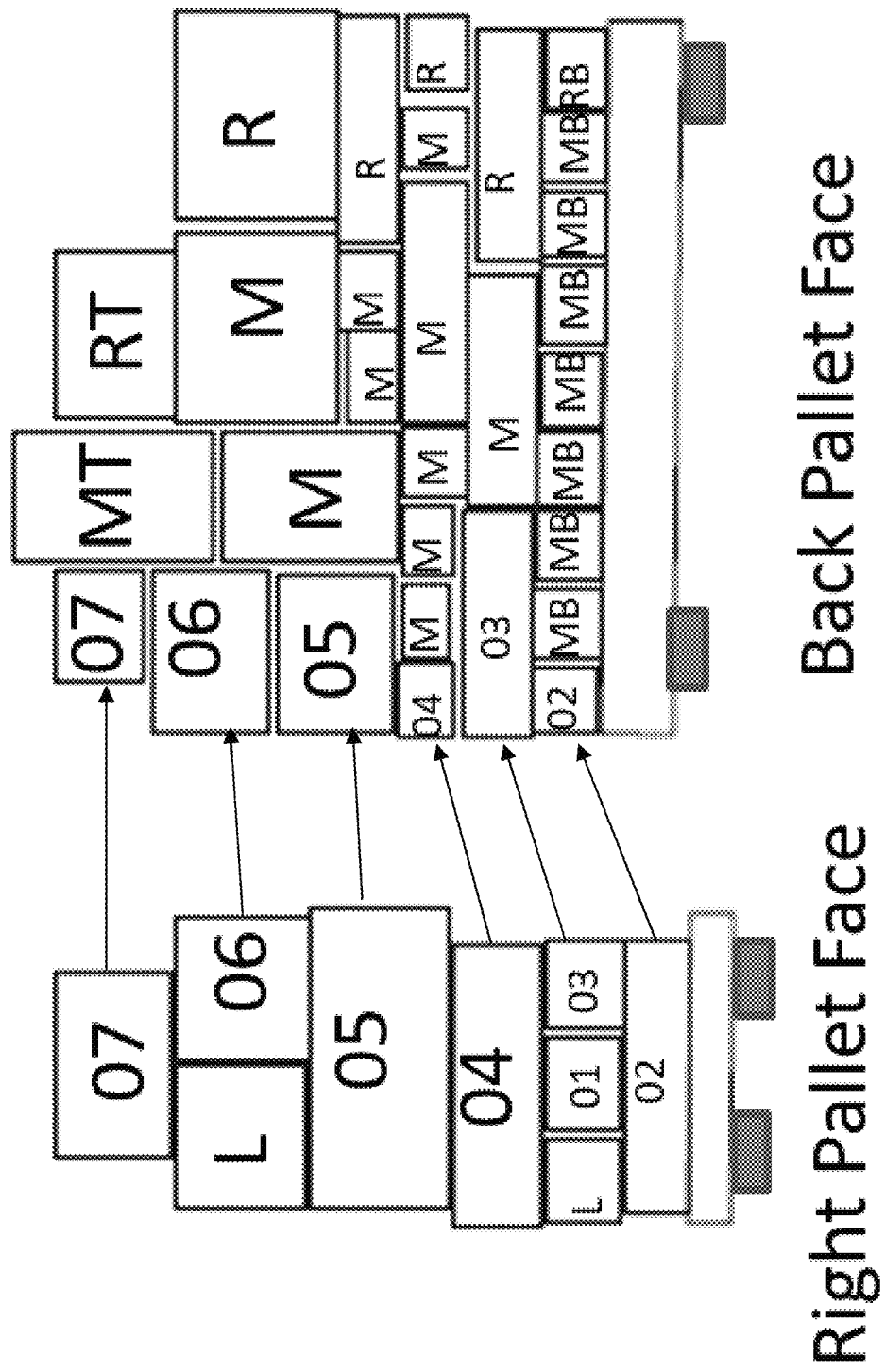
FIG. 15D illustrates a fourth stitching step with respect to the right pallet face and back pallet face of FIG. 15A.

Referring to FIG. 15D for Step 4, link the pallet short side product faces to the long side pallet face based on the column stack sequence of the edge (corner) product. Link the right edge (corner) products of the right pallet face column stack to the left edge (corner) products of the back pallet face. The products (02 to 07) are linked to be the same product based on the stack sequence (e.g. bottom to top).

If the left pallet face had been the taller one then the left edge products of the left pallet face column stack would be linked to the right edge products of the back pallet face.

Figure 15E:
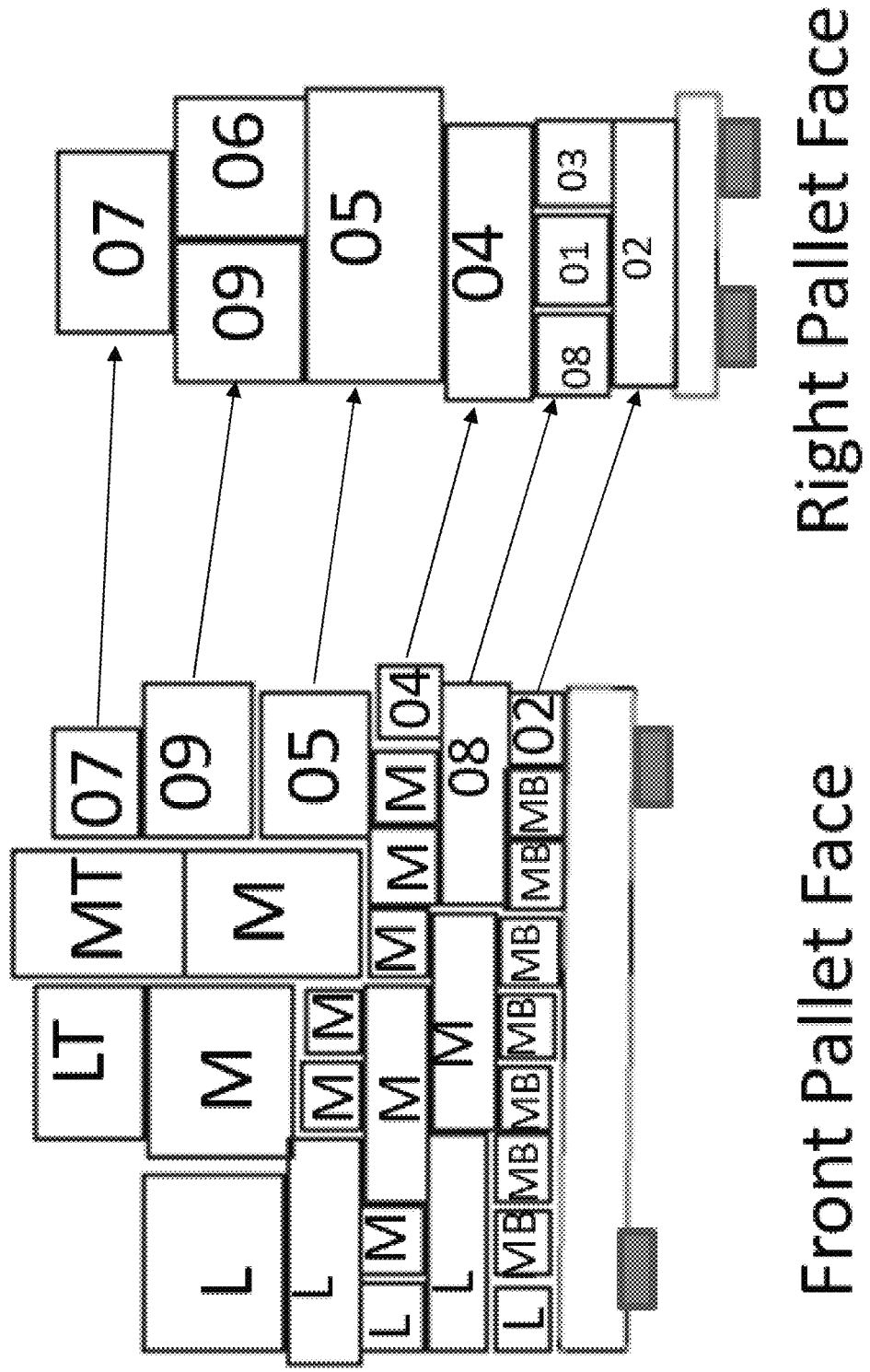
FIG. 15E illustrates a fifth stitching step with respect to the right pallet face and front pallet face of FIG. 15A.

Referring to FIG. 15E for Step 5, the other side of the selected short pallet face is then addressed. The left edge/corner product of the right pallet face column stack to the right edge/corner products of the front pallet face. The products (02, 04, 05, 07, 08, 09) are linked to be the same product based on the stack sequence. Again, if the left pallet face would have been the taller one then the right edge products of the left pallet face column stack to the left edge products of the front pallet face.

Figure 15F:
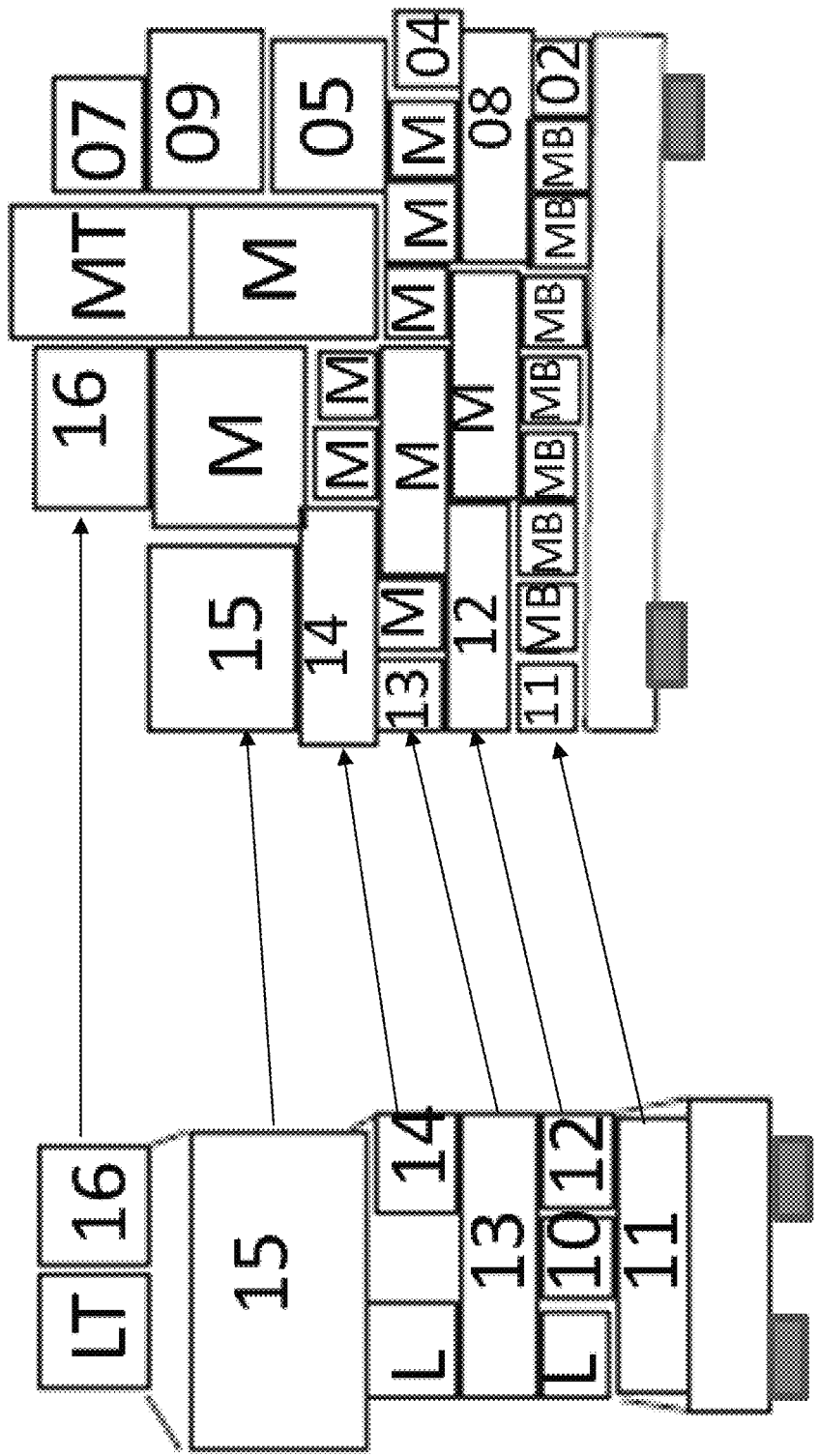
FIG. 15F illustrates sixth and seventh stitching steps with respect to the left pallet face and front pallet face of FIG. 15A.

Next, referring to FIG. 15F, this is repeated for the shorter height short side pallet face (in this case, the left pallet face). In Step 6, add any product that is classified in the middle of the short pallet face. Product 10 was added because it was in the middle between two others. In Step 7, link the pallet short side product faces to the long side pallet face based on the column stack sequence of the edge/corner products. In this example, products 11, 12, 13, 14, 15, 16 are linked.

Figure 15G:
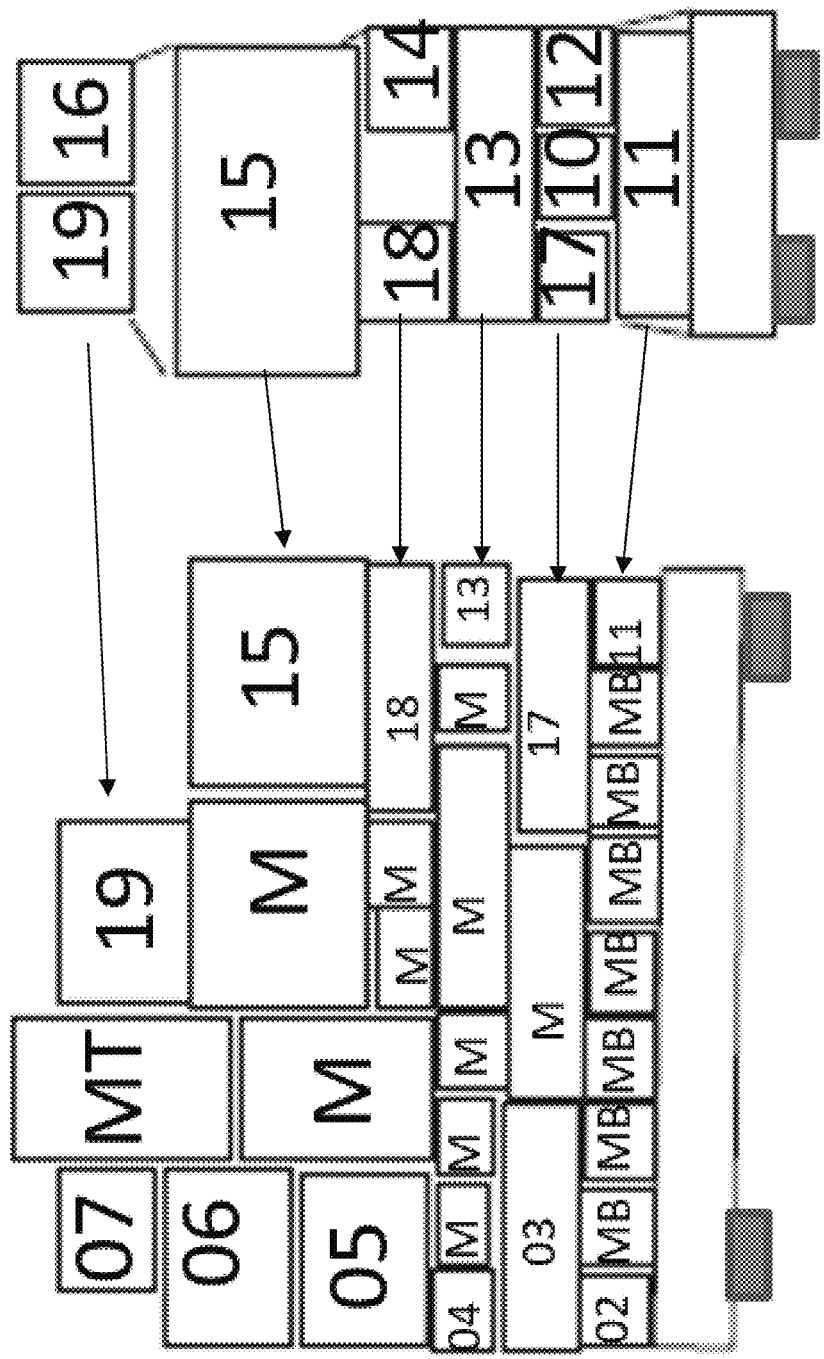
FIG. 15G illustrates an eighth stitching step with respect to the back pallet face and left pallet face of FIG. 15A.

Referring to FIG. 15G, in step 8, this is repeated for the other side of the short pallet face (in this case, the left pallet face). The left edge/corner products of the left pallet face column stack are lined to the right edge/corner products of the back pallet face. The products (11, 17, 13, 18, 15, 19) are linked to be the same product based on the stack sequence.

Figure 15H:
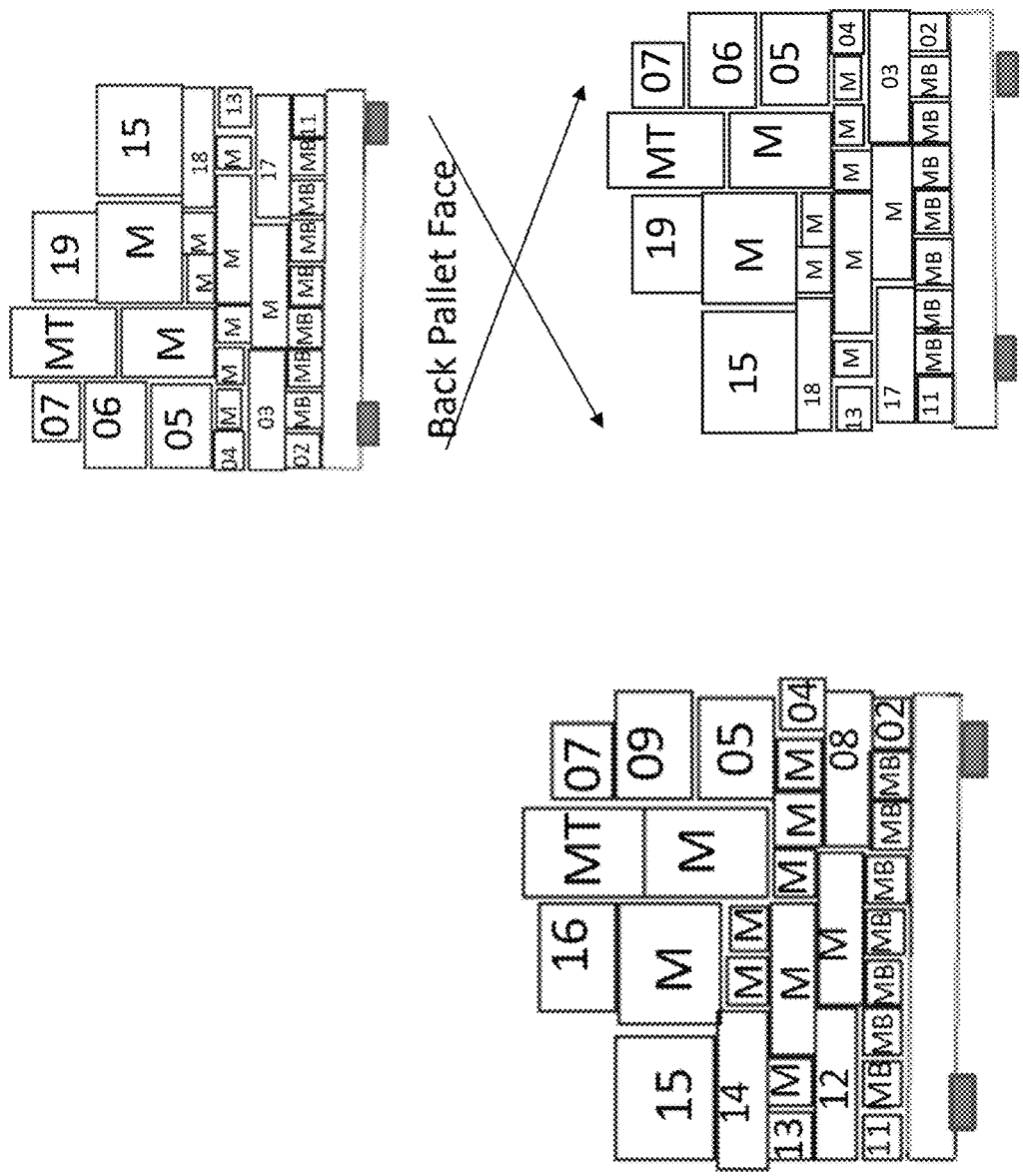
FIG. 15H illustrates a ninth stitching step with respect to the front pallet face and back pallet face of FIG. 15A.

Step 9 is described with reference to FIG. 15H. Nearest Neighbor—First, the algorithm is seeded with a collection of offsets from known coordinates. The algorithm computes factors that scale the product on the back faces to be the same size as the front face. None of the real images are changed in this algorithm, just the data in the model that describes the images. For example, if in the initial images the rectangles are different sizes, then they are scaled to match. In the bottom set of images, the rectangles are the same size.

Additionally, the code virtually flips the back face image left/right so that the product with faces visible on the front and back face will somewhat align. Note the back of the pallet somewhat looks like the mirror image of the front face, especially for the products that have visible faces on both pallet faces.

The algorithm then looks for product that has already been stitched from the short end edge algorithms. For this example, the following product Ids are on both the front and back face: 2, 4, 5, 7, 11, 13, and 15.

The algorithm will recompute the coordinates of the bounding box to correct for not having a square image capture. A small slope is easy to see in the pallet front face image for the example to the left. The slope is calculated and then all the bounding boxes in the images get corrected coordinates by flattening the slope.

Each bounding box may be represented by its point. In this example shown in FIG. 15I, the point is the greatest y coordinate (the bottom of the bounding box) along with the midpoint of the x coordinate.

A collection of offsets is created. Each item in the collection is for a product that has a face visible on both front and back pallet faces and has the coordinates of the point on the front face along with the coordinates of the point from the same product on the back face.

The images of the front and the back will best align for the product at their offset. Often the pallet is not centered, or the image is square to the pallet face, so the offsets are different in different regions of the image.

For this example, the algorithm is seeded with offsets for seven products. If there are no seeds in the algorithm, then we prioritize the first one to be the biggest bounding box area on the bottom of the pallet that has a visible face on both the front and the back of the pallet. We are most likely to stitch that product correctly to start with a good seed. If we are really unlucky and none of the product on the bottom of the pallet have visible faces on the front and back of the pallet then we prioritize the first seed to be the one in the middle of the pallet face with the biggest area. Note: All of the product in the middle of the pallet face have an "M" in the example pictures.

Step 10 is described with respect to FIG. 15I. Nearest Neighbor—Find closest product on the front face to a known offset. The next step is to find the "Nearest Neighbor" or product that is the closest to a known offset from the front face.

The distance is calculated between all the coordinates in the offset list for the front face to all the eligible product on the front face. A product is only eligible if it is in the front face and has a face that is also visible on the back face. The shortest line will link the nearest neighbor to one that we already know the offset coordinates for.

Once the shortest distance product is identified it is assigned a product Id. If that product has a face that is visible on the back, then the closest offset is applied to shift the x and the y coordinate of the mirror image scaled back face. The closest product from the mirror image scaled back face that is also visible on the front face is then linked. Once the images are linked, a product Id is assigned, and the offset is added to the offset list. The offset contains the coordinates of the front that link to the same product as the coordinates on the back.

For this example, product 20 was added to the offset list because the line between 05 and 20 was the shortest one out of all the possible line combinations.

FIG. 15I would not have any lines drawn to the following products: 08, 09, 12, 14 and 16. These products were stitched earlier but do not show a face that is also visible on the back face so they cannot be used to find a new offset.

Figure 15J:
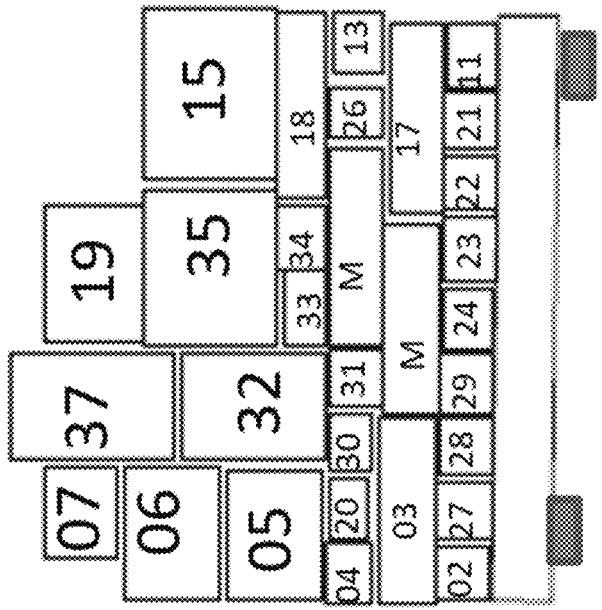
FIG. 15J illustrates an eleventh stitching step with respect to the front pallet space and back pallet face of FIG. 15A.

Step 11 is described with respect to FIG. 15J. Nearest Neighbor—Repeat and then finish the back pallet face. We repeat the nearest neighbor algorithm adding a new known offset for each product on the front pallet face that also has a visible face on the back pallet face. When we are done with the nearest neighbor, we are only left with product that is only visible on the back faces and also hidden product. Assign a product Id to each product that is only visible on the back pallet face.

Figure 15K:
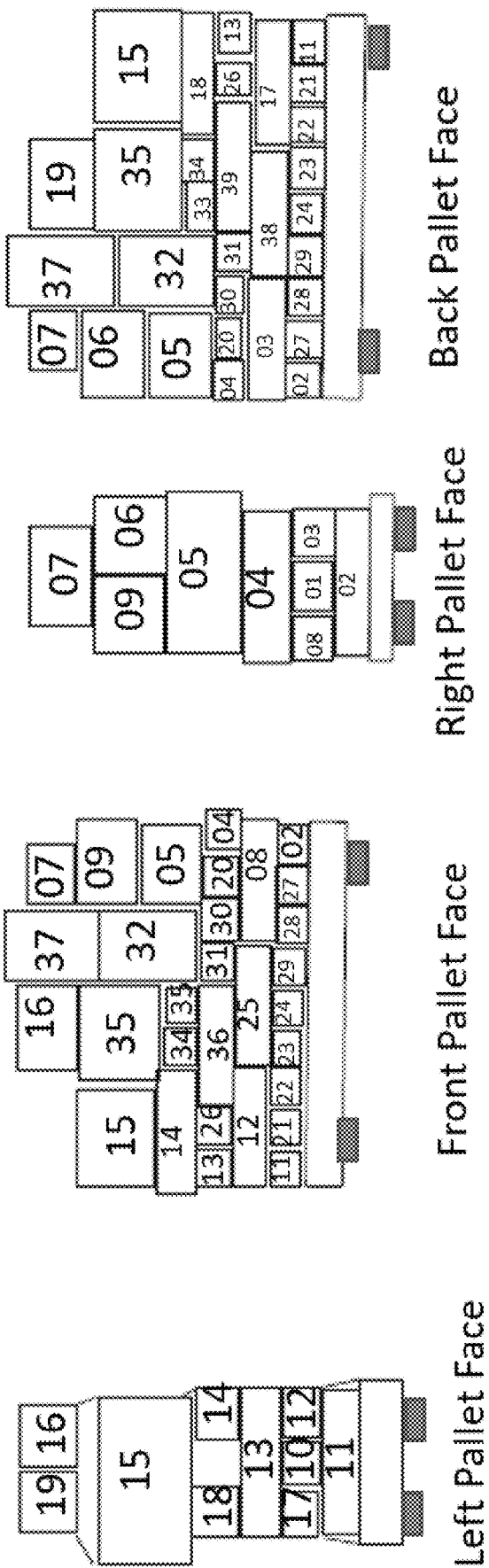
FIG. 15K illustrates a twelfth stitching step with respect to the four pallet faces of FIG. 15A.

Step 12 is described with respect to FIG. 15K. Sometimes we have product with packages that fit 3 side by side with a hidden package in the middle. Look at package 08, 01, and 03 on the right pallet face. This product is not hidden because all three are visible on the pallet. The product of 25 (front face) and 38 (back face) is packed the same as 08, 01, 03 but is in the middle of the pallet so it is hidden. The SIDE package face has a property that indicates that three fit on the layer. Once we detect the package face on its SIDE in the middle of the front pallet face, then we assume an additional hidden package of the same package type and brand. The brand confidence is set to zero and will be override based on the pick list if needed. When we override the brand then we display the product as "cannot confirm" in the UI.

Figure 15L:
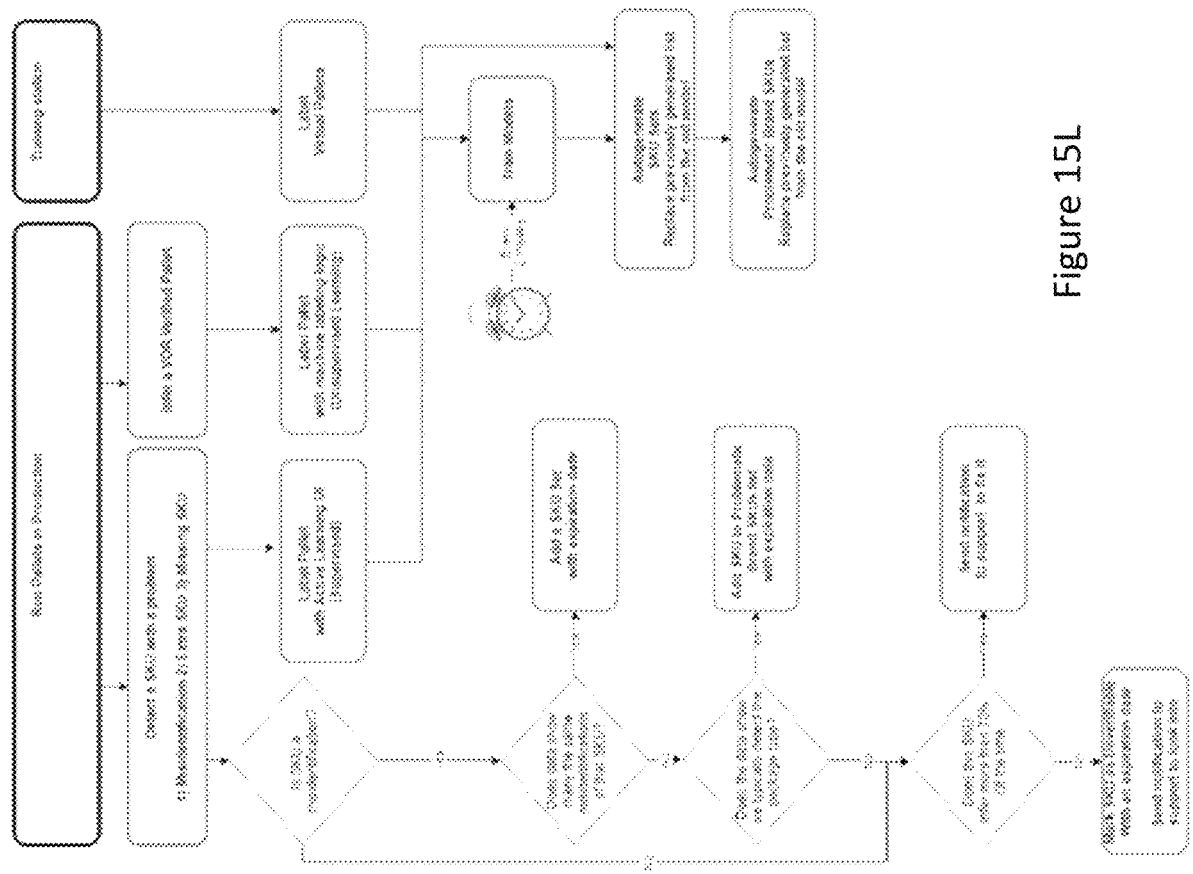
FIG. 15L illustrates an unsupervised active learning method that can be used in the validation system of FIG. 1.

Referring to FIG. 15L, sometimes there are unplanned branding changes or unplanned package type changes. We want to handle these changes without human intervention while the system does unsupervised active learn to correct the issue sometime in the future.

The system automatically detects the error and sets data for the heuristics to handle the change to pass the product as items that we cannot confirm until the machine learning fixes the issue. After the machine learning fixes the issue, then we can remove or expire heuristic data for that SKU.

If the system detects that we keep making the same misidentification of a SKU, then we can add a SKU set with an expiration date. We can update the expiration date based on how often we need to use the SKU set. The misidentified SKU can be machine labeled for unsupervised active learning.

If the system detects a SKU that we correctly infer the package type but are often wrong on the brand, then we can automatically add that SKU to the problematic brand list. These SKUs always get their brand overridden during the unverifiable brand heuristic.

If the system detects a SKU that it is not good at inferring both the package type and the brand and this misidentification occurs at a high frequency, then it automatically adds an "unverifiable SKU" with an expiration date.

FIGS. 15M to 15S show a pallet stitching algorithm for use with a full-size pallet. Referring to FIG. 15M, the full pallet stitching algorithm is based on the half pallet algorithm with switches built in to accommodate the differences between the full (large format pallet, e.g. 48×40) and the half pallet.

In Step 1, classify the position of each product on each of the four pallet faces. This is not shown in FIG. 15M, but it is the same as the half pallet stitching algorithm described above.

In Step 2, determine if the left pallet face or the right pallet face is taller. This is the same as the half pallet stitching algorithm described above.

In Step 3, on the taller short side pallet face, assign a product Id to any product on the short pallet face that is in the middle. This is the same as the half pallet stitching algorithm described above. In Figure M, products 01-18 were added because they are classified as being in the middle. On a full-size pallet, products in the middle are between edge products and only have a single face view.

Figure 15N:
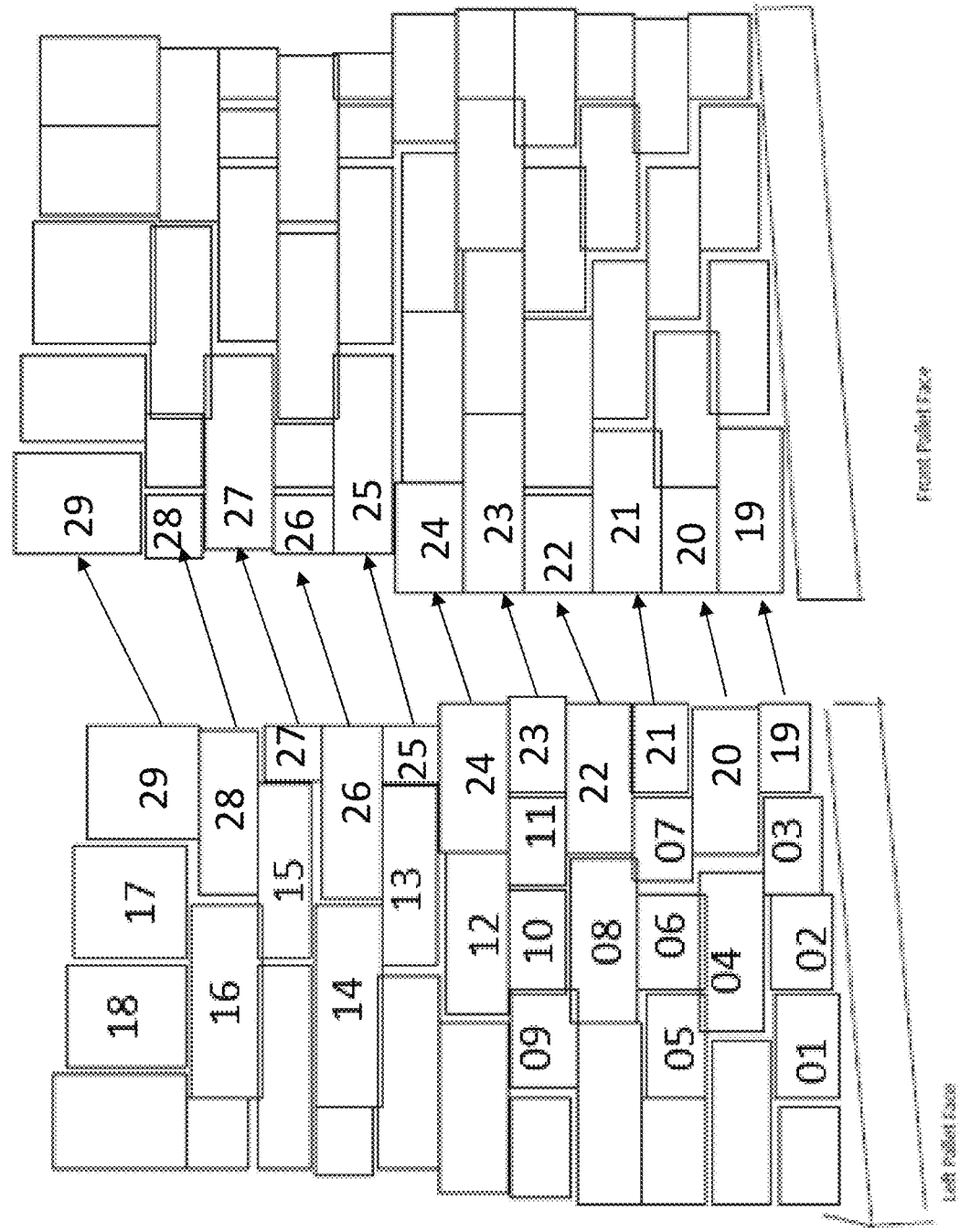
FIG. 15N illustrates a fourth stitching step with respect to the left pallet face and front pallet face of FIG. 15M.

Step 4 is described with respect to FIG. 15N. In Step 4, the pallet product faces are linked from the Front Pallet Face to the Left Pallet Face. The right edge products of the left pallet face column stack to the left edge products of the front pallet face. The products are linked to be the same product based on the stack sequence.

Figure 15O:
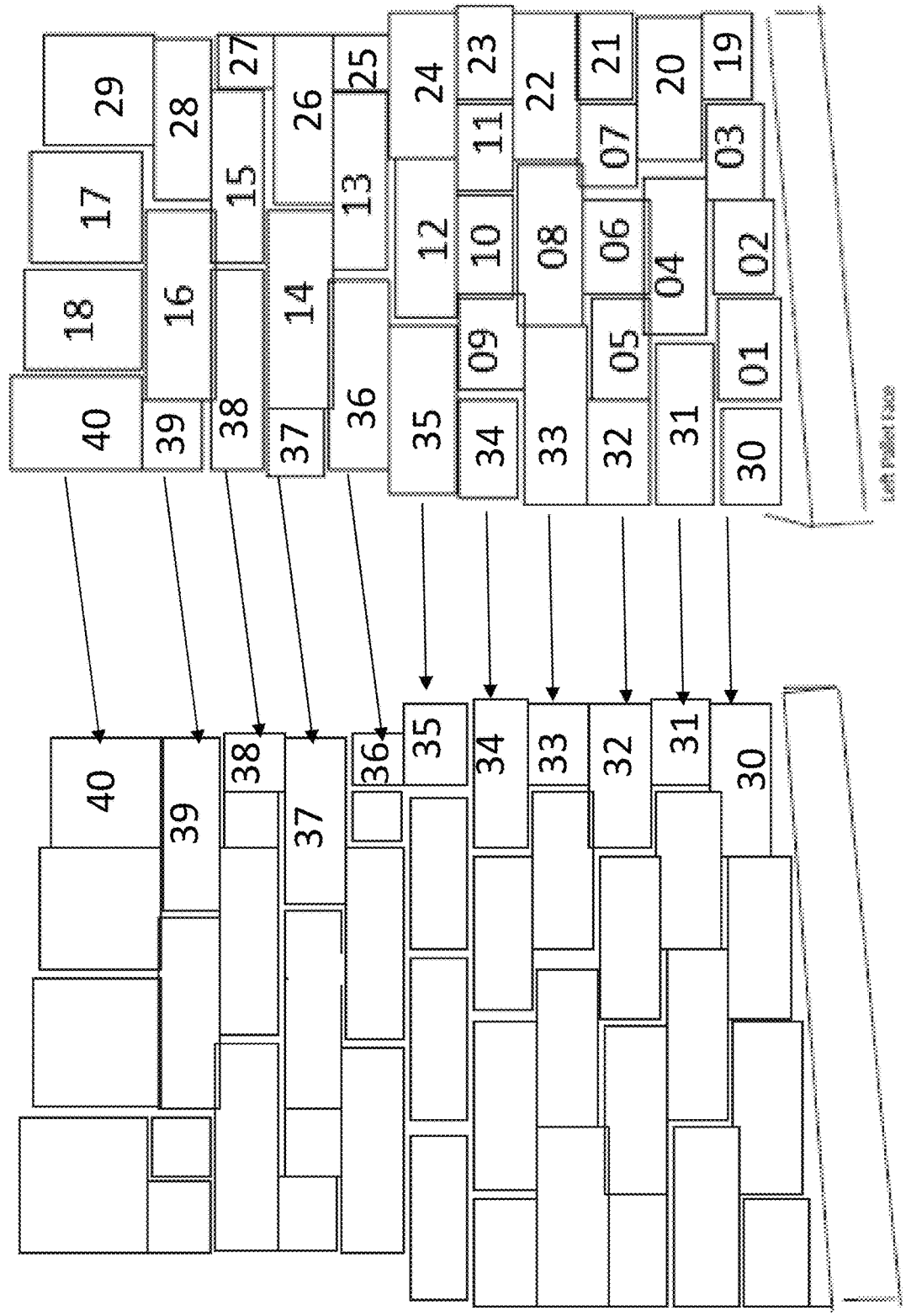
FIG. 15O illustrates a fifth stitching step with respect to the left pallet face and back pallet face of FIG. 15M.

Referring to FIG. 15O, in Step 5, this is repeated for the other side of short pallet face. The left edge product of the left pallet face column stack to the right edge products of the back pallet face. The products are linked to be the same product based on the stack sequence.

Figure 15P:
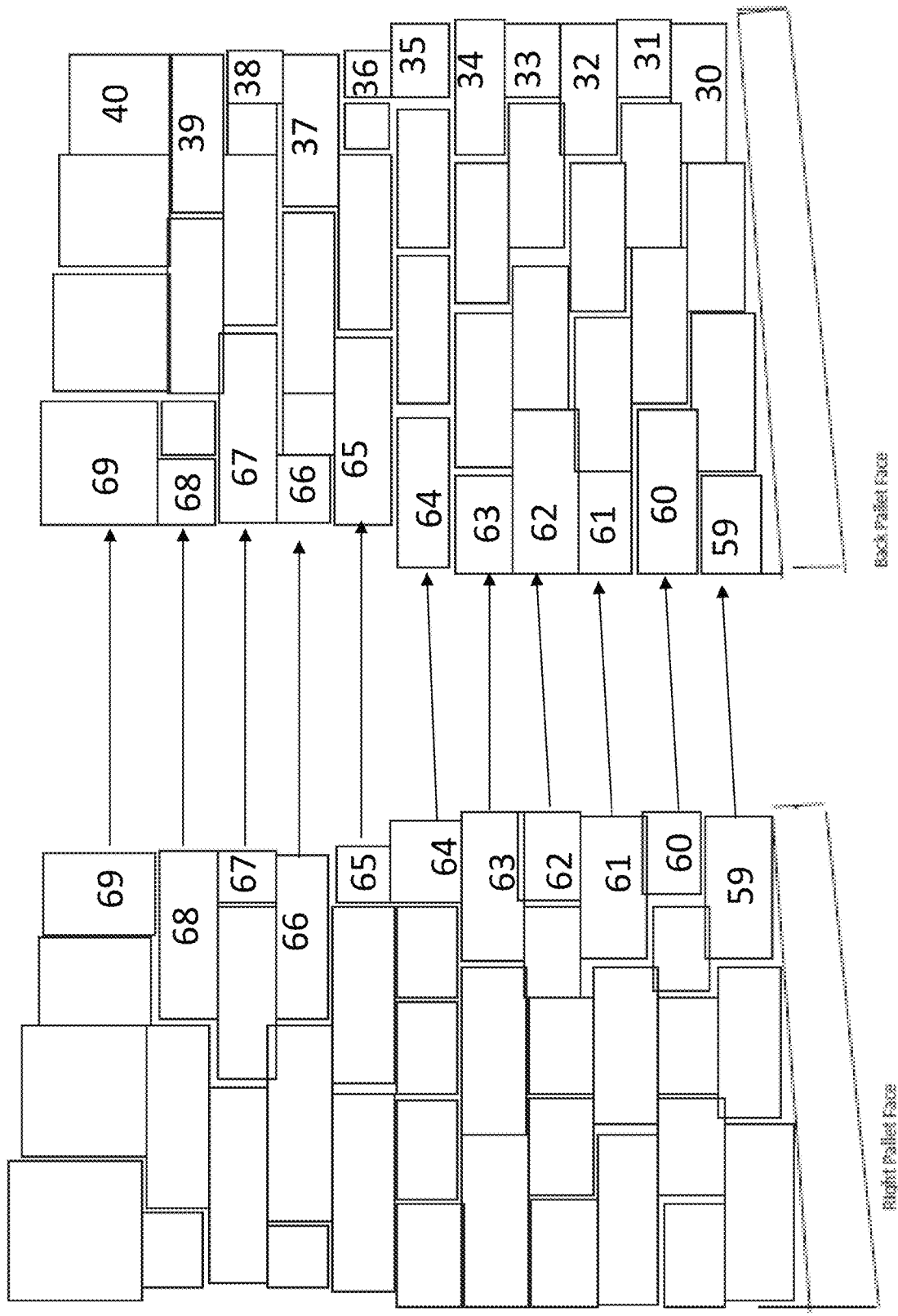
FIG. 15P illustrates sixth and seventh stitching steps with respect to the right pallet face and back pallet face of FIG. 15M.

Referring to FIG. 15P, this is repeated for the shorter side pallet face. Step 6 is to add any product that is classified in the middle of the right pallet face. Products 41-58 were added because it was in the middle between two others. These products each only have a single face view. Still referring to FIG. 15P, Step 7 is to link the pallet right side product face to the back side pallet face based on the column stack sequence of the edge product.

Figure 15Q:
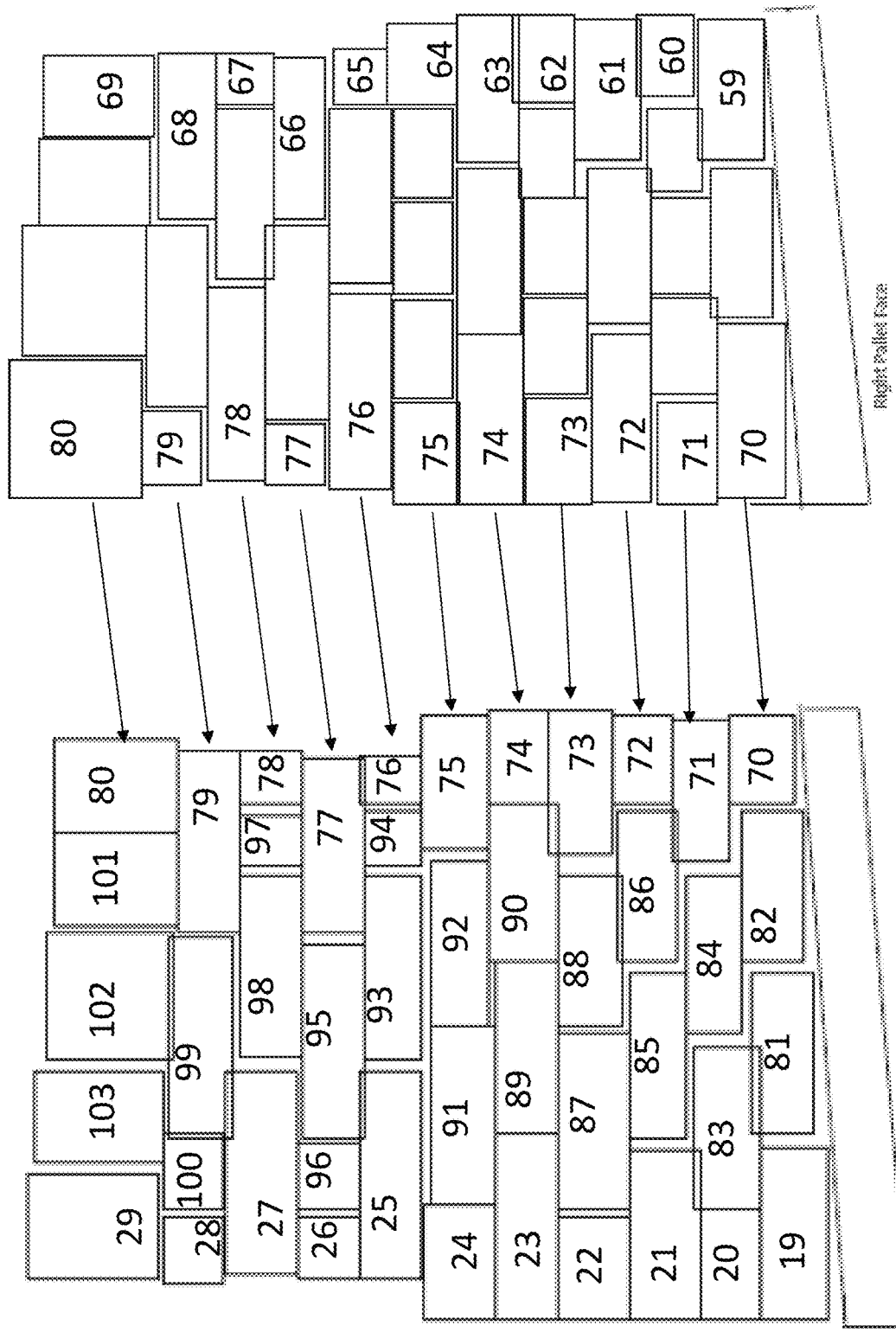
FIG. 15Q illustrates eighth and ninth stitching steps with respect to the front pallet face and right pallet face of FIG. 15M.

Referring to FIG. 15Q, Step 8 is to repeat for the other side of right pallet face, i.e. linking the right side pallet face to the front pallet face based upon the column stack sequence of the edge product (i.e. products 70-80). In Step 9, add any product that is classified in the middle of the front pallet face. Products 81-103 were added because they were in the middle between two edges. These products each only have a single face view.

Figure 15R:
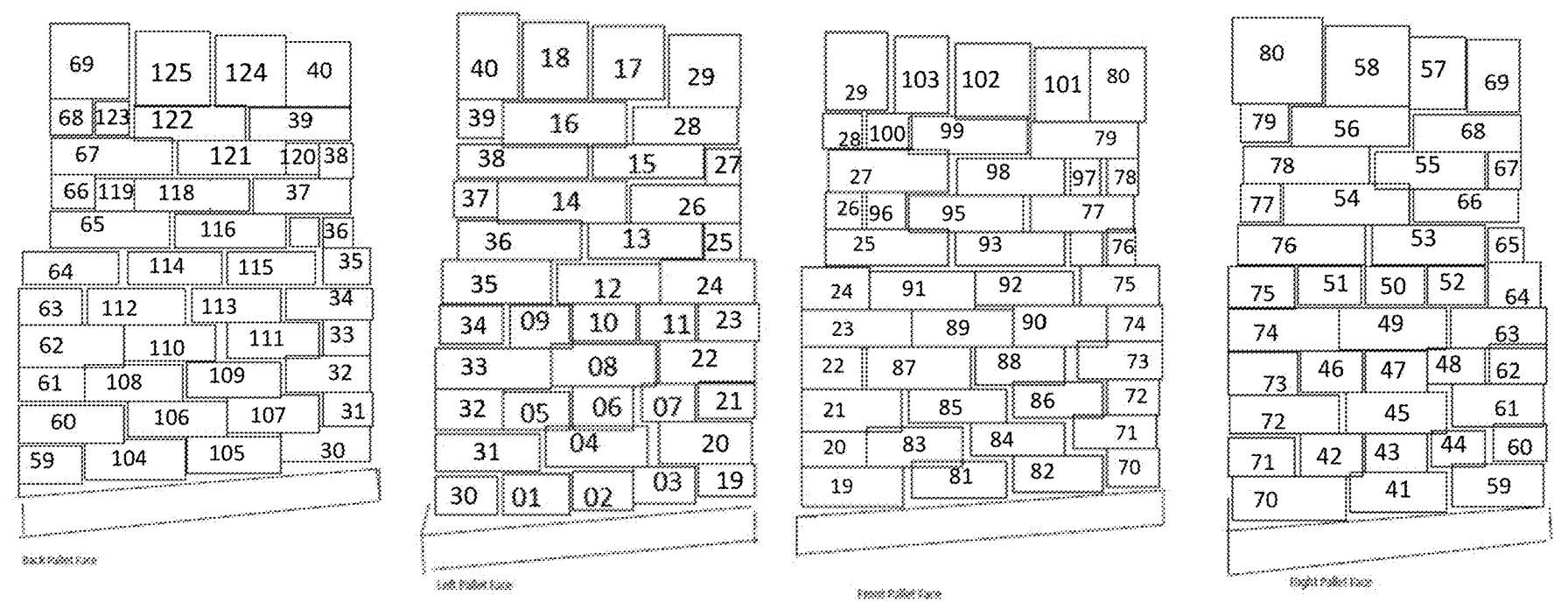

FIG. 15R demonstrates full layer stitching. This step adds in hidden product from full layers of the same package type. Two values are set in the database for every package type:

1) Full Layer Quantity—The quantity that will be packed on a full layer of that package type (i.e. how many of that package type can fit on a layer of a full pallet when the entire layer is that package type)

2) Minimum Visible Layer Quantity—The minimum number that need to show for a full layer Full layers of a package type can also have mixed brands. We classify the hidden products on the layer as the brand on the layer with the highest count. We cannot confirm the brand, so we set the confidence to 0% on the hidden products and allow the low confident brand heuristic to override the brand.

Referring to FIGS. 15R and 15S, this sample pallet has seventy-three hidden products counted from summing up all the hidden product on the full layers.

Figure 15T:
FIG. 15T demonstrates a full layer heuristic: override missing hidden layer product errors.

FIG. 15T demonstrates a Full Layer Heuristic: Override Missing Hidden Layer Product Errors. The heuristics run after stitching. Stitching is not able to count some layers as a full layer if it makes an error detecting one or more wrong package types.

The below-enumerated correction algorithms can make updates to the detected product and correct the package type. After all the corrections are made to package types from the heuristics then it is possible that there are more full layers than originally thought.

The algorithm will re-look at all the product classified on each layer and if the layer is now all the same package type, then it will look up the full layer quantity and the minimum visible layer quantity for the package type.

If the layer has hidden product and there is missing product of the same package type then the algorithm will correct the extra and missing product. In the example of FIG. 15T, there were two packages on a layer that were detected to be 18-packs of Pepsi but were really 12-packs. The SKU set heuristic (described below) fixed the product and then the override missing hidden layer heuristic added in the missing count for the layer.

Correction Algorithms

The pick list that has the expected results is then leveraged to the actual inferred results from the above techniques. There should be high confidence that there is an error before reporting the error so there are not too many false errors. There are several example algorithms disclosed herein that leverage the known results of the pick list to make corrections so that too many false errors are not reported: 1) Override Multiple Face View; 2) Indistinguishable SKU sets; 3) Low confident brand override; 4) Unverifiable Package Type Set; 5) Unverifiable SKU; 6) Override Single Face View; 7) SKU with unverifiable quantity; 8) Multiple Face View Count Both Products; 9) Optical Character Recognition; and 10) Full Layer Heuristic: Override Missing Hidden Layer Product Errors. The aforementioned sequence is preferred for a particular constructed embodiment. The sequence of the algorithms flow may be important because they consume the extra and/or missing SKU from the errors such that that extra and/or missing SKU will not be available down the flow for another algorithm. Again, then the Full Layer Heuristic: Override Missing Hidden Layer Product Errors algorithm (FIG. 15T) is run.

1) Override Multiple Face View Heuristic

The stitching algorithms associate all the visible faces of the same package. Sometimes one of the less confident faces of the package or the brand is the correct one. The system leverages the picklist expected SKUs and make corrections if the most confident face was not on the picklist, but a lesser confident face was.

Figure 21:
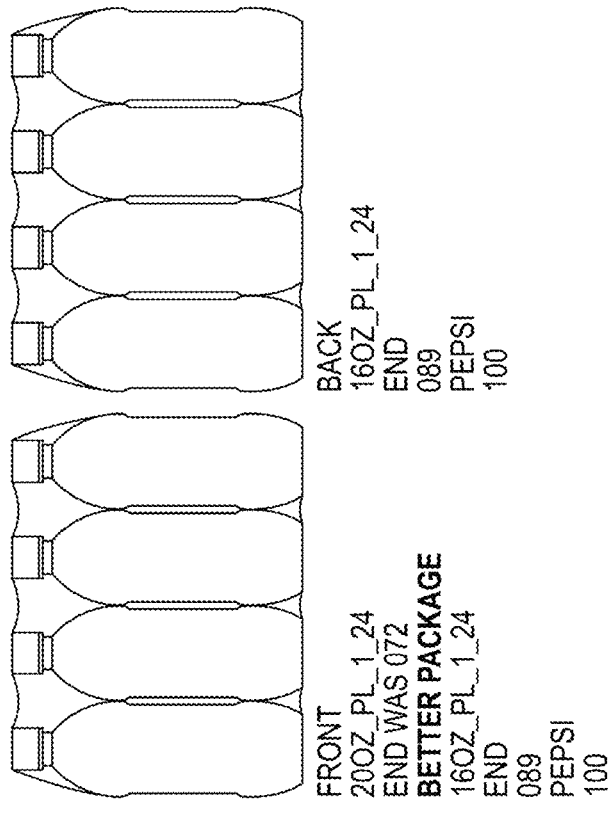
FIG. 21 illustrates an example of multiple face view override.

For the following example in FIG. 21, the package face with the highest confidence predicted that the image was 16 oz Pepsi, but the pick list had 20 oz Pepsi and not 16 oz. The system makes a correction to the missing 20 oz Pepsi with the extra 16 oz Pepsi found in the multi face view because: the lower confidence package face matched the pick list, the higher confidence package face did not match the pick list, and there was no other image on the pallet that matched the missing SKU (i.e. the 20 oz Pepsi). The system also allows similar corrections for brand, when a less confident brand is classified in a different package face view from the highest confident one.

Figure 22:
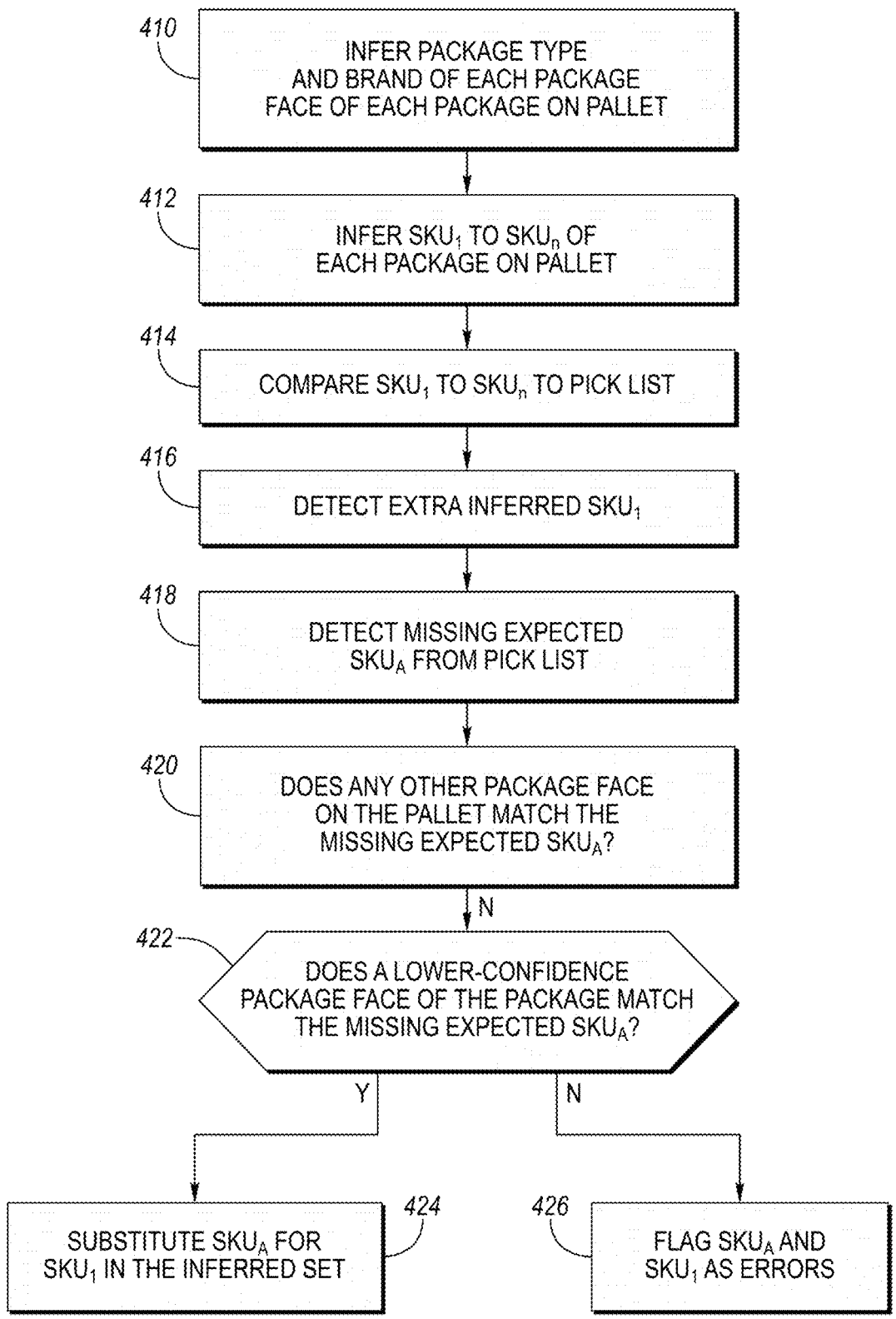
FIG. 22 shows a flowchart for the override multiple face view heuristic.

Referring to the flow chart of FIG. 22, in step 410, the package type and brand of each package face of each package are inferred according to any method herein. In step 412, SKUs for every package on the pallet are inferred (again according to methods described herein). In step 414, the inferred SKUs are compared to the expected SKUs on the pick list. In step 416, an extra SKU1 is inferred. In step 418, a missing expected SKUA is detected.

In step 420, it is determined whether any other package face on the pallet matches the missing expected SKUA. If not, in step 422, it is determined if a lower-confidence package face of the package (the package previously determined to be an extra SKU1) matches the missing expected SKUA. If so, then the lower-confidence package face (same as the missing expected SKUA) is used to override the SKU1 in the inferred SKU set in step 424. If not, then SKUA and SKU1 are both flagged as errors in step 426.

Optionally, steps 420 to 424 are only performed if the confidence in the extra inferred SKU1, although the highest-confidence face of that package, is below a threshold. If not, the errors are generated in step 426.

Figure 23:
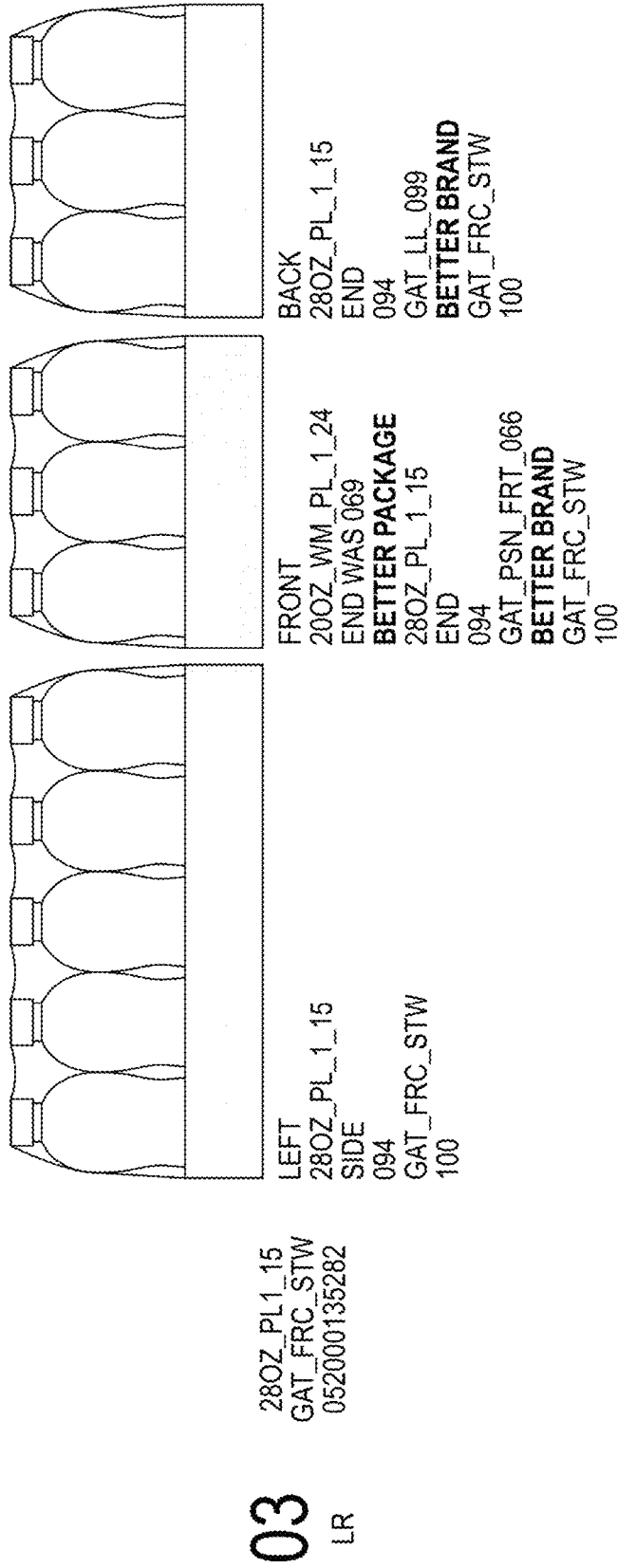
FIG. 23 shows an example of portions of images incorrectly stitched together.

The multiple face view algorithm of FIG. 22 is also leveraged to correct stitching errors. The image in the example in FIG. 23 shows two products that were incorrectly stitched together. Errors like this can occur when the machine learning does not detect the presence of a product (a "hole") on the pallet, causing the algorithm to stitch together package face images from different items. Even with stitching errors, the case count is often correctly inferred. The multiple face view algorithm can make heuristic corrections to compensate for the stitching errors when the correct case count is still inferred.

FIG. 23 shows two different packages incorrectly stitched together. Both the package type and the brands are different in the two products that were stitched together. In FIG. 23 the size of the bottles (package type) and the color (brand) is different (the contents of the bottles in the LEFT image is red, while the contents of the bottles in the FRONT and BACK images are yellow). The machine learning algorithm was most confident that the product was a package type of 28 OZ GAT_FRC_STW (from the LEFT image) causing an error of an extra inferred product in step 416 of FIG. 22. There will also be a missing product detected in step 418 of FIG. 22. The multiple face view logic will then correct an error consisting both of an extra inferred product and a missing product from the pick list. If the pick list is missing 20 OZ_WM_PL_1_24 Package Type (from the FRONT and BACK images of FIG. 23) that we inferred in a lesser confident package face, then we will look at the missing brands on the picklist for the package type. Out of the missing brands for the package type we will see which of those brands the machine learning has the highest percent confidence for and select that missing SKU in step 422 of FIG. 22 and make a correction with the extra inferred one in step 424.

2) Indistinguishable SKU Sets

The inference sometimes has a difficult time distinguishing between particular sets of two or more SKUs. A flowchart regarding the handling of indistinguishable SKU sets is shown in FIG. 16.

For example, as shown in FIGS. 13 and 14, the end package face of a 24 pack of Aquafina water looks identical to the end package face of the 32 pack of Aquafina. Based on how the product is packed in the pallet, sometimes the side package face of the Aquafina package can be hidden and so the inference has a 50% chance of inferring correctly before this adjustment. The two SKUs in this set are indistinguishable. It is known that there is one of the SKUs in the set but sometimes the difference between the SKUs cannot be confidently distinguished know which one is there. These similar SKUs where the inference often mixes up between another or multiple SKUs are added to a SKU Set. The algorithm of FIG. 16 will adjust the inferred results between this SKU set based upon the pick list. If the pallet is inferred to have an extra 24 pack of Aquafina and is also missing a 32 pack of Aquafina then an adjustment is made to the inferred SKUs so that an error is not reported. The algorithm essentially balances the extra and missing quantities between the SKUs in the set to try to correct for what is very likely not a picking error.

Figure 16:
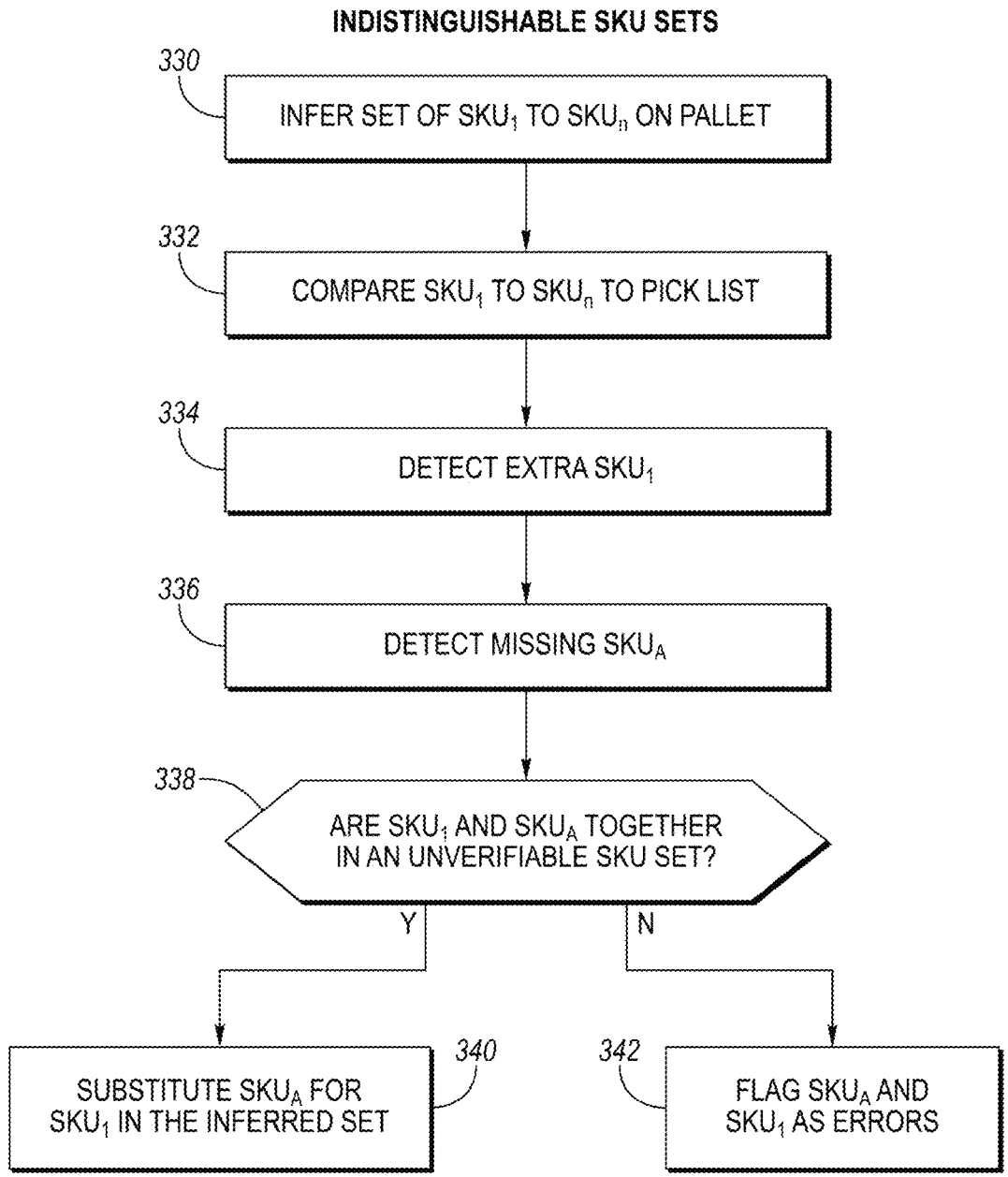
FIG. 16 shows a flowchart for a SKU set heuristic.

Referring to FIG. 16, in step 330, SKUs for all the items on the pallet (for example) are inferred according to any of the methods described herein. In step 332, the inferred SKUs are compared to the pick list. In that comparison, in step 334 an extra SKU1 is detected on the pallet and in step 336 a missing SKUA is determined to be on the pick list but missing from the pallet. In step 338, it is determined whether SKU1 and SKUA are associated with one another in an "indistinguishable sku set." If so, then SKUA is substituted for SKU1 in the inferred set in step 340, and no error is flagged, but the SKUA may be flagged as "unconfirmed." If SKUA and SKU1 are not in an indistinguishable sku set, then both are flagged as errors, e.g. "extra SKUA" and "missing SKU1" in step 342.

Another example of an Indistinguishable SKU set is the 700 ml Lifewater product, which presently looks identical to the 1 L Lifewater product with only being slightly bigger. The size is also dependent on the placement on the pallet and product further away from the camera appear smaller. These SKUs are added as an indistinguishable SKU set so that adjustments can be made so that too many false errors are not reported.

If an inferred result is updated based on the indistinguishable SKU set logic and the quantity of that SKU now matches the quantity on the pick list then a property is set for that SKU to indicate that the system cannot confirm that SKU. No error is flagged, but the SKU is labeled "unconfirmed."

It may be a time-consuming process to identify all the required SKU Sets. Additionally, different SKUs sets need to be added and removed each time the models are trained. Further, as the active learning tool is used, some SKU Sets are no longer needed. Therefore, a SKU Set generation tool is provided that reviews the labeled pallets and automatically creates the SKU Sets when the machine learning incorrectly identifies a SKU.

The following process scales creating the best SKU sets:

Manual Detect—Every time that a new SKU set is discovered manually then the pallet is labeled and the pallet is stored into a location used to generate SKU sets.

Discover best SKU sets from Virtual Pallets—However, it takes a long time to manually label pallets. Manually labeling pallet images is also prone to errors. Therefore, thousands of virtual pallets are built with labeled images that used the tool to find all the SKUs that the inference gets mixed up. In other words, virtual pallets are generated with images of known SKUs and then those virtual pallet images are analyzed using the machine learning models as described above. It is determined which SKUs are often confused with one another by the system based upon the image having a known SKU but being inferred to have a different SKU. If that happens at a high enough rate, then those SKUs (two or more) are determined to be a SKU set. Indistinguishable SKU sets are generated automatically with those SKUs.

3) Low Confidence Brand Override

In an implemented embodiment, the package type model is more accurate than the brand models. If the package type expected from the pick list is inferred, then any brand error should not be reported unless there is sufficient confidence that there is a brand error. If the inferred package type matches the package type expected from the pick list, then the inferred brand will be overridden based on the expected brand from the pick list if the brand confidence of the inferred brand is less than the threshold.

Figure 17:
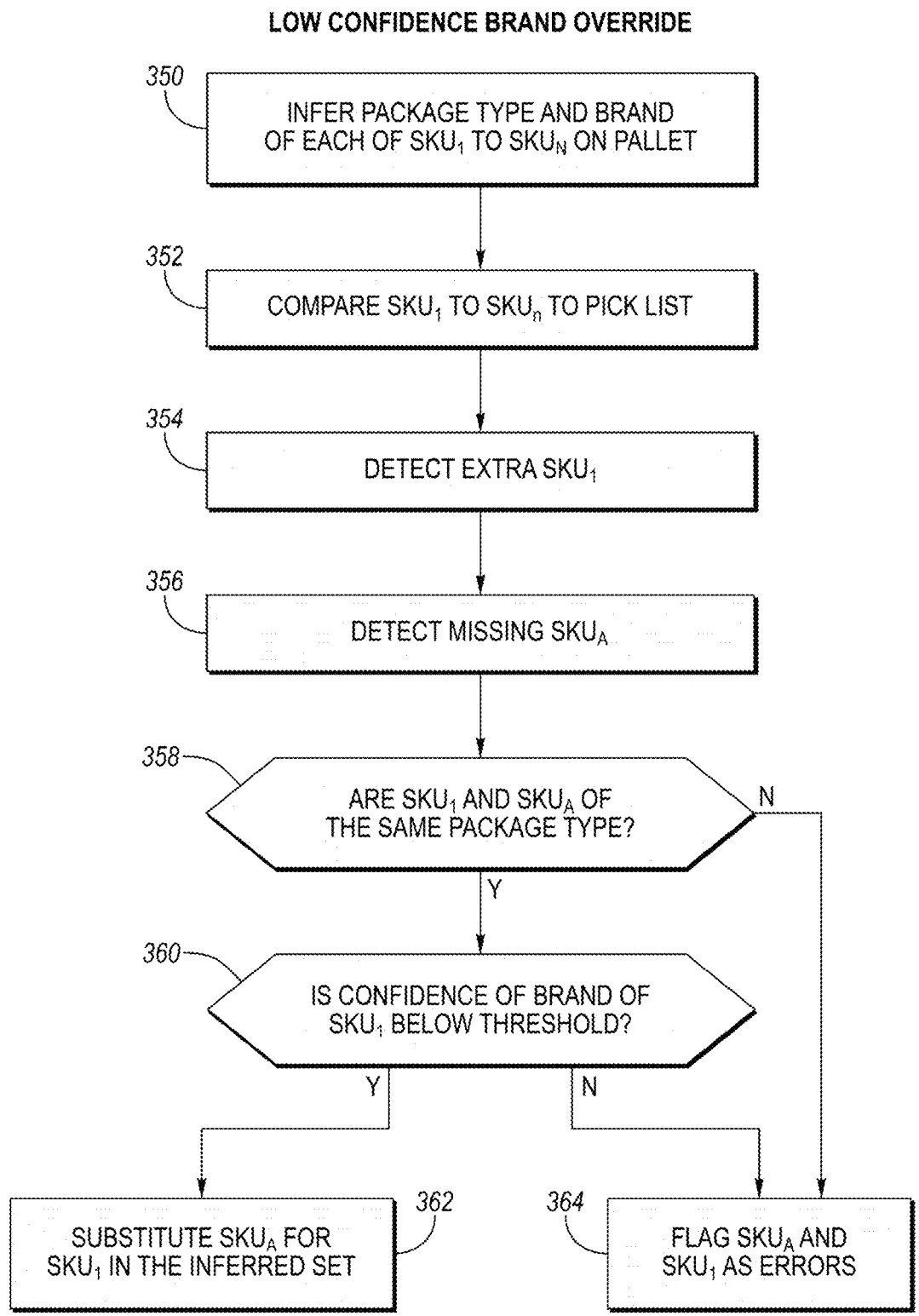
FIG. 17 shows a flowchart for a low confidence brand heuristic.

A sample flowchart for handling the low confidence brand override is shown in FIG. 17. In step 350, the SKUs for all the items on the pallet (for example) are inferred according to any of the methods described herein. In step 352, the inferred SKUs are compared to the pick list. In that comparison, in step 352 an extra SKU1 is detected on the pallet and in step 354 a missing SKUA is determined to be on the pick list but missing from the pallet. In step 358, it is determined whether the extra inferred SKU1 and the missing expected SKUA are of the same package type. If not, then the extra inferred SKU1 and the missing expected SKUA are flagged as errors in step 364. If they are determined to be of the same package type in step 358, then in step 360, it is determined whether the confidence in the inferred brand of SKU1 is below the threshold. If so, then SKUA is substituted for SKU1 in the inferred set in step 362, and no error is flagged, but the SKUA may be flagged as "unconfirmed." If the confidence of the inferred brand of SKU1 is not below the threshold, then both are flagged as errors, e.g. "extra SKUA" and "missing SKU1" in step 364.

4) Unverifiable Package Type Set

Optionally, the low confidence threshold can be set based on the inferred package type, such that different package types have different low confidence thresholds. Some package types are unbranded cardboard boxes where it is impossible to infer the brand better than a guess. The threshold for these package types can be set to always override the brand inference with the expected brand from the pick list. In other words, if the inferred package type is unbranded cardboard box, and if the quantity of inferred unbranded cardboard boxes matches the expected quantity (from the pick list), then no error will be flagged, but they will be marked "unconfirmed."

Any of the results from the inference that are updated and also match the quantity on the pick list are set to have a "cannot confirm" property (rather than "error") so that the QA person knows that brand was unable to be confirmed.

If one or more of an inferred SKU is updated based upon the pick list, but not in the correct quantity expected from the pick list, then there will still be a confirmed error.

5) Unverifiable SKU

SKUs that the system is poor at identifying are marked as unverifiable in the database. This list should be kept really small as the logic can have negative repercussions as well.

If a SKU that is marked "unverifiable" in the database or the SKU is on the pick list but missing from the inferred results while there is at least one SKU as extra in the inferred results then the least confident extra SKU is overridden and renamed with the expected unverifiable SKU from the pick list. The SKU will still have an error if the quantity is short but if the inferred quantity matches the pick list quantity then the SKU is set to "cannot confirm" but not an error.

Figure 18:
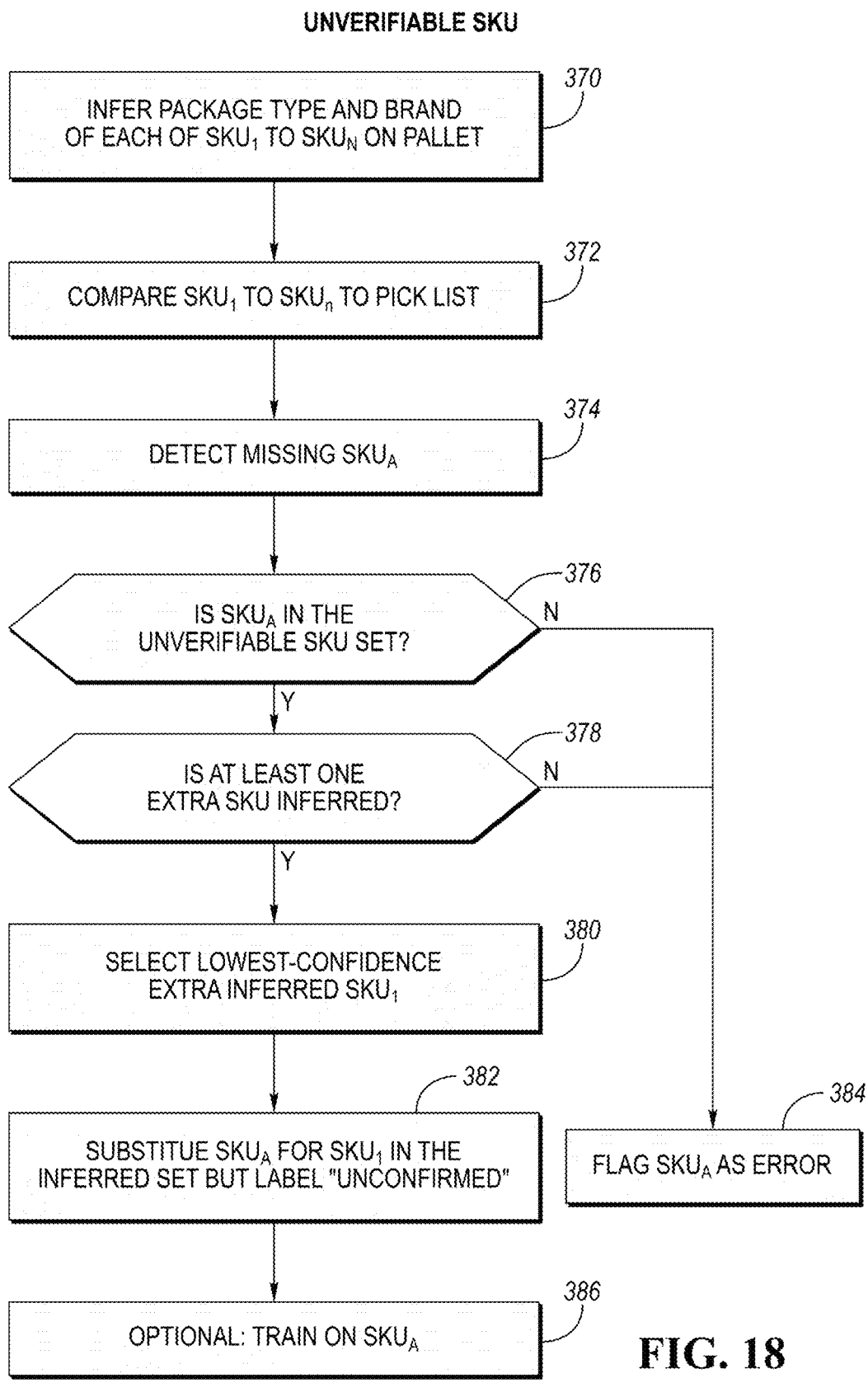
FIG. 18 shows a flowchart for an unverifiable SKU heuristic.

A sample flowchart for handling unverifiable SKUs is shown in FIG. 18. In step 370, the SKUs for all the items on the pallet (for example) are inferred according to any of the methods described herein. In step 372, the inferred SKUs are compared to the pick list. In that comparison, in step 374 a missing SKUA is determined to be on the pick list but missing from the pallet.

In step 376 it is determined whether the missing SKUA is indicated as an "unverifiable SKU." If not, then the missing SKUA is indicated as an error in step 384. If it is, then in step 378 it is determined if there is at least one extra SKU inferred. If not, then an error is indicated in step 384. If there is at least one extra SKU inferred, then in step 380 the lowest-confidence inferred extra SKU1 is selected from the extra inferred SKU(s). In step 382, the missing expected SKUA is substituted for the lowest-confidence inferred SKU1 in the inferred set of SKUs, marked as "unconfirmed, " but not as an error.

One good way to leverage this functionality is for a new SKU that has not yet been trained in the models. The new SKU can be marked "unverifiable" in the database and/or the models. If the "missing SKUA" is the new product and if the package detector model is able to detect the presence of the product without training then it will still get the case count match with the pick list. An extra inferred SKU1 will be overridden with the new SKUA. The unverifiable SKU logic will show that SKUA as "cannot confirm," but not show a false error. All of this can occur before any machine learning training of that new SKU.

Optionally, in step 386, the images for a new SKUA can be used to train the machine learning models so that the new SKUA could be recognized in the future. Optionally, these images for the new SKUA would not be used to train the machine learning model until confirmed by a human.

6) Single Face View Heuristic

Most of the time the stitching algorithm can connect two or more package faces together of the same item. The inference is improved when we have multiple package faces because the highest confident package type and highest confident brand are used to get the most confident package. Heuristic logic is also used in the multiple face view algorithm to make additional corrections.

Figure 24:
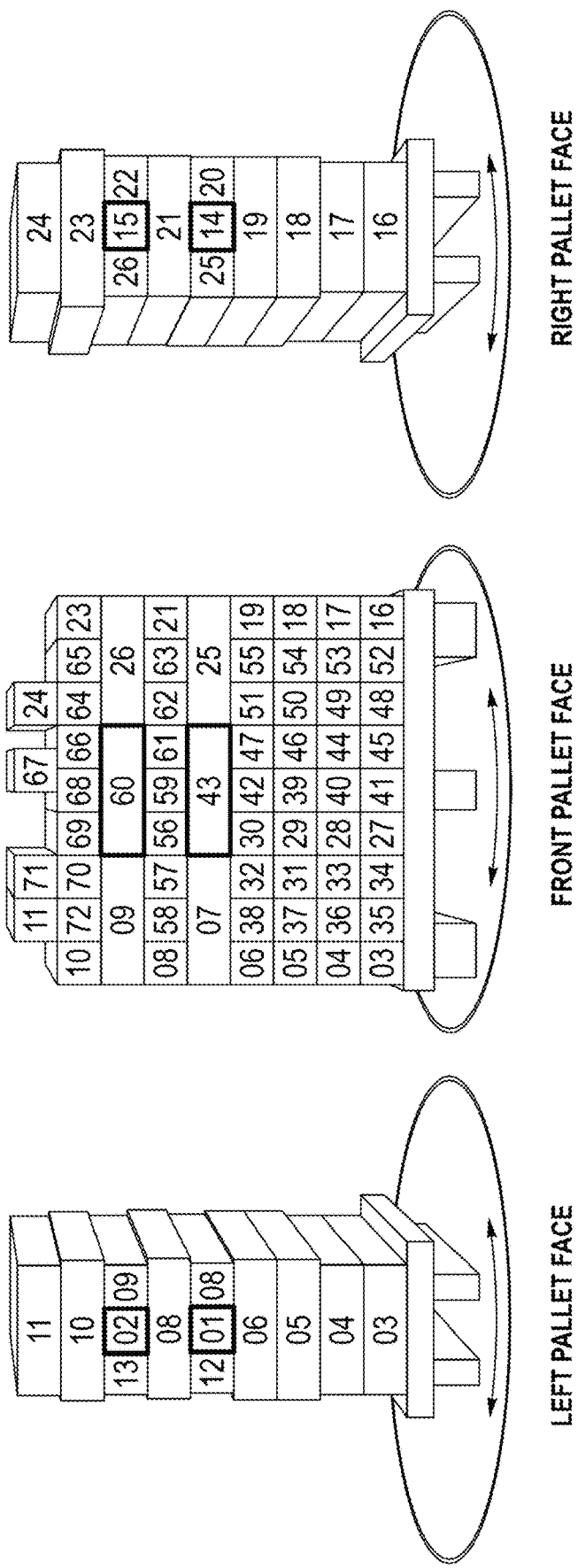
FIG. 24 shows an example of the single face view heuristic.

The system is more likely to be wrong when we only have one package face to work with. The picker can place a package on the pallet in a position where only one package face is visible. FIG. 24 shows six packages outlined in bold that only have a single face view visible.

Figure 25:
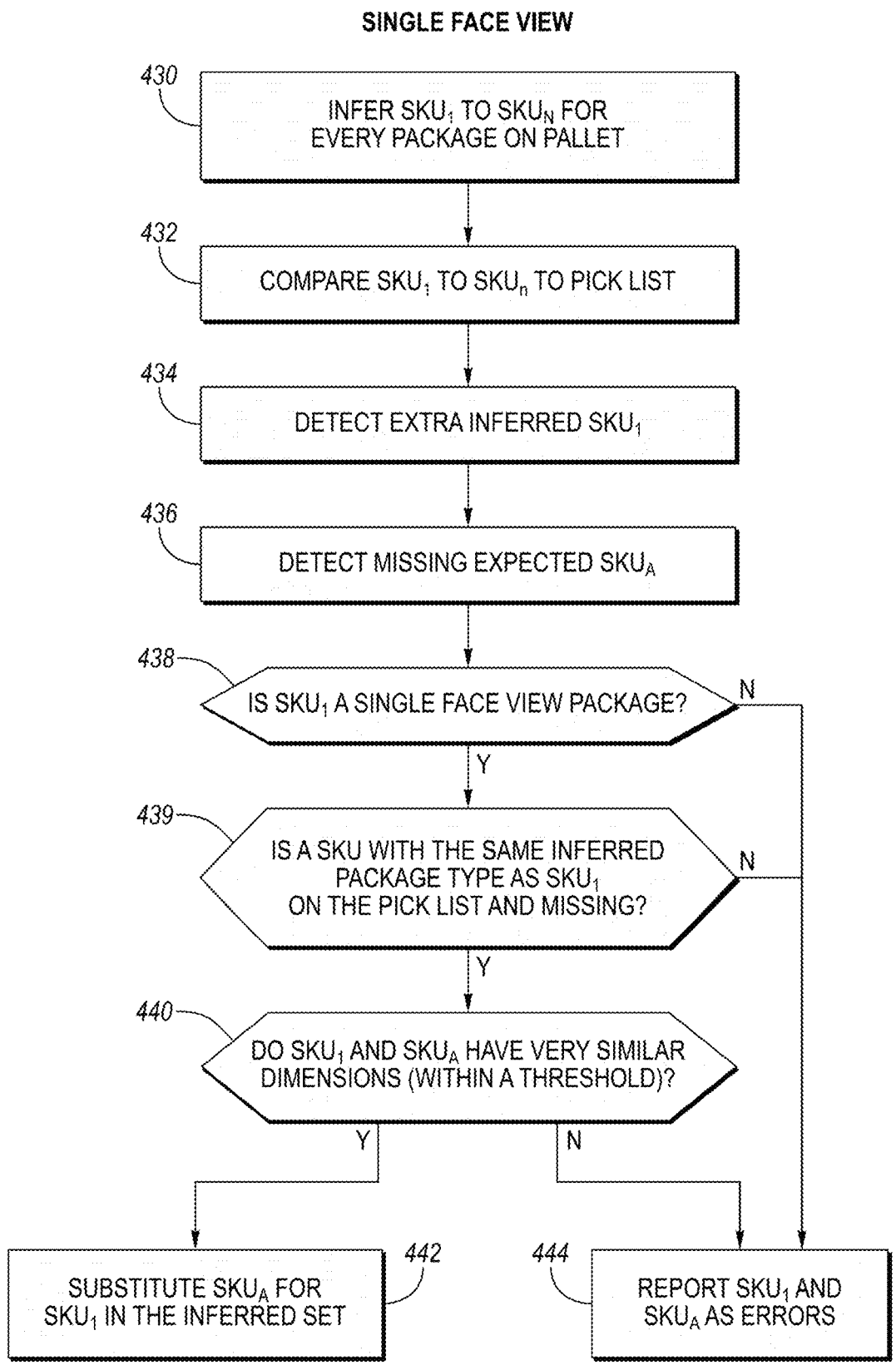
FIG. 25 is a flowchart for the single face view heuristic.

Referring to FIG. 25, in step 430, SKUs for every package on the pallet are inferred (according to methods described herein). In step 432, the inferred SKUs are compared to the expected SKUs on the pick list. In step 434, an extra SKU1 is inferred. In step 436, a missing expected SKUA is detected. If in step 438 the extra SKU1 is determined to be a single face view package (i.e. only one package face was obtained and/or should have been obtained based upon placement and dimensions).

If the inferred package type of a single face view package is not on the pick list, then we look at other missing SKU on the pick list with dimensions like the inferred one. In step 439, if a package type missing on the pick list is a has a very similar dimension of length and height of the extra inferred package type as determined in step 440, then the correction is made in step 442 to substitute the missing SKU for the extra inferred SKU. If there is more than one missing SKU on the pick list then the one with the greatest brand confidence will be used for the correction.

7) SKU with Unverifiable Quantity

The quantity of some SKUs on the top of the pallet cannot be determined from the images. The pallet weight is used to help determine the SKU quantity.

Figure 19:
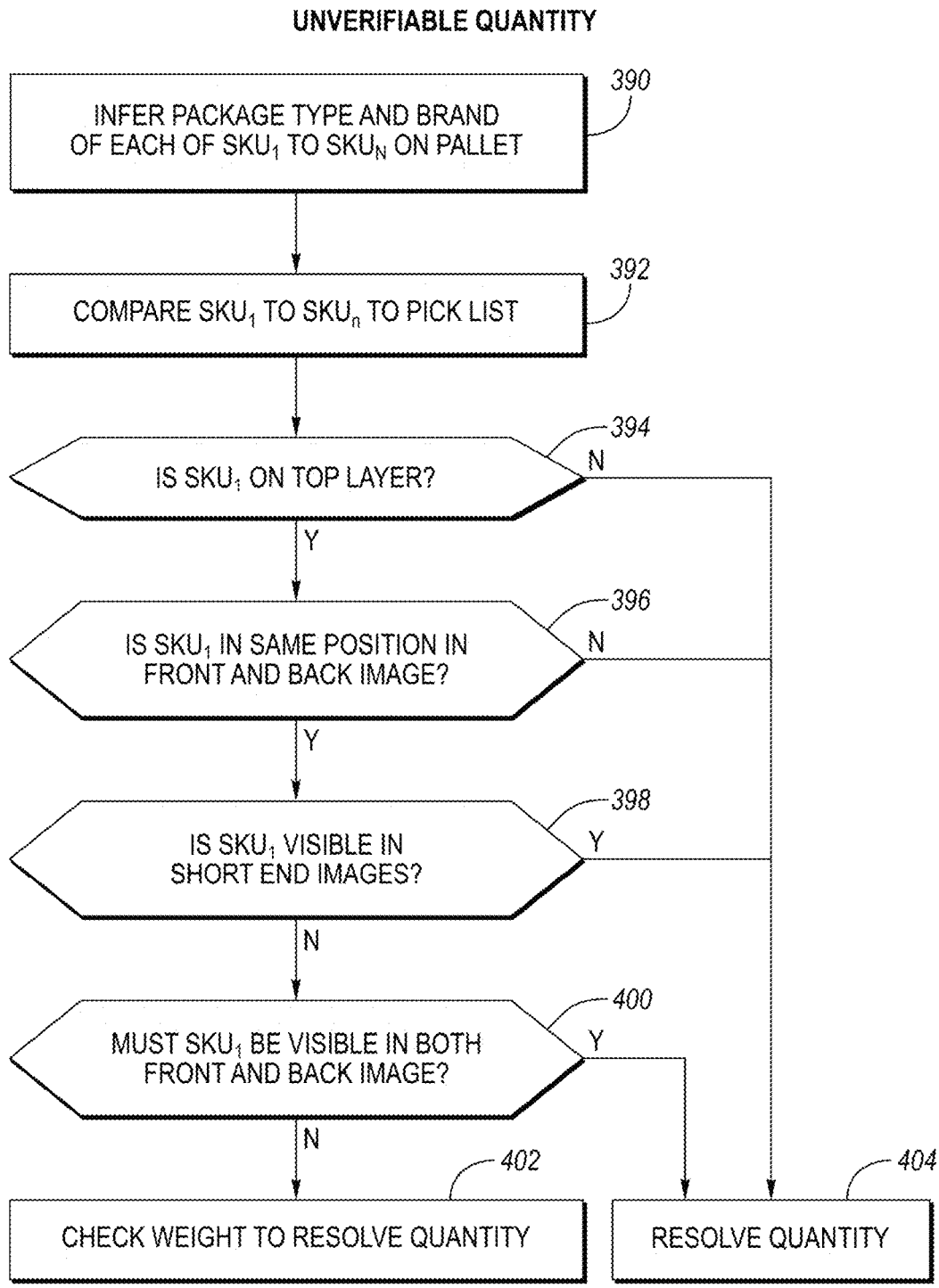
FIG. 19 shows a flowchart for an unverifiable quantity heuristic.
Figure 20:
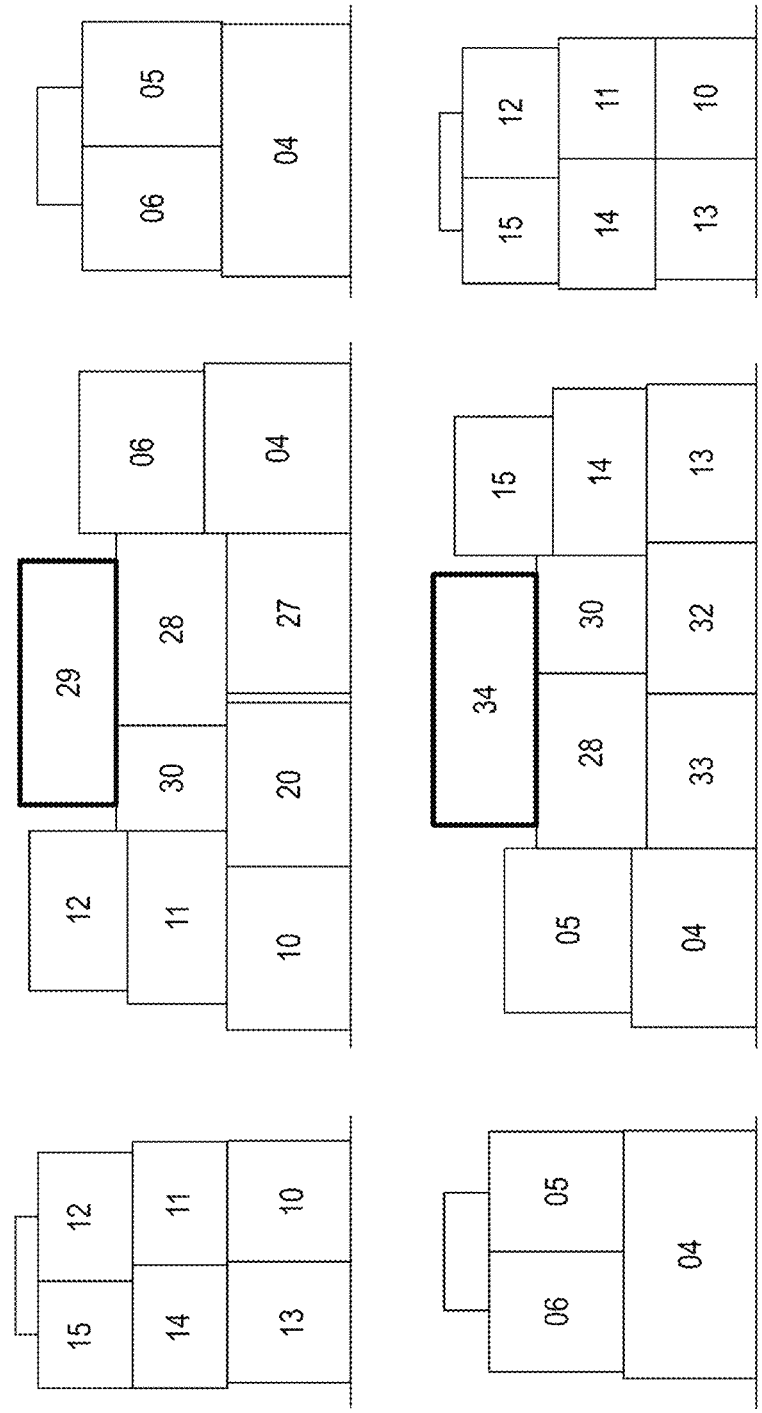
FIG. 20 illustrates an example implementing the unverifiable quantity heuristic of FIG. 19.

A sample flowchart for a SKU with unverifiable quantity is shown in FIG. 19 with reference to the images in FIG. 20. It must be determined if these images of SKU1 (package faces 29 and 34) are of the same product or if there are two such products of the same SKU next to one another. As shown in FIG. 20, the product was not recognized by the machine learning model on the short sides (although we can see it in the figure), which would have resolved the ambiguity (there is only one).

In step 390, the SKUs for all the items on the pallet (for example) are inferred according to any of the methods described herein. In step 392, the inferred SKUs are compared to the pick list. In step 394 it is determined if SKU1 (package faces 29 and 34) is on the top layer of the stack of products in the images. If not, the quantity is resolved in step 404 (i.e. there are two). If it is on the top layer, then it is determined in step 396 if SKU1 appears in the same mirror image X coordinate position in the front and back images mirror image (within a tolerance threshold). If it is not, the quantity is resolved in step 404 (i.e. there are two).

In step 398, it is determined if SKU1 is visible on a perpendicular side (here, the left or right end) image. If so, the quantity would be resolvable in one of the perpendicular images in step 404 because the perpendicular image would show the quantity (e.g. one versus two).

If the SKU1 was not recognized in a perpendicular image, then it is determined in step 400 if the inferred SKU1 has the property (e.g. dimensionally and orientationally) that it must be visible on both the front and the back pallet face. If it must, then quantity is resolved in step 404 (e.g., there is one). For example, for a product having a shorter side and a longer side, it is determined whether the shorter side or the longer side is facing the front and/or back pallet faces. If the shorter side is facing the front and/or back pallet faces, and if the longer side dimension exceeds a threshold (e.g. 10.5 inches for a half-pallet), then it is determined that the same SKU1 is visible in both the front and back pallet faces and quantity is resolved as one in step 404. The total determined quantity (i.e. including any others stacked on the pallet) is then compared to the pick list.

On the other hand, if the longer side is facing the front and/or back pallet face (as in the illustrated example), and if the shorter side is less than the threshold, then it is determined that it is possible that there are two such SKUs side-by-side and that it is possible that the system is seeing one on the front pallet face and different one on the back pallet face and the system proceeds to step 402. In step 402, weight is used to determine whether there is one or two. The weight of the plurality of products and the pallet can be compared to an expected weight of the plurality of products from the pick list (and/or the other verified SKUs) and the pallet to determine if the total weight suggests that there are two such SKUs or one such SKU. The determined quantity is then compared to the pick list.

It should also be recognized that the particular SKU may have two sides that are both greater than or both less than the threshold. If both are greater, the quantity is resolved as one in step 404. If both are less, then quantity is determined by weight in step 402.

It should also be noted that on all layers except for the top layer on the pallet, if dimensionally and orientationally possible, it is presumed that there are two items of SKU1.

Sometimes the multiple face view is needed to correct stitching errors of missing product. This can occur because of holes and other factors. This can correct a stitching error where the case count shows a missing product, and two products were stitched together reducing the count.

Unverifiable quantity logic is added to the multiple face view. If the highest inferred package face is on the pallet 22, but the lesser inferred package face is missing then also the missing product should be corrected too. The multiple face view can increase the case count on the pallet by counting both the highest confident package face and the lesser confident different package type package face.

Sometimes there could be more than one missing product on the pick list with a package type of the lesser confident package type from the multiple face view inference. For this case the brand inference is used to match to the best missing one from the pick list.

Brand is used to block the addition of additional products based on a threshold but to ignore the threshold if the missing SKU has an underperforming brand.

The weight checksum is used to block the addition of a product when the weight does not make sense.

Weight Checksum

There are many heuristics that can make corrections between package types inferred and ones that are missing from the pick list:

Indistinguishable SKU sets
Override multiple face view
Override Single face view
Unverifiable Quantity SKUs of different brands can have different weights too. In one implementation, the system would only allow overrides by the heuristic algorithms if it makes sense from a weight perspective.

The heuristic is allowed to make the override assuming any of the following is true:

1) Actual pallet weight (from the scale) and expected pallet weight is in tolerance. The expected weight is the sum of pallet weight and the weight from all of the product. The tolerance is scaled based on the weight of the pallet so that the heaver pallets with more weight have a greater tolerance, e.g. the tolerance could be a percentage.

2) Is the inferred weight of the pallet in the inferred tolerance. The system sums up the weight from all the inferred product and adds in the weight of the pallet. If the inferred weight minus the expected weight is close to 0 and within a tolerance, then this indicates that the inference is close to being correct.

3) If the inferred pallet weight after making the correction with the extra and missing product is closer to the goal weight. The goal weight is the expected weight when the actual weight and expected weight is in tolerance. The goal weight is the actual scale weight when we are out of tolerance.

4) If the difference of weight is in a negligible weight difference threshold then the override is allowed. One example of when this rule is needed is for 24 packs can be grouped together in 4 groups of 6 in a tray or all 24 in a tray. They both pretty much weigh the same (they can visually look the same too).

If all the above conditions are false, then the override correction from the heuristic is blocked.

Figure 26:
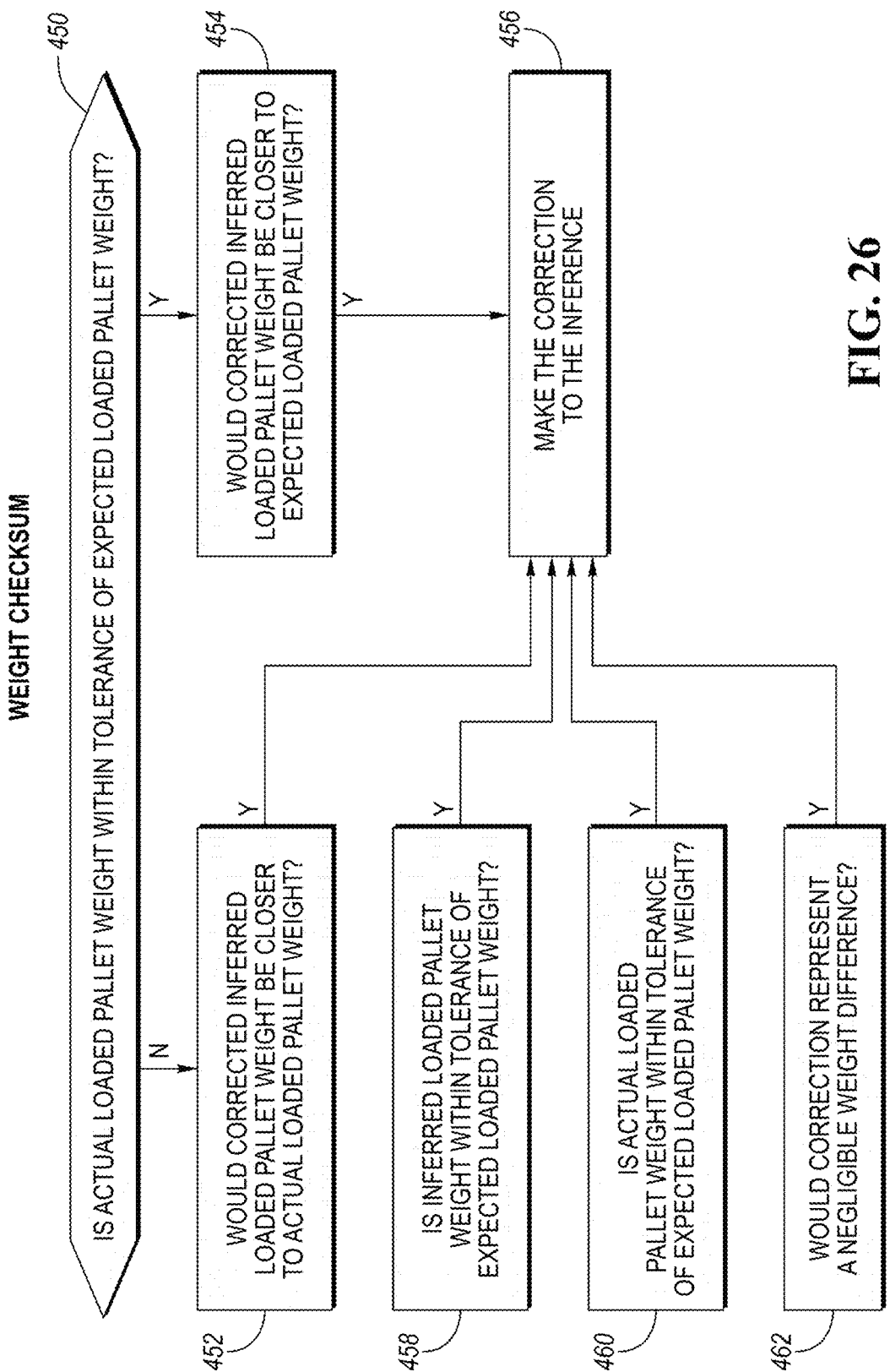
FIG. 26 is a flowchart for the weight checksum.

A sample implementation of this is shown in FIG. 26. In step 450, it is determined if the actual loaded pallet weight (e.g. from the sensors under the turntable) is within the tolerance of the expected loaded pallet weight (i.e. the known, expected weight of each of the SKUs on the pick list plus the expected weight of the pallet itself). If so, the correction (from one of the above methods) to the inferred list of SKUs is made in step 456 only if the correction to the inferred loaded pallet weight would bring the weight closer to the expected loaded pallet weight as determined in step 454. Otherwise, the correction is made in step 456 only if the correction would bring the inferred loaded pallet weight closer to the actual loaded pallet weight as determined in step 452.

Additionally, if the inferred loaded pallet weight is determined in step 458 to be within a tolerance threshold of the expected loaded pallet weight, then the correction is made in step 456.

If the actual loaded pallet weight is determined in step 460 to be within a tolerance threshold of the expected loaded pallet weight, then the correction is made in step 456.

Additionally, if the correction is determined in step 462 to represent a negligible weight difference (e.g. if the difference in weight between the two SKUs being corrected (i.e. swapped) is negligible, such as less than or equal to 0.2 lbs., then the correction is made in step 456.

The number of false errors reported is reduced with a weight heuristic. The weight heuristic is particularly useful for removing false inferred counts like seeing the tops of the package as an extra count or detecting product beside the pallet in the background that is not part of the pallet.

Figure 27:
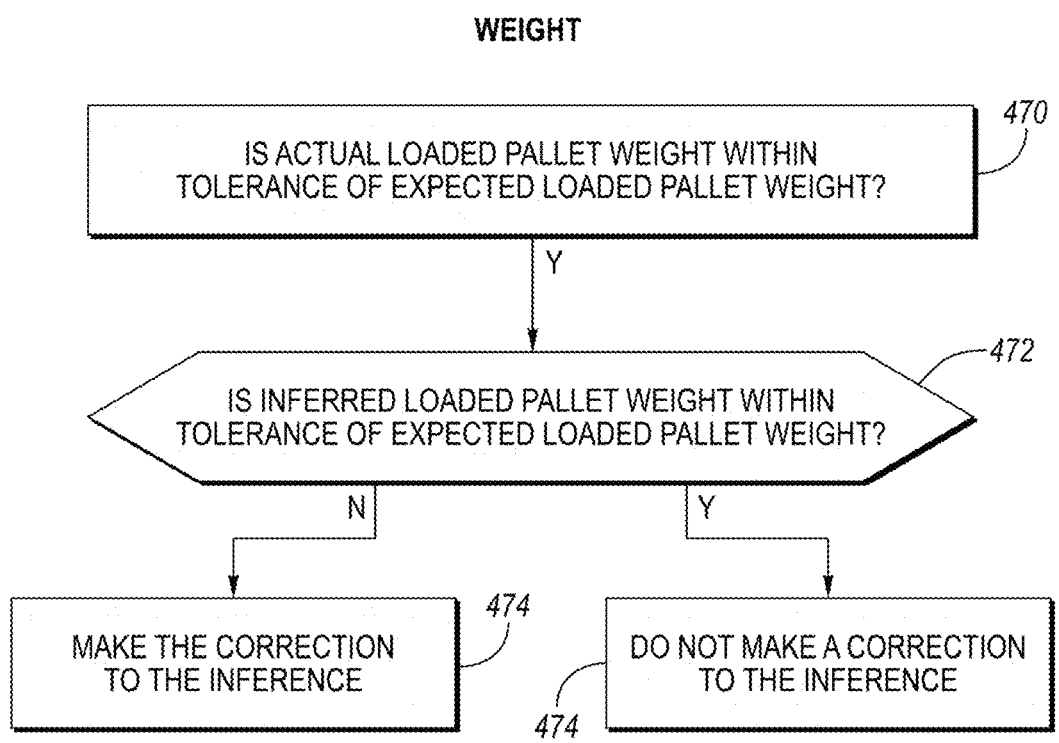
FIG. 27 is a flowchart for the weight heuristic.

Referring to FIG. 27, the weight heuristic is run to remove false errors when both of the following are true:

1) In step 470, it is determined that the actual pallet weight (from the scale) and expected pallet weight is in tolerance. The expected weight is the sum of pallet weight and the weight from all the product. The tolerance may be scaled based on the weight of the pallet so that the heaver pallets with more weight have a greater tolerance.

2) In step 472, it is determined if the weight summed up from the products in the inference plus the pallet weight and the expected pallet weight is in a tolerance. (The tolerance can be adjusted to tune the heuristic to run more or less often.) If so, then no correction is made in step 474. If not, then the correction is made in step 476.

The premise around the weight heuristic is that if the actual weight is close to the expected weight then the pallet is likely to be picked correctly. If the inferred weight is then out of alignment with the expected weight while the actual weight from the scale is in alignment, then the inference likely has a false error.

Text Corroboration

In parallel with the inference of package type, brand, and/or SKU the system (e.g. server 14 and/or DC computer 26 and/or a computer at the validation station) can also perform a text identification (e.g. Optical Character Recognition ("OCR")) on each package face. Certain text (characters, strings of characters, or numerals) can be used in combination with the inferred package types, brands, or SKUs. For example, if the inferred package types for that package face indicates that a 24-pack of cans is the highest confidence inferred package type and that a 12-pack of cans is the second highest inferred package type, but the independent OCR of the package face indicates the presence of the numeral "12," then the highest confidence inferred package type may be overridden by the detected text, or by the combination of the detected text and the existence of a matching inferred package type (optionally, within a threshold confidence level or a threshold confidence level difference from the highest confidence level inferred package type), albeit not the highest-confidence package type.

Additionally, or alternatively, the independent OCR can also be used in the brand classifier. For example, if the inferred brands include certain flavors of beverages both regular and their diet counterparts, and the independent OCR detects the presence of "di" or even "diet," then the non-diet beverages may be removed from the list or overridden in favor of the inferred diet beverages (e.g. Pepsi vs Diet Pepsi, Mountain Dew vs Diet Mountain Dew). The remaining highest-confidence inferred brand for that package face could then be assigned to that package face (subject to all of the other methods explained above). Similarly, flavor words like "strawberry" or "watermelon" or portions of those words could be used to override the highest-confidence brand.

Additionally, or alternatively, these text identifications could be brought in after particular SKUs have been identified, optionally in combination with the pick list heuristics described above. For example, if there is determined to be an extra inferred SKU and a missing SKU from the pick list, and if the text identification from one or more package faces of the extra inferred SKU supports the probability that the extra inferred SKU is in fact the missing SKU from the pick list, this can be used as an additional factor to decide to override the extra inferred SKU with the missing SKU from the pick list. For example, text identification of numbers could be related to package type such as number of beverage containers (e.g. 12 cans, 24 cans), or beverage container size (e.g. 20 oz, 32 oz). As another example, the text identification can indicate a brand (e.g. "diet" or "strawberry" or parts of those words).

Figure 27A:
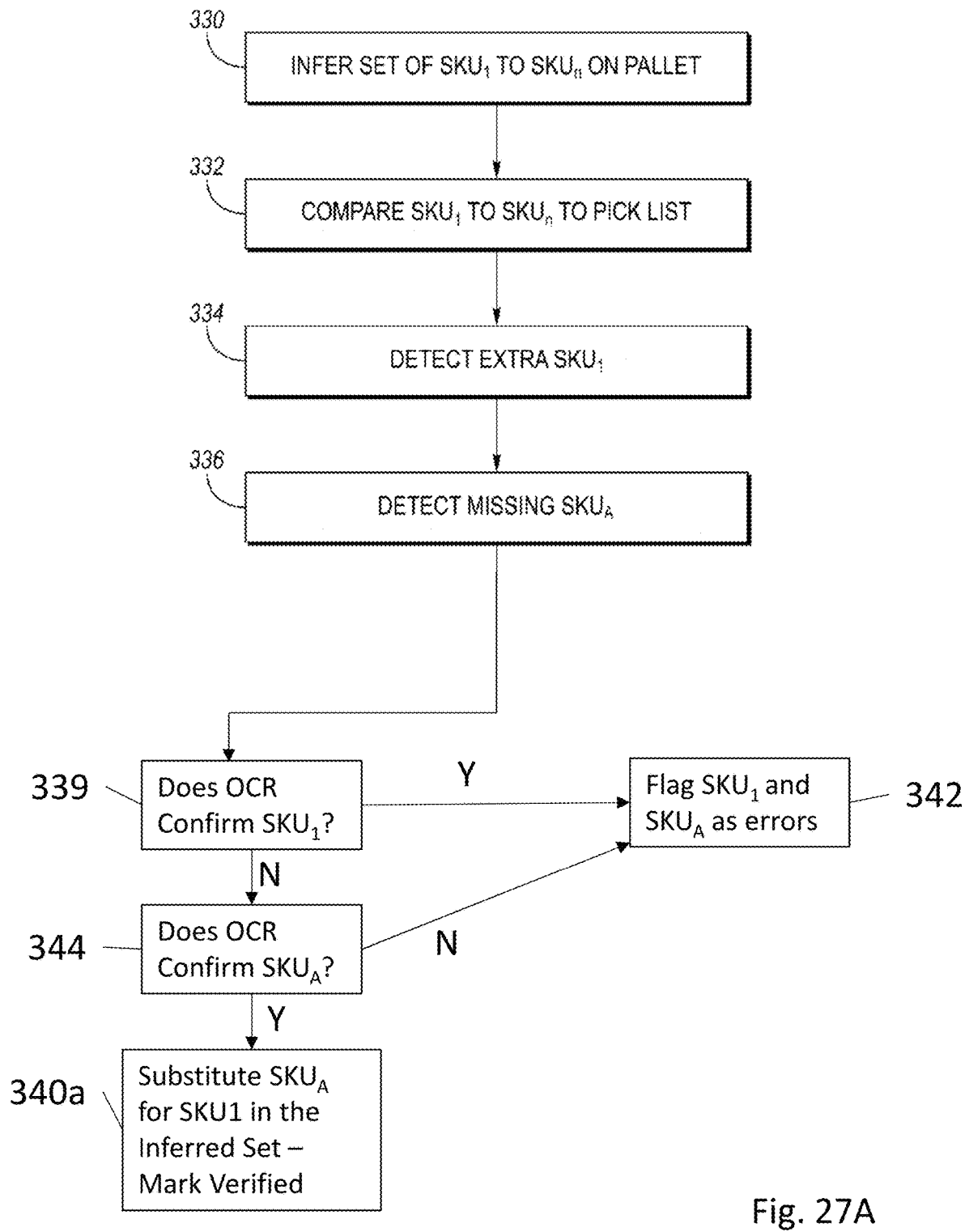
FIG. 27A is a flowchart of one optional method for using OCR in combination with the machine learning models.

One example method for using OCR in parallel with the machine learning methods is shown in the flowchart of FIG. 27A. Steps 330, 332, 334, 336 are the same as were described with respect to FIG. 16. In step 330, SKUs for all the items on the pallet (for example) are inferred according to any of the methods described herein. In step 332, the inferred SKUs are compared to the pick list. In that comparison, in step 334 an extra SKU1 is detected on the pallet and in step 336 a missing SKUA is determined to be on the pick list but missing from the pallet. In step 339, it is determined whether the OCR results of the image or images associated with the inferred SKU1 detected text that confirms SKU1. In other words, do the OCR results include any text that matches keywords 298 (FIG. 9) associated with SKU1? If so, the SKU1 and SKUA are flagged as errors in step 342 (e.g. "extra SKUA" and "missing SKU1"). If not, then it is also determined in step 344 whether the OCR results of the images detected text that confirms SKUA. In other words, do the OCR results include any text that matches keywords 298 (FIG. 9) associated with SKUA? If not, then SKU1 and SKUA are again both flagged as errors in step 342. If the OCR results confirm SKUA, then SKUA is substituted for SKU1 in the inferred set and the SKU is marked as verified in step 340*a*.

Figure 27B:
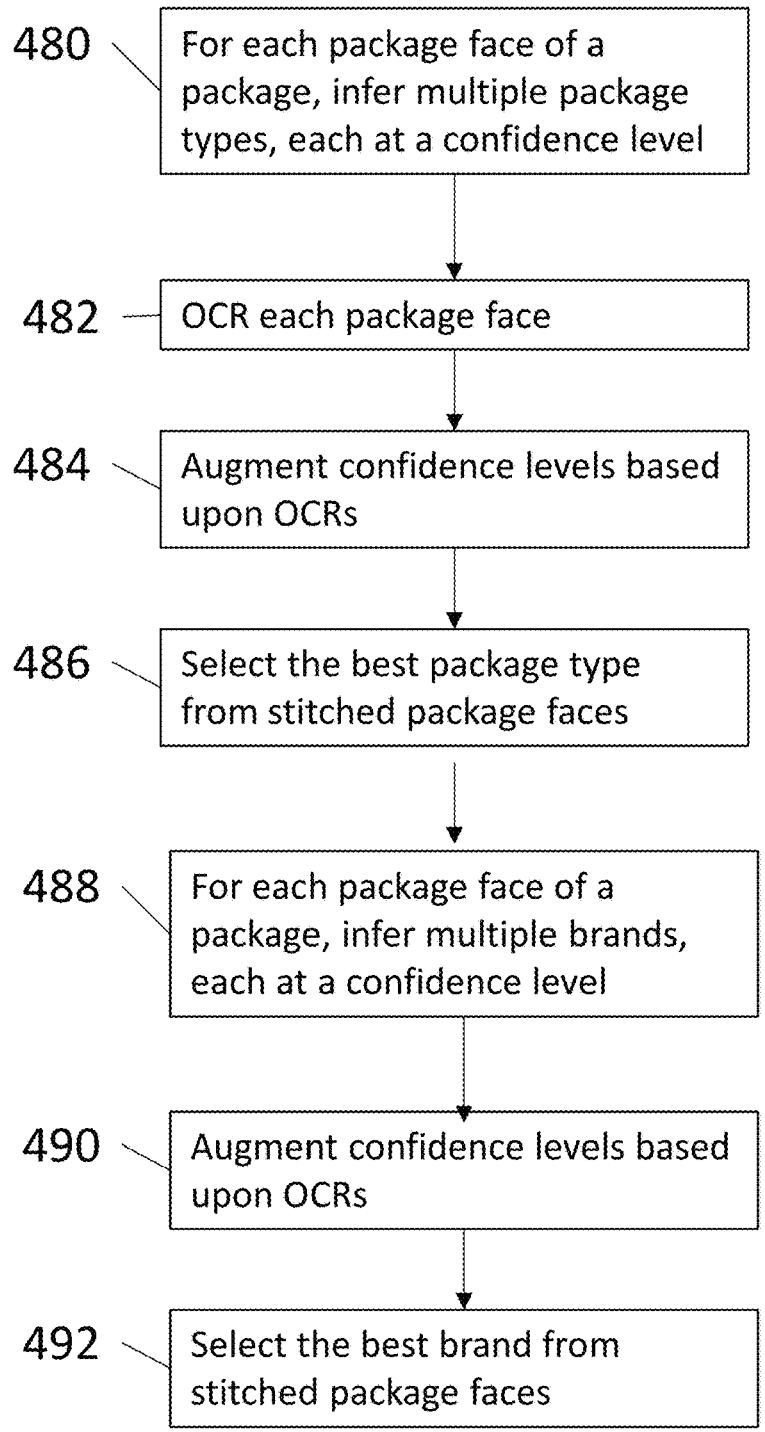
FIG. 27B is a flowchart of another optional method for using OCR in combination with the machine learning models.

An alternate method of integrated OCR with the machine learning is shown in FIG. 27B. These steps could replace steps 312 to 314 of FIG. 10. After step 310 of FIG. 10 in which the package faces are stitched together for each package on the pallet (according to the method described herein), then in step 480 (FIG. 27B), multiple package types are inferred for each package face using the machine learning model(s). Each package type inferred has an associated confidence level.

In step 482, OCR is performed on each package face, identifying any text on each package face. Step 482 could be performed before, after or in parallel with step 480. The text identified on each package face may be indicative of package type or brand.

In step 484, for each package face, if any text identified in step 482 matches or partially matches keywords 298 of any of the inferred package types, then the confidence levels associated with those inferred package types for that package face may be augmented. The identified text is compared to the keywords 298 (FIG. 9) associated with each package type. For example, for a given package face, if keywords associated with one of the inferred package types has a matched keyword from the OCR, then the confidence level associated with that package type for that package face may be increased, for example, by 10% (or any amount). For example, if the OCR detects the text "36" on the image of that package face, then the confidence level for a 32-pack of 12 oz bottles for that package face could be increased by 10%.

Then, in step 486, the package type with the highest confidence level (as potentially augmented by the OCR step) among all of the stitched package faces (i.e. all of the packages faces corresponding to difference sides of the same package) is selected and used to override the package types associated with all of the stitched package faces for that package. The augmentation of the confidence levels based upon the OCR may change which package type has the highest confidence level as initially inferred using the machine learning model. These steps are performed for each package (i.e. each set of stitched package faces, many of which will only have a single package face visible).

In step 488, as before, multiple brands are inferred for each package face using the machine learning model(s), each at an associated confidence level. Again, each package face within a set of stitched package faces (i.e. for the same package) is inferred independently and each has its own set of inferred brands and confidence levels.

In step 490, any text identified in step 482 is compared to keywords associated with each available brand. If any text identified in step 482 matches or partially matches keywords associated with any of the inferred brands, then the confidence levels associated with those inferred brands for that package face is augmented. The identified text is compared to the keywords 298 (FIG. 9) associated with each brand. For example, for a given package face, if keywords associated with one of the inferred brands has a matched keyword from the OCR, then the confidence level associated with that brand for that package face may be increased by 10% (for example). For example, if the OCR detects the text "diet" on the image of that package face, then the confidence level for all the inferred "diet" brands would be increased by adding 10%.

Then, in step 492, the brand with the highest confidence level (as potentially augmented in step 490) among all of the stitched package faces (i.e. all of the packages faces corresponding to difference sides of the same package) is selected and used to override the brands associated with all of the stitched package faces for that package. The augmentation of the confidence levels based upon the OCR may change which brand has the highest confidence level compared to when they were initially inferred using the machine learning model. These steps are performed for each package (i.e. each set of stitched package faces, many of which will only have a single package face visible).

According to the method shown in FIG. 27B, the determination of the package type can be based upon the inferred package types using the machine learning model and based upon OCR of the package faces. The determination of the brand can also be based upon the inferred brands using the machine learning model(s) and based upon OCR of the package faces. The method can then return to step 316 of FIG. 10, including the application of the heuristics.

In step 318 of FIG. 10, the system can learn from itself and improve over time unsupervised without human help through active learning. Often time, errors are automatically corrected through stitching. If the pallet inference generates the expected results as compared to the pick list SKUs and quantities then it is very likely that the correct product is on the pallet. The pallet face images can be labeled for machine learning training based on the object detector results and brand classification results and stitching algorithm corrections.

The stitching algorithm automatically makes the following types of corrections:

1. Package type override—If the package type confidence from one package face is more confident than another package face on the same item then the highest confidence package type is used.

2. Brand override—If the brand confidence from one package face is more confident than another package face on the same item then the highest confidence brand is used.

3. Holes—Once a package face is detected for a pallet face, then the stitching algorithm understands the other pallet faces that the package face should be visible on. Sometimes the package face object detector does not detect the package face on other views of the pallet face. The geometry of the package and the stitching algorithm can be used to automatically label where the package face is in the pallet face, thus reducing the occurrence of "holes."

4. Ghosts—Sometimes the machine learning detects items that are not on the pallet. This most often occurs on the short side views of the pallet where there is a stair step of product visible and the images of two or more partial products are combined. The stitching algorithm determines based on the geometry of the pallet that those images are not products and labels them as ghosts. The ghosts are excised from the pallet inference.

There are some errors that stitching cannot fix and a human is needed to label the pallet faces with the error. The results from the package face object detector, brand classifier and stitching algorithms are leveraged to feed a tool for a human to help out by making quick corrections. The normal labeling tools involve much more effort and much more expert knowledgeable humans to label and draw bounding boxes around objects that they want to detect.

The image of the supervised labeling tool in FIG. 28 shows the innovative user interface for how labels with errors are fixed. The tool leverages stitching so that all of the package face images for a package are grouped together to make classifying by a human easier.

The tool corrects the brand and package type labels for all of the packages (items) on one pallet at a time across all four pallet face images. Packages are labeled and not SKUs to handle the scenarios where some SKUs have more than one package per case. Each package is loose and requires a bounding boxes and labels for the package type across the four pallet faces. These bounding boxes and labels can be used for package face detection model training and the labeling tool for brand training then segments the images at the bounding box coordinates and names the images based on the brand for brand training.

The error scenarios on each pallet are sorted so that errors where more package quantity is detected than expected are resolved first. These corrections provide the likely possibilities for the later scenarios where less package quantity is detected and it is necessary to identify the additional packages to add.

The tool also allows one to see all the detected product on the pallet and filter the product by the inferred package type and brand to help with labeling. The idea is that a non Subject Matter Expert (SME) can quickly make the bulk of corrections using this tool.

The alternative approach of using a standard open source tool would take a SME who understands the product a ton of additional time to manually make the corrections.

FIG. 28 shows an example of an error scenario where more is detected than was expected of a particular SKU. There is a column listing the inferred package type, a column listing the inferred brand, a column of images of the "expected SKU" (i.e. previously stored images for the SKU that is selected based upon the inferred package type and inferred brand), and a column of the actual package faces ("Actual SKU") from which the package type and brand were inferred. In other words, based upon what was inferred, the images in the "expected SKU" column should look the same as the images in "actual SKU" column, if the SKUs were inferred correctly.

As indicated in the first column, two packages of the SKU (16.9 oz 12pk Lipton Green Tea white peach flavor) were expected. The QA person compares the "expected SKU" images to the adjacent "actual SKU" images and marks with a checkmark the correct two. Three were detected so only two of the three packages should be confirmed with a checkmark. The expected SKU images may come from previously labeled training images.

The expected images are shown next to the actual images so that the QA person can spot the differences. The QA person will notice that there are white peaches on the bottom two sets of images like the training images and the top set of actual images has watermelons. The QA person will uncheck the top watermelon because it has the wrong label.

The unchecked watermelon image becomes a candidate for a later scenario where less is detected than was expected.

FIG. 29 also shows the supervised labeling tool. In this error scenario one was detected but two were expected. The watermelon package that was removed from the previous label is shown to be a candidate for this scenario. The QA person will see that the package type and brand look the same for the first two groups of images and will check both of them.

Behind the scenes the tool will update the labels across the four pallet faces for each view that the package face is present.

Hovering over a package face image will pop-up a view of all of the pallet faces where that package is visible with bounding boxes around that package. This will help the QA person better understand what they are looking at.

The QA person can adjust the bounding boxes that were originally created automatically by the machine learning package detect. The QA person can also add or remove bounding boxes for that package.

As indicated above, it is currently preferred in the implemented embodiment that the packaging type is determined first and is used to limit the possible brand options (e.g. by selecting one of the plurality of brand models 231). However, alternatively, the branding could be determined and used to narrow the possible packaging options to be identified. Alternatively, the branding and packaging could be determined independently and cross-referenced afterward for verification. In any method, if one technique leads to an identification with more confidence, that result could take precedence over a contrary identification. For example, if the branding is determined with low confidence and the packaging is determined with high confidence, and the identified branding is not available in the identified packaging, the identified packaging is used and the next most likely branding that is available in the identified packaging is then used.

After individual items 20 are identified on each of the four sides of the loaded pallet 22, based upon the known dimensions of the items 20 and pallet 22 duplicates are removed, i.e. it is determined which items are visible from more than one side and appear in more than one image. If some items are identified with less confidence from one side, but appear in another image where they are identified with more confidence, the identification with more confidence is used.

For example, if the pallet 22 is a half pallet, its dimensions would be approximately 40 to approximately 48 inches by approximately 18 to approximately 24 inches, including the metric 800 mm×600 mm. Standard size beverage crates, beverage cartons, and wrapped corrugated trays would all be visible from at least one side, most would be visible from at least two sides, and some would be visible on three sides.

If the pallet 22 is a full-size pallet (e.g. approximately 48 inches by approximately 40 inches, or 800 mm by 1200 mm), most products would be visible from one or two sides, but there may be some products that are not visible from any of the sides. The dimensions and weight of the hidden products can be determined as a rough comparison against the pick list. Optionally, stored images (from the SKU files) of SKUs not matched with visible products can be displayed to the user, who could verify the presence of the hidden products manually.

Generally half pallets are less than approximately 18" to 24" wide by 36" to 48" long, while full pallets are approximately 36" to 48" by 36" to 48". Here, the main difference is that, relative to the packages or products carried on the pallet, there need be no completely hidden products or packages in a stack on a half pallet (although certain stack configurations can hide a few) and there will inevitably be some completely hidden products (and potentially many) inside a stack on a full pallet.

The computer vision-generated sku count for that specific pallet 22 is compared against the pick list 64 to ensure the pallet 22 is built correctly in step 162 of FIG. 2. This may be done prior to the loaded pallet 22 being wrapped thus preventing unwrapping of the pallet 22 to audit and correct. If the built pallet 22 does not match the pick list 64 (step 162), the missing or wrong SKUs are indicated to the worker (step 164), e.g. via a display (e.g. FIG. 34). Then the worker can correct the items 20 on the pallet 22 (step 166) and reinitiate the validation (i.e. initiate new images in step 156).

If the loaded pallet 22 is confirmed, positive feedback is given to the worker (e.g. FIG. 33), who then continues wrapping the loaded pallet 22 (step 168). Additional images may be taken of the loaded pallet 22 after wrapping. For example, four image may be taken of the loaded pallet before wrapping, and four more images of the loaded pallet 22 may be taken after wrapping. All images are stored locally and sent to the server 14. The worker then moves the validated loaded pallet 22 to the loading station 34 (step 170)

After the loaded pallet 22 has been validated, it is moved to a loading station 34 (FIG. 1). At the loading station 34, the distribution center computer 26 ensures that the loaded pallets 22, as identified by each pallet id, are loaded onto the correct trucks 18 in the correct order. For example, pallets 22 that are to be delivered at the end of the route are loaded first.

Referring to FIG. 1, the loaded truck 18 carries a hand truck or pallet sled 24, for moving the loaded pallets 22 off of the truck 18 and into the stores 16 (FIG. 2, step 172). The driver has a mobile device 50 which receives an optimized route from the distribution center computer 26 or central server 14. The driver follows the route to each of the plurality of stores 16 for which the truck 18 contains loaded pallets 22.

At each store 16 the driver's mobile device 50 indicates which of the loaded pallets 22 (based upon their pallet ids) are to be delivered to the store 16 (as verified by gps on the mobile device 50). The driver verifies the correct pallet(s) for that location with the mobile device 50 that checks the pallet id (rfid, barcode, etc). The driver moves the loaded pallet(s) 22 into the store 16 with the pallet sled 24.

At each store, the driver may optionally image the loaded pallets with the mobile device 50 and send the images to the central server 14 to perform an additional verification. More preferably, the store worker has gained trust in the overall system 10 and simply confirms that the loaded pallet 22 has been delivered to the store 16, without taking the time to go SKU by SKU and compare each to the list that he ordered and without any revalidation/imaging by the driver. In that way, the driver can immediately begin unloading the products 20 from the pallet 22 and placing them on shelves 54 or in coolers 56, as appropriate. This greatly reduces the time of delivery for the driver.

Figure 30:
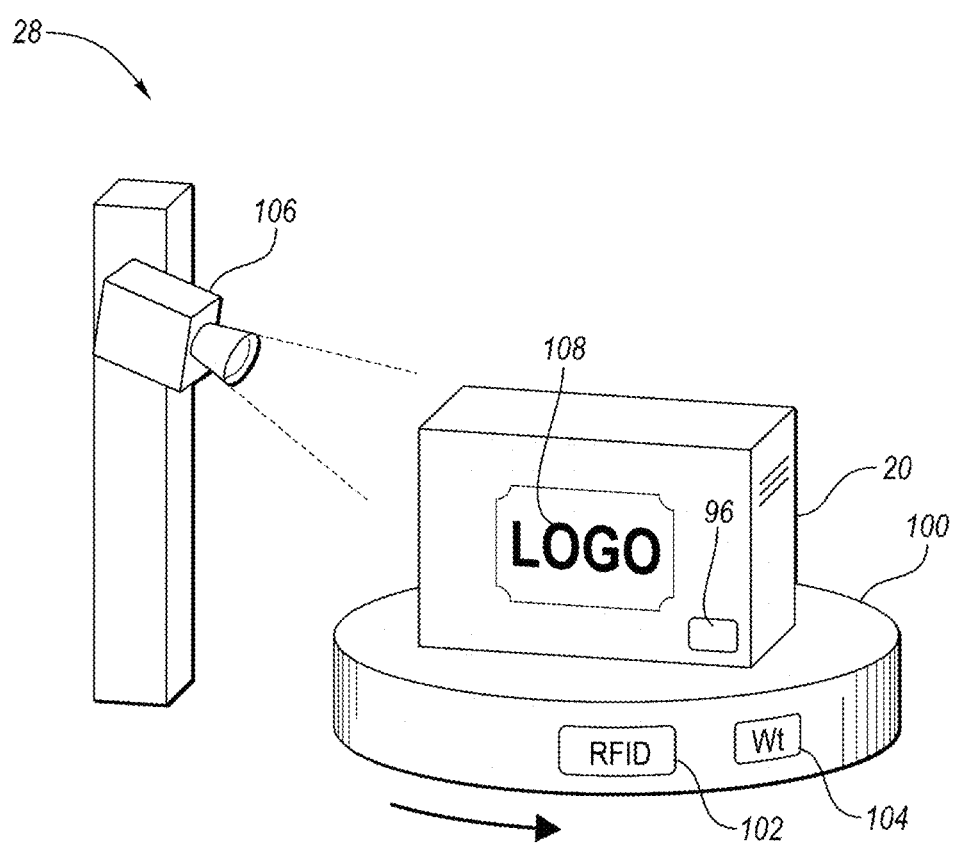
FIG. 30 shows an example training station of the delivery system of FIG. 1.

FIG. 30 shows a sample training station 28 including a turntable 100 onto which a new product 20 (e.g. for a new SKU or new variation of an existing SKU) can be placed to create the machine learning models 44. The turntable 100 may include an RFID reader 102 for reading an RFID tag 96 (if present) on the product 20 and a weight sensor 104 for determining the weight of the product 20. A camera 106 takes a plurality of still images and/or video of the packaging of the product 20, including any logos 108 or any other indicia on the packaging, as the product 20 is rotated on the turntable 100. Preferably all sides of the packaging are imaged. The images, weight, RFID information are sent to the server 14 to be stored in the SKU file 44. Optionally, multiple images of the product 20 are taken at different angles and/or with different lighting. Alternatively, or additionally, the computer files with the artwork for the packaging for the product 20 (i.e. files from which the packaging is made) are sent directly to the server 14.

Figure 31:
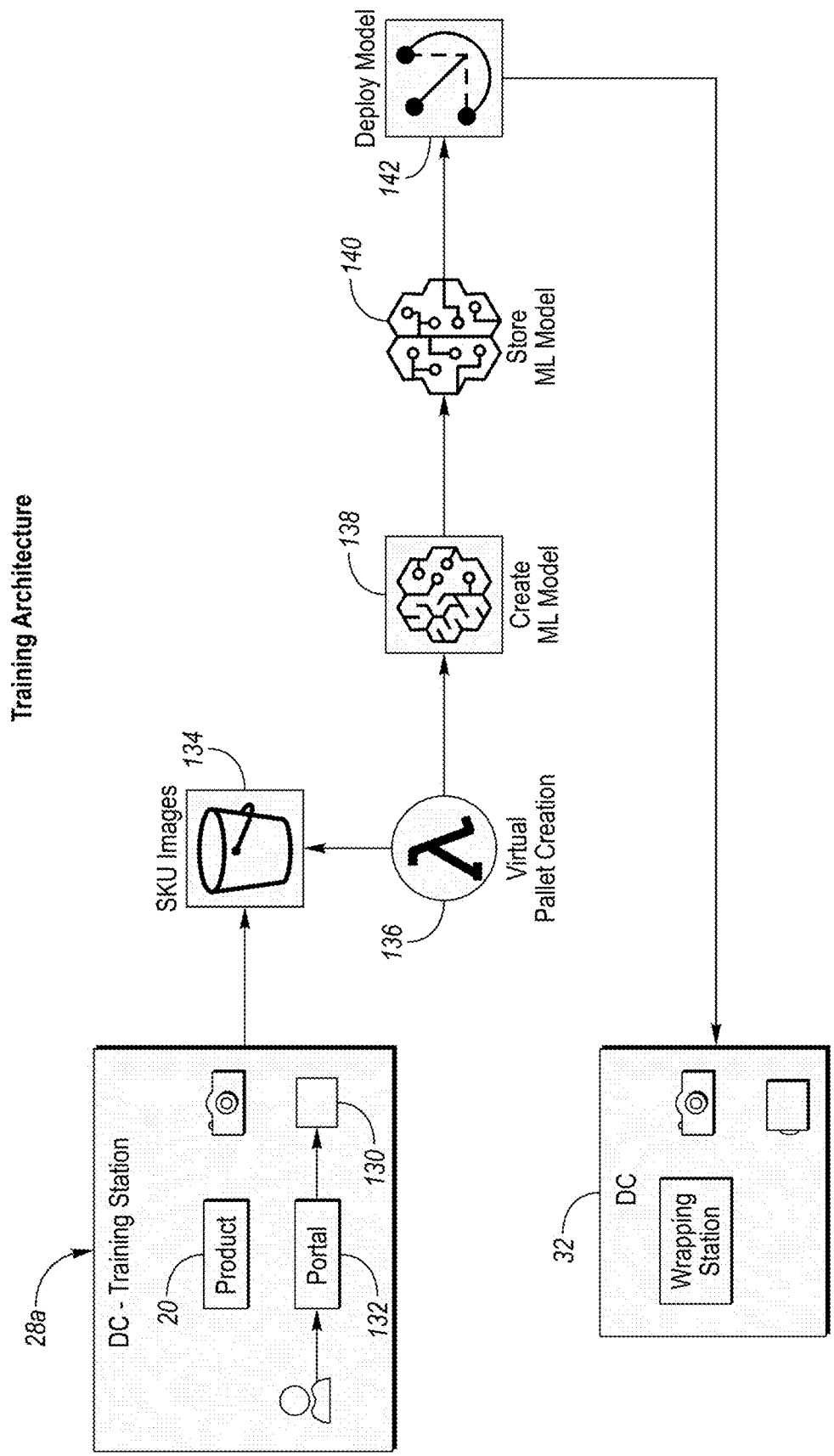
FIG. 31 shows one possible architecture of the training feature of the system of FIG. 1.

In one possible implementation of training station 28, shown in FIG. 31, cropped images of products 20 from the training station 28 are sent from the local computer 130 via a portal 132 to sku image storage 134, which may be at the server 14. Alternatively, or additionally, the computer files with the artwork for the packaging for the product 20 (i.e. files from which the packaging is made) are sent directly to the server 14. Alternatively, or additionally, actual images of the skus are taken and segmented (i.e. removing the background, leaving only the sku).

Figure 32:
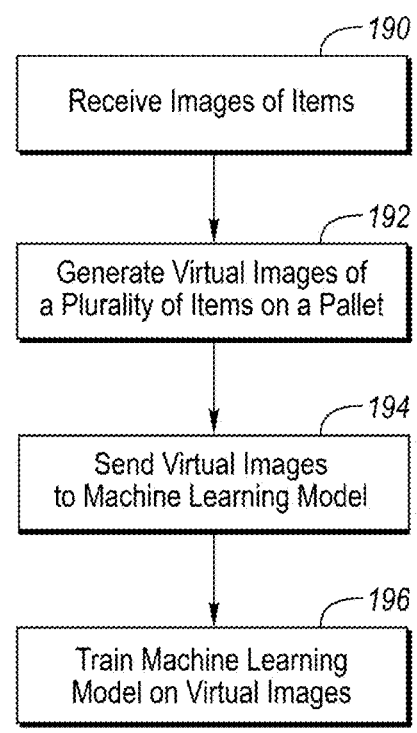
FIG. 32 is a flowchart of one version of a method for training a machine learning model.

Whichever method is used to obtain the images of the items, the images of the items are received in step 190 of FIG. 32. In step 192, an API 136 takes the sku images and builds them into a plurality of virtual pallets, each of which shows how the products 20 would look on a pallet 22. The virtual pallets may include four or five layers of the product 20 on the pallet 22. Some of the virtual pallets may be made up solely of the single new product 20, and some of the virtual pallets will have a mixture of images of different products 20 on the pallet 22. The API 136 also automatically tags the locations and/or boundaries of the products 20 on the virtual pallet with the associated skus. The API creates multiple configurations of the virtual pallet to send to a machine learning model 138 in step 194 to update it with the new skus and pics.

The virtual pallets are built based upon a set of configurable rules, including, the dimensions of the pallet 22, the dimensions of the products 20, number of permitted layers (such as four, but it could be five or six), layer restrictions regarding which products can be on which layers (e.g. certain bottles can only be on the top layer), etc. The image of each virtual pallet is sized to be a constant size (or at least within a particular range) and placed on a virtual background, such as a warehouse scene. There may be a plurality of available virtual backgrounds from which to randomly select.

The API creates thousands of images of randomly-selected sku images on a virtual pallet. The API uses data augmentation to create even more unique images. Either a single loaded virtual pallet image can be augmented many different ways to create more unique images, or each randomly-loaded virtual pallet can have a random set of augmentations applied. For example, the API may add random blur (random amount of blur and/or random localization of blur) to a virtual pallet image. The API may additionally introduce random noise to the virtual pallet images, such as by adding randomly-located speckles of different colors over the images of the skus and virtual pallet. The API may additionally place the skus and virtual pallet in front of random backgrounds. The API may additionally place some of the skus at random (within reasonable limits) angles relative to one another both in the plane of the image and in perspective into the image. The API may additionally introduce random transparency (random amount of transparency and/or random localized transparency), such that the random background is partially visible through the virtual loaded pallet or portions thereof. Again, the augmentations of the loaded virtual pallets are used to generate even more virtual pallet images.

The thousands of virtual pallet images are sent to the machine learning model 138 along with the bounding boxes indicating the boundaries of each product on the image and the SKU associated with each product. The virtual pallet images along with the bounding boxes and associated SKUs constitute the training data for the machine learning models.

In step 196, the machine learning model is trained in step 138 based upon the images of the virtual pallets and based upon the location, boundary, and sku tag information. The machine learning model is updated and stored in step 140. The machine learning model is deployed in step 142 and used in conjunction with the validation stations 32 (FIG. 1) and optionally with the delivery methods described above. The machine learning model 138 may also be trained based upon actual images taken in the distribution center or the stores after identification. Optionally, feedback from the workers can factor into whether the images are used, e.g. the identified images are not used until a user has had an opportunity to verify or contradict the identification.

It should be understood that each of the computers, servers or mobile devices described herein includes at least one processor and at least one non-transitory computer-readable media storing instructions that, when executed by the at least one processor, cause the computer, server, or mobile device to perform the operations described herein. The precise location where any of the operations described herein takes place is not important and some of the operations may be distributed across several different physical or virtual servers at the same or different locations.

In accordance with the provisions of the patent statutes and jurisprudence, exemplary configurations described above are considered to represent preferred embodiments of the inventions. However, it should be noted that the inventions can be practiced otherwise than as specifically illustrated and described without departing from its spirit or scope. Alphanumeric identifiers on method steps are solely for ease in reference in dependent claims and such identifiers by themselves do not signify a required sequence of performance, unless otherwise explicitly specified.

What is claimed is:

1. A computing system for identifying SKUs in a stack of a plurality of packages comprising:
at least one processor; and
at least one non-transitory computer-readable media storing:
at least one machine learning model that has been trained with a plurality of images of packages; and
instructions that, when executed by the at least one processor, cause the computing system to perform the following operations:
a) receiving a plurality of stack images of the stack of the plurality of packages, wherein each of the plurality of stack images is of a different face of the stack of the plurality of packages, the plurality of stack images including a first stack image of a first face of the stack of the plurality of packages and a second stack image of a second face of the stack of the plurality of packages, wherein the first face of the stack of the plurality of packages abuts the second face of the stack of the plurality of packages at a first second corner;
b) segmenting the first stack image into a plurality of first package faces, the plurality of first package faces including a plurality of right first package faces along the first second corner;
c) segmenting the second stack image into a plurality of second package faces, the plurality of second package faces including a plurality of left second package faces along the first second corner;
d) evaluating the first stack face to determine whether a right half or a left half of the stack of packages in the first stack face is taller, wherein the second stack face corresponds to a taller one of the right half or the left half of the stack of packages, wherein the plurality of stack images further includes a third stack image opposite the first stack image and a fourth stack image opposite the second stack image, wherein operation d) is performed before linking package faces of the fourth stack image based upon the determination that the second stack face corresponds to the taller one of the right half or the left half;
e) linking each of the plurality of right first package faces along the first second corner to a different one of the plurality of left second package faces along the first second corner as different faces of the same ones of the plurality of packages;
f) using the at least one machine learning model, inferring at least one classification based upon each of the first package faces and each of the second package faces; and
g) associating a SKU with each of the plurality of packages based upon steps d) and e).

2. The computing system of claim 1, wherein the operations further include: h) classifying a position of each of the plurality of first package faces and each of the plurality of second package faces.

3. The computing system of claim 2, wherein in operation h) the positions of the plurality of first package faces are classified based upon the first stack image to be one of: middle, left, or right and one of: bottom or top, and the positions of the plurality of second packages faces are classified based upon the second stack image to be one of: middle, left, or right and one of: bottom or top.

4. The computing system of claim 1 wherein the plurality of stack images further includes a third stack image of a third face of the stack of the plurality of packages and a fourth stack image of a fourth face of the stack of the plurality of packages, and wherein the first stack image and the third stack image correspond to opposite long sides of the stack of packages and wherein the second stack image and the fourth stack image correspond to opposite short sides of the stack of packages.

5. The computing system of claim 4 further including a second-third corner at which the second face of the stack of the plurality of packages abuts the third face of the stack of the plurality of packages, the plurality of second package faces including a plurality of right second package faces along the second-third corner, wherein the operations further include:
   f) segmenting the third stack image into a plurality of third package faces, the plurality of third package faces including a plurality of left third package faces along the second-third corner; and
   g) linking each of the plurality of right second package faces to a different one of the plurality of left third package faces as different faces of the same ones of the plurality of packages.

6. A computing system for identifying SKUs in a stack of a plurality of packages comprising:
   at least one processor; and
   at least one non-transitory computer-readable media storing:
      at least one machine learning model that has been trained with a plurality of images of packages; and
      instructions that, when executed by the at least one processor, cause the computing system to perform the following operations:
   a) receiving a plurality of stack images of the stack of the plurality of packages, wherein each of the plurality of stack images is of a different face of the stack of the plurality of packages, the plurality of stack images including a first stack image of a first face of the stack of the plurality of packages, a second stack image of a second face of the stack of the plurality of packages, a third stack image of a third face of the stack of the plurality of packages and a fourth stack image of a fourth face of the stack of the plurality of packages, and wherein the first stack image and the third stack image correspond to opposite long sides of the stack of packages and wherein the second stack image and the fourth stack image correspond to opposite short sides of the stack of packages, wherein the first face of the stack of the plurality of packages abuts the second face of the stack of the plurality of packages at a first second corner, wherein the second face of the stack of the plurality of packages abuts the third face of the stack of the plurality of packages at a second-third corner, the plurality of second package faces including a plurality of right second package faces along the second-third corner;
   b) segmenting the first stack image into a plurality of first package faces, the plurality of first package faces including a plurality of right first package faces along the first second corner;
   c) segmenting the second stack image into a plurality of second package faces, the plurality of second package faces including a plurality of left second package faces along the first second corner;
   d) linking each of the plurality of right first package faces along the first second corner to a different one of the plurality of left second package faces along the first second corner as different faces of the same ones of the plurality of packages;
   e) segmenting the third stack image into a plurality of third package faces, the plurality of third package faces including a plurality of left third package faces along the second-third corner;
   f) linking each of the plurality of right second package faces to a different one of the plurality of left third package faces as different faces of the same ones of the plurality of packages;
   g) flipping the third stack image;
   h) identifying a first subset of the plurality of right first package faces that have been linked to left third package faces as different faces of the same ones of the plurality of packages;
   i) linking a second subset of the first package faces with corresponding ones of the third package faces based upon locations relative to the first subset;
   j) using the at least one machine learning model, inferring at least one classification based upon each of the first package faces and each of the second package faces; and
   k) based upon steps f) and j), associating a SKU with each of the same ones of the plurality of packages.

7. A computing system for identifying SKUs in a stack of a plurality of packages comprising:
   at least one processor; and
   at least one non-transitory computer-readable media storing:
      at least one machine learning model that has been trained with a plurality of images of packages; and
      instructions that, when executed by the at least one processor, cause the computing system to perform the following operations:
   a) receiving a plurality of stack images of the stack of the plurality of packages, wherein each of the plurality of stack images is of a different face of the stack of the plurality of packages, the plurality of stack images including a first stack image of a first face of the stack of the plurality of packages and a second stack image of a second face of the stack of the plurality of packages, wherein the first face of the stack of the plurality of packages abuts the second face of the stack of the plurality of packages at a first second corner;
   b) segmenting the first stack image into a plurality of first package faces, the plurality of first package faces including a plurality of right first package faces along the first second corner;
   c) segmenting the second stack image into a plurality of second package faces, the plurality of second package faces including a plurality of left second package faces along the first second corner;
   d) linking each of the plurality of right first package faces along the first second corner to a different one of the plurality of left second package faces along the first second corner as different faces of the same ones of the plurality of packages;

e) using the at least one machine learning model, inferring at least one classification based upon each of the second package faces and inferring a plurality of classifications for each of the first package faces;

f) performing optical character recognition on one of the plurality of first package faces; and g) associating a SKU with the one of the plurality of first package faces based upon the inferred plurality of classifications for the one of the plurality of first packages faces and based upon the optical character recognition on the one of the plurality of first package faces.

8. A computing system for identifying SKUs in a stack of a plurality of packages comprising:

at least one processor; and at least one non-transitory computer-readable media storing:

at least one machine learning model that has been trained with a plurality of images of packages; and instructions that, when executed by the at least one processor, cause the computing system to perform the following operations:

a) receiving a plurality of stack images of the stack of the plurality of packages, wherein each of the plurality of stack images is of a different face of the stack of the plurality of packages, the plurality of stack images including a first stack image of a first face of the stack of the plurality of packages;

b) segmenting the first stack image into a plurality of first package faces;

c) using the at least one machine learning model, inferring a plurality of brands based upon each of the first package faces;

d) performing optical character recognition on one of the plurality of first package faces; and e) associating one of the plurality of brands with the one of the plurality of first package faces based upon the inferred plurality of brands for the one of the plurality of first packages faces and based upon the optical character recognition on the one of the plurality of first package faces.

9. The computing system of claim 8 wherein the operations further include:

f) using the at least one machine learning model, inferring a plurality of package types based upon each of the first package faces; and g) associating one of the plurality of package types with the one of the plurality of first package faces based upon the inferred plurality of package types for the one of the plurality of first packages faces and based upon the optical character recognition on the one of the plurality of first package faces.

10. A computer method for identifying SKUs in a stack of a plurality of packages including:

a) receiving in at least one computer a plurality of stack images of the stack of the plurality of packages, wherein each of the plurality of stack images is of a different face of the stack of the plurality of packages, the plurality of stack images including a first stack image of a first face of the stack of the plurality of packages and a second stack image of a second face of the stack of the plurality of packages, wherein the first face of the stack of the plurality of packages abuts the second face of the stack of the plurality of packages at a first second corner;

b) segmenting the first stack image into a plurality of first package faces, the plurality of first package faces including a plurality of right first package faces along the first second corner;

c) segmenting the second stack image into a plurality of second package faces, the plurality of second package faces including a plurality of left second package faces along the first second corner;

d) the at least one computer linking each of the plurality of right first package faces along the first second corner to a different one of the plurality of left second package faces along the first second corner as different faces of the same ones of the plurality of packages;

e) the at least one computer using at least one machine learning model to infer a plurality of package types based upon each of the first package faces and each of the second package faces;

f) based upon steps d) and e), the at least one computer selecting a best package type for each of the plurality of same ones of the plurality of packages;

g) the at least one computer using the at least one machine learning model to infer a plurality of brands based upon each of the first package faces and each of the second package faces;

h) based upon steps d) and g), the at least one computer selecting a best brand for each of the same ones of the plurality of packages; and i) based upon steps f) and h), identifying a SKU for each of the same ones of the plurality of packages.

11. A pallet wrapper system including the computing system of claim 1, the pallet wrapper system further including:

a turntable having a support surface for supporting a pallet having the stack of the plurality of packages supported thereon;

at least one camera directed toward an area above the support surface of the turntable for generating the plurality of stack images; and a stretch wrap dispenser adjacent the turntable.

12. The computing system of claim 4 wherein inferring at least one SKU in step e) further includes inferring at least brand based upon each of the first package faces at first confidence levels and inferring at least one brand based upon each of the second package faces at second confidence levels, step e) further including comparing the first confidence levels and the second confidence levels between each of the plurality of right first package faces and the linked one of the plurality of left second package faces.

13. The computing system of claim 6 wherein the at least one classification inferred for each of the first package faces in step j) includes at least one package type.

14. The computing system of claim 13 wherein the at least one classification inferred based upon each of the first package faces in step j) includes at least one brand.

15. The computing system of claim 7, wherein the SKU is one of a plurality of SKUs, wherein the operations further include: based upon steps d) and e, associating each of the plurality of SKUs with same ones of the plurality of packages.

16. The computing system of claim 7 wherein the plurality of classifications inferred for each of the first package faces in step e) includes a plurality of package types.

17. The computing system of claim 7 wherein the plurality of classifications inferred for each of the first package faces in step e) includes a plurality of brands.

18. The computing system of claim 8 wherein operation c) includes inferring each of the plurality of brands at a confidence level for each of the first package faces and wherein the operations further include augmenting the confidence level associated with the one of the plurality of brands based upon step d) and wherein the one of the plurality of brands is associated with the one of the plurality of first package faces in step e) based upon the augmented confidence level.

19. The computing system of claim 8 wherein the operations include identifying a SKU associated with the one of the plurality of packages based upon step c) and step d).

20. A computing system for identifying SKUs in a stack of a plurality of packages comprising:
  at least one processor; and
  at least one non-transitory computer-readable media storing:
    at least one machine learning model that has been trained with a plurality of images of packages; and
    instructions that, when executed by the at least one processor, cause the computing system to perform the following operations:
  a) receiving a plurality of stack images of the stack of the plurality of packages, wherein each of the plurality of stack images is of a different face of the stack of the plurality of packages, the plurality of stack images including a first stack image of a first face of the stack of the plurality of packages;
  b) segmenting the first stack image into a plurality of first package faces;
  c) using the at least one machine learning model, inferring a plurality of package types based upon each of the first package faces;
  d) performing optical character recognition on one of the plurality of first package faces; and
  e) associating one of the plurality of package types with the one of the plurality of first package faces based upon the inferred plurality of package types for the one of the plurality of first packages faces and based upon the optical character recognition on the one of the plurality of first package faces.

21. The computing system of claim 20 wherein operation c) includes inferring each of the plurality of package types at a confidence level for each of the first package faces and wherein the operations further include augmenting the confidence level associated with the one of the plurality of package types based upon step d) and wherein the one of the plurality of package types is associated with the one of the plurality of first package faces in step e) based upon the augmented confidence level.

22. The computing system of claim 21 wherein the operations include identifying a SKU associated with the one of the plurality of packages based upon step c) and step d).

23. A pallet wrapper system including the computing system of claim 20, the pallet wrapper system further including:
  a turntable having a support surface for supporting a pallet having the stack of the plurality of packages supported thereon;
  at least one camera directed toward an area above the support surface of the turntable for generating the plurality of stack images; and
  a stretch wrap dispenser adjacent the turntable.

24. A pallet wrapper system including the computing system of claim 6, the pallet wrapper system further including:
  a turntable having a support surface for supporting a pallet having the stack of the plurality of packages supported thereon;
  at least one camera directed toward an area above the support surface of the turntable for generating the plurality of stack images; and
  a stretch wrap dispenser adjacent the turntable.

25. A pallet wrapper system including the computing system of claim 7, the pallet wrapper system further including:
  a turntable having a support surface for supporting a pallet having the stack of the plurality of packages supported thereon;
  at least one camera directed toward an area above the support surface of the turntable for generating the plurality of stack images; and
  a stretch wrap dispenser adjacent the turntable.

26. A pallet wrapper system including the computing system of claim 8, the pallet wrapper system further including:
  a turntable having a support surface for supporting a pallet having the stack of the plurality of packages supported thereon;
  at least one camera directed toward an area above the support surface of the turntable for generating the plurality of stack images; and
  a stretch wrap dispenser adjacent the turntable.

27. The method of claim 10 further including generating the plurality of stack images of the stack of the plurality of packages.

* * * * *